(12) United States Patent
Hansen et al.

(10) Patent No.: US 12,253,857 B2
(45) Date of Patent: Mar. 18, 2025

(54) SYSTEM AND METHOD FOR A COLLAPSIBLE SELF-STORING ROBOT

(71) Applicant: Armstrong Robotics, Inc., San Francisco, CA (US)

(72) Inventors: Axel Hansen, San Francisco, CA (US); Jonah Varon, Oakland, CA (US); Luke Hansen, San Francisco, CA (US); Sungbum Park, Mountain View, CA (US)

(73) Assignee: Armstrong Robotics, Inc.., San Francisco, CA (US)

( * ) Notice: Subject to any disclaimer, the term of this patent is extended or adjusted under 35 U.S.C. 154(b) by 288 days.

(21) Appl. No.: 17/725,156

(22) Filed: Apr. 20, 2022

(65) Prior Publication Data

US 2023/0341864 A1   Oct. 26, 2023

(51) Int. Cl.
  *G05D 1/02* (2020.01)
  *A47B 77/08* (2006.01)
  *B25J 5/00* (2006.01)
  *G05D 1/00* (2006.01)

(52) U.S. Cl.
  CPC .......... *G05D 1/0225* (2013.01); *A47B 77/08* (2013.01); *B25J 5/007* (2013.01)

(58) Field of Classification Search
  None
  See application file for complete search history.

(56) References Cited

U.S. PATENT DOCUMENTS

| | | | |
|---|---|---|---|
| 9,733,646 B1 | 8/2017 | Nusser et al. | |
| 10,518,372 B2 * | 12/2019 | Bergeron | B25J 9/0006 |
| 2016/0221196 A1 | 8/2016 | Suzuki | |

(Continued)

FOREIGN PATENT DOCUMENTS

| | | | |
|---|---|---|---|
| DE | 19744488 B4 | 10/2006 | |
| KR | 100797001 B1 * | 1/2008 | B25J 5/00 |

(Continued)

OTHER PUBLICATIONS

English Translation to KR 100797001 B1 (Year: 2008).*

(Continued)

*Primary Examiner* — Jason Holloway
(74) *Attorney, Agent, or Firm* — PEARL COHEN ZEDEK LATZER BARATZ LLP

(57) ABSTRACT

A robotic system coordinates collision-free self-storage of a robot. The robotic system initiates and performs a controlled collapse of the robot into a pre-defined compact geometry that permits self-storage in a confined, compact area when not in use. The system also coordinates collision-free self-deployments of the robot into a deployed geometry suitable for performing autonomous tasks outside of the compact storage area. The system includes a collapsible robot configured to extend and retract at least one robotic arm to perform tasks above a worksurface, a powered docking station positioned below the worksurface and including a power source interface to electrically couple the collapsible robot to a power source, and control circuitry for coordinating movements of the collapsible robot—such as collision-free self-collapse, collision-free self-deployments, and collision-free ingress and egress of the robot into and out of the compact storage area.

19 Claims, 52 Drawing Sheets

(56) References Cited

U.S. PATENT DOCUMENTS

| | | | |
|---|---|---|---|
| 2017/0203441 A1* | 7/2017 | Nelson | B25J 9/162 |
| 2018/0079079 A1 | 3/2018 | Gombert et al. | |
| 2019/0283245 A1 | 9/2019 | Levine et al. | |
| 2020/0005787 A1 | 1/2020 | Shin et al. | |
| 2020/0015623 A1 | 1/2020 | Kim | |
| 2020/0078938 A1 | 3/2020 | Bradski et al. | |
| 2020/0270071 A1 | 8/2020 | Chavez et al. | |
| 2020/0354170 A1* | 11/2020 | Priest | G05D 1/101 |
| 2022/0152824 A1 | 5/2022 | Hansen | |
| 2022/0152825 A1 | 5/2022 | Hansen | |
| 2023/0165427 A1* | 6/2023 | Paintner | B25J 11/008 134/56 D |

FOREIGN PATENT DOCUMENTS

| | | | |
|---|---|---|---|
| KR | 20190103512 A | 9/2019 | |
| TW | 201813790 A | 4/2018 | |
| WO | 2018137694 A1 | 8/2018 | |
| WO | 2020079272 A2 | 4/2020 | |

OTHER PUBLICATIONS

PCT International Search Report dated May 6, 2022, PCT Patent Application No. PCT/US2021/059272.
PCT Written Opinion of the International Searching Authority dated May 6, 2022, PCT Patent Application No. PCT/US2021/059272.
PCT International Search Report dated Oct. 12, 2023, PCT Patent Application No. PCT/US2023/019099.
PCT Written Opinion of the International Searching Authority dated Oct. 12, 2023, PCT Patent Application No. PCT/US2023/019099.

* cited by examiner

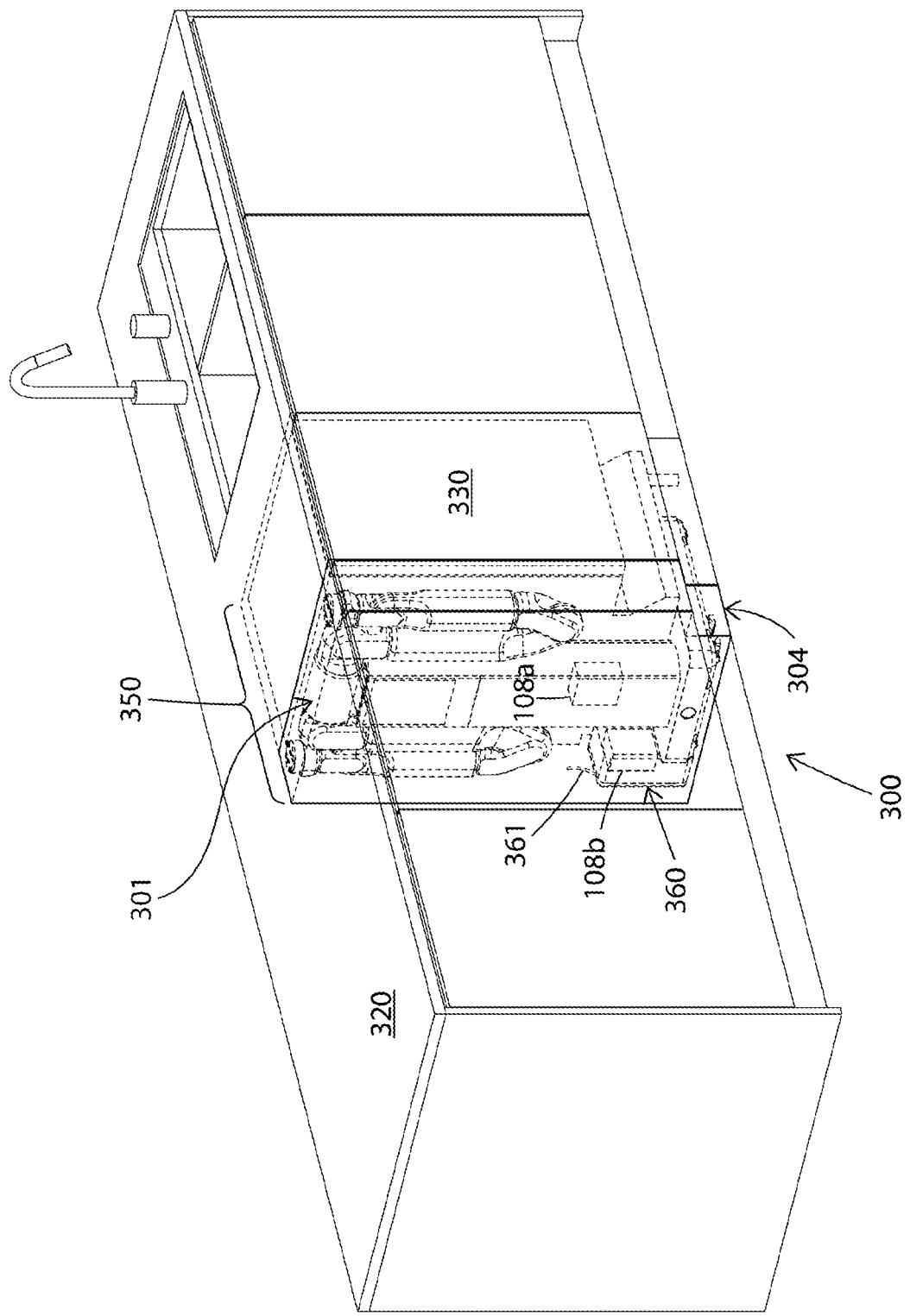

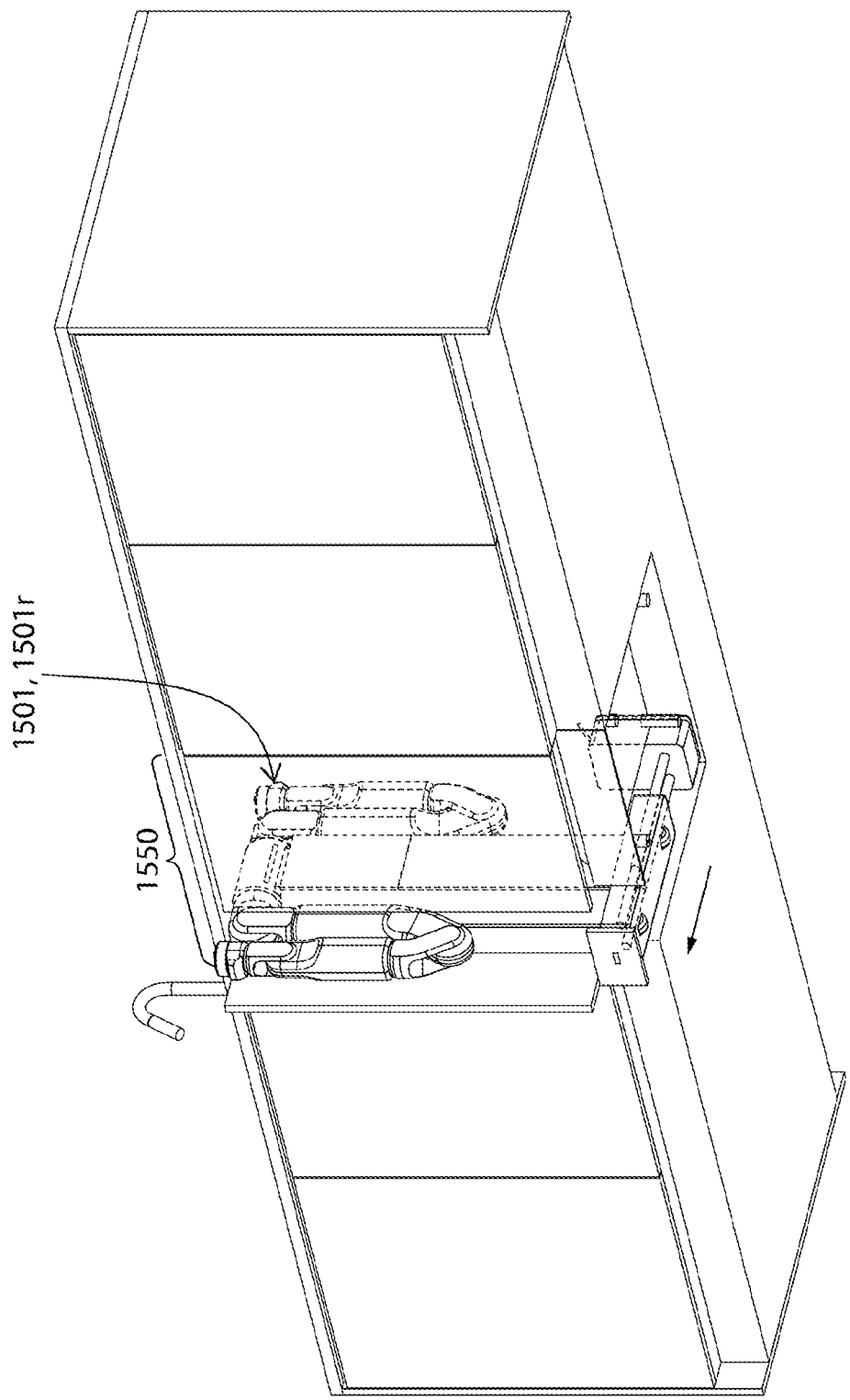

Fold Flowchart

SYSTEM AND METHOD FOR A COLLAPSIBLE SELF-STORING ROBOT

FIELD

The disclosure generally relates to robotic systems and methods for operating them.

BACKGROUND

Various tasks lend themselves to automation. Stand-alone autonomous robots may be used to perform them. Some tasks, however, may require an autonomous robot to reach and manipulate objects located in a dynamic and continually changing operating environment. In some instances, the operating environment also imposes a set of optimal physical operating dimensions for the robot, for example, a minimum height and a maximum reach in order to perform the task at hand, and the robot must be capable of assuming a configuration to meet those physical operating constraints. In those circumstances, storing the robot when not in operation can become a challenge, particularly when the optimal physical operating dimensions are larger than whatever storage space is available. Faced with such constraints and challenges, it is desirable to have a self-storing robot that can automatically transform its geometry into a compact configuration for self-storage when not in use, and then re-deploy itself into a fully-operational, deployed geometry configuration suitable to performing the tasks at hand.

BRIEF DESCRIPTION OF THE DRAWINGS

Aspects of the present disclosure are illustrated by way of example and are not limited by the accompanying figures for which like references indicate elements.

FIGS. 3A, 3B and 3C illustrate one use case of the robotic system disclosed herein.

FIGS. 15A-15E illustrate another alternative embodiment of a collapsible robot base for the robotic system presently disclosed.

DETAILED DESCRIPTION

Figure 1A:
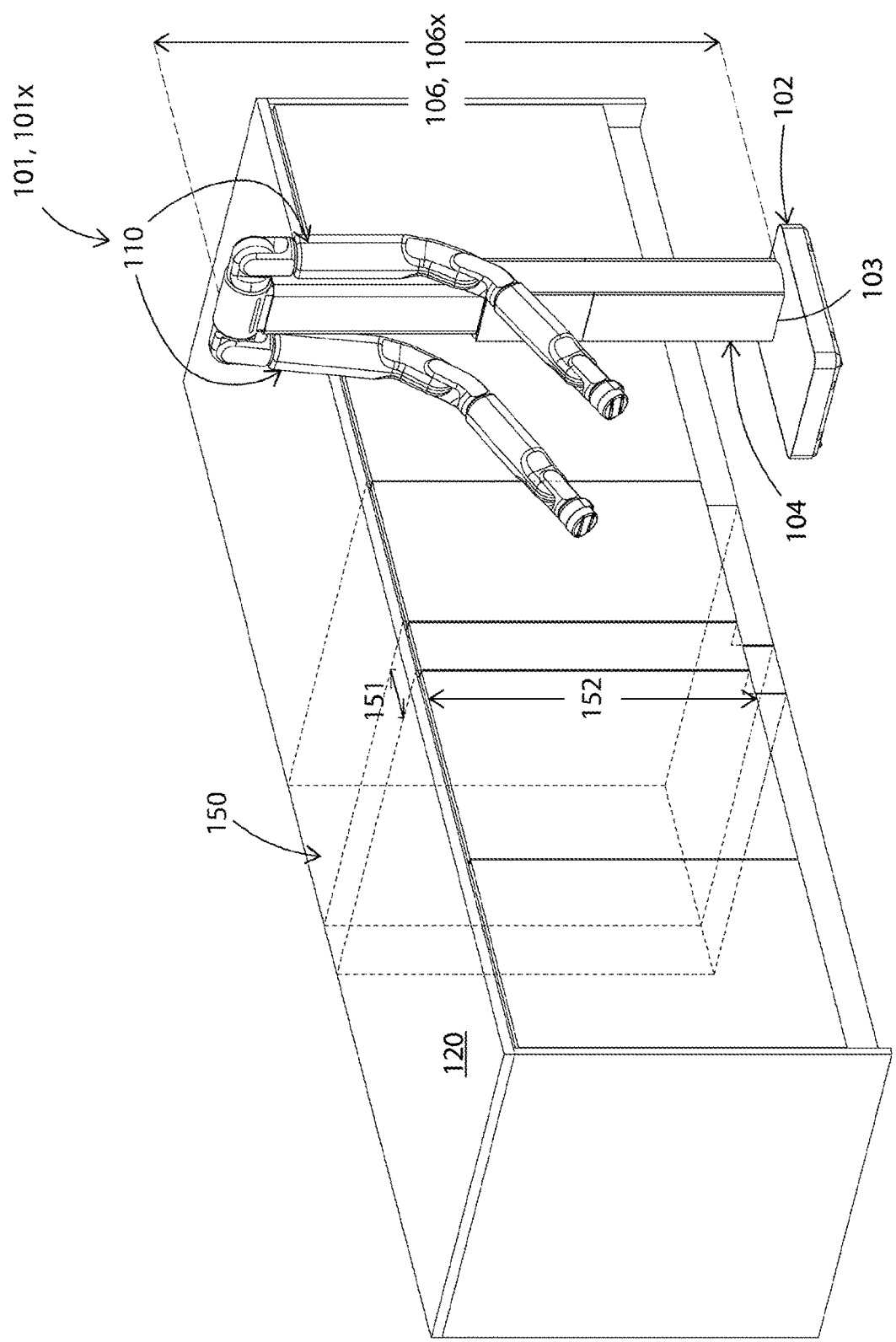
FIGS. 1A, 1B, 1C, 1D and 1E illustrate one embodiment of a collapsible self-storing robot of the robotic system described herein.

The present disclosure generally relates to robotic systems and associated software and, in particular, a collapsible robot capable of folding itself into a compact configuration and then self-storing in a compact confined space when not in use.

A collapsible self-storing robot presently disclosed includes an adjustable body and one or more adjustable arms. It can extend its adjustable body upward and away from its support base and can also extend one or more adjustable arms outward and away from a main axis of its adjustable body. In this manner, the robot can adjust its three-dimensions to a height and reach suitable for performing tasks at or near the level of a worksurface designed for use by people, such as a kitchen countertop, so that the robot can engage in a variety of tasks at varying heights, and, upon completion of its tasks, collapse to a compact configuration and self-store in a compact confined space, such as a kitchen cabinet.

The robotic system architecture also includes control circuitry that allows the system to receive communication signals and generate control signals effecting coordinated and collision-free movements, such as coordinated, automatic retractions and extensions of the robotic arms, together with extension, retraction and translation movements of the adjustable body in a home-use environment, such as a residential kitchen. The communication signals may include, for example, one or more activation signals communicated to the robotic system to initiate a controlled self-collapse of the robot into a compact geometry that permits self-storage within a kitchen cabinet.

In order to accomplish desired objectives, the robotic system presently disclosed employs sensor hardware, motor hardware, control circuitry, and associated software that permits a collapsible robot to operate in a "volume-aware" mode—i.e., able to sense its dimensions with respect to the dimensions of its operating space, sense the position and movement of its arms and base within that operating space, and sense any immediate constraints created or introduced by other objects also within its operating space, in a real-time mode that permits coordinated and collision-free movements in and through its operating space. In particular, such volume-aware mode allows the collapsible robot to self-extend, perform tasks, self-retract, and self-store in a compact, confined space positioned beneath a worksurface designed for human use.

The collapsible robot described herein is able to obtain a configuration large enough to perform automated tasks at or around the level of a worksurface and, when those tasks are completed or upon a user command signal, to retract its arms and body into a fully-retracted or other compact configuration, and then self-store in that compact configuration below the worksurface. In one embodiment, for example, the collapsible robot is designed to (a) self-deploy from a kitchen cabinet storage location positioned below a kitchen countertop, so that it may perform a kitchen task at or above the level of the kitchen countertop (such as, e.g., dishwashing above a kitchen sink), and then (b) self-collapse back into a compact geometry that permits self-storage back into the kitchen cabinet storage location upon completion of the kitchen task, or upon command of a user. In some embodiments, the kitchen cabinet storage location may be one located and dimensioned for a standard-sized residential dishwasher, and the robot shares that kitchen cabinet space with a compact dishwasher. In these embodiments, the robot is designed to stand upright on a floor support or base and operate alongside a compact dishwasher: it may load the compact dishwasher with dishes, start a wash cycle for the dishes loaded in the compact dishwasher, and then remove the washed dishes from the compact dishwasher and place them in another location. In some embodiments, the base may be mobile, using wheels and casters to displace the kitchen robot, or it may be mounted on one or more telescoping rails that slide below the kitchen countertop, to permit self-deployment and self-collapse of the robot, whose retractable arms (having grippers) are extendable to be within reach of both a sink and a dishwasher. In some embodiments, the robot can operate the compact dishwasher via wireless communications and an application programming interface (API). In some embodiments, the kitchen countertop is a residential kitchen countertop.

Particular embodiments of the robotic system of the present disclosure will now be described with reference to the Figures.

Figure 1B:
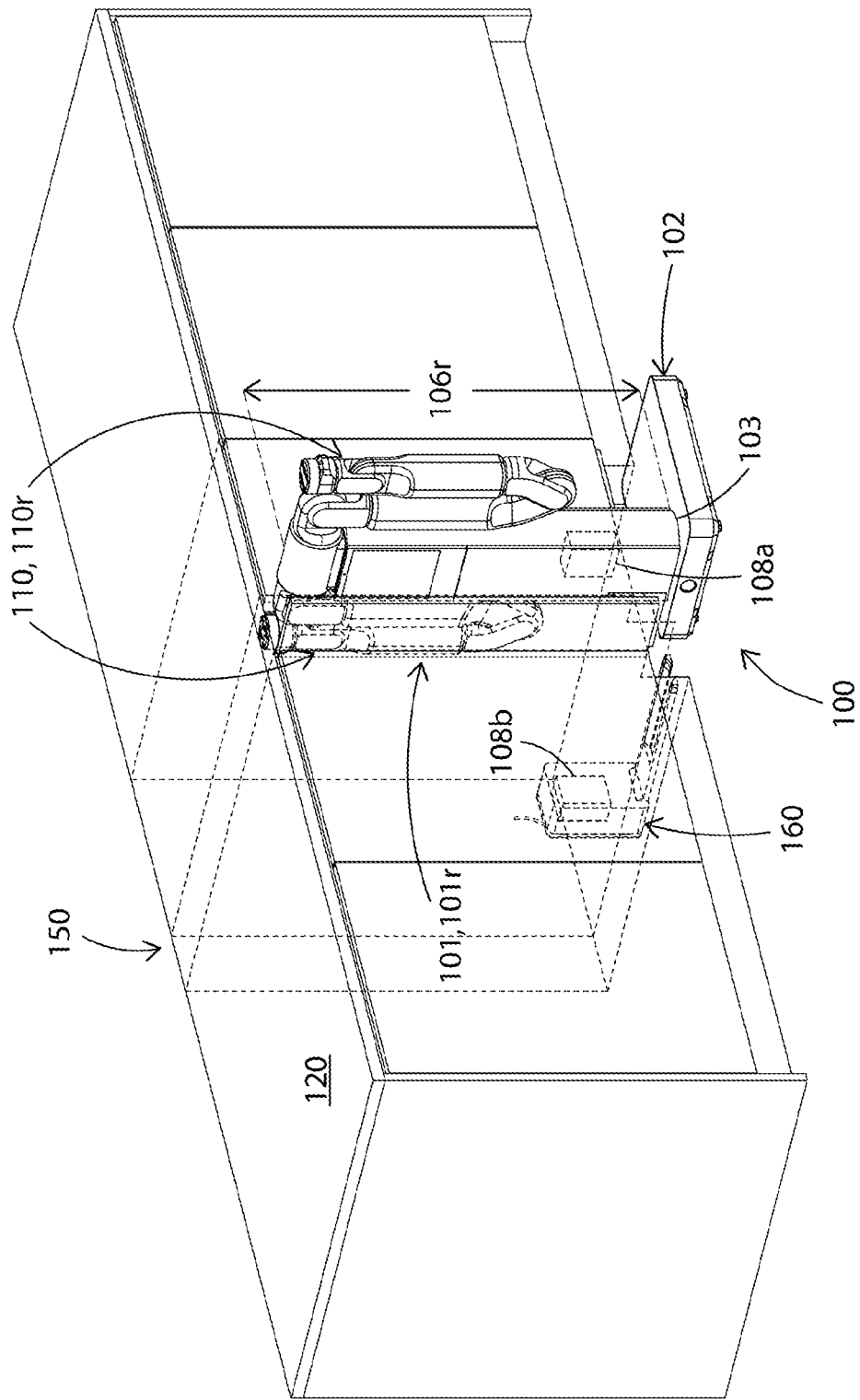
Figure 1C:
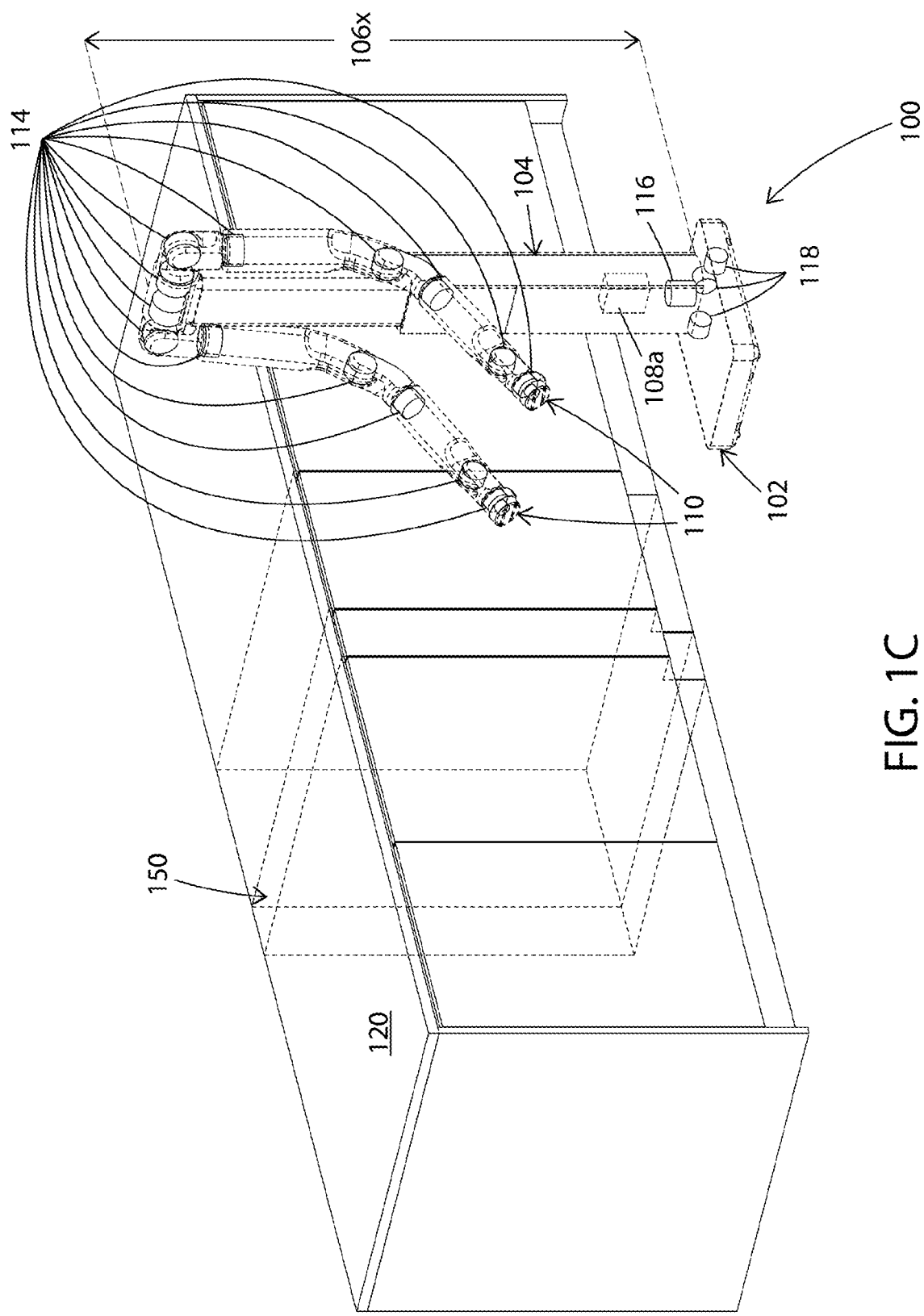

FIGS. 1A, 1B, 1C, 1D and 1E illustrate one embodiment of a collapsible self-storing robot of the robotic system described herein. FIG. 1A a depicts collapsible robot 101 in a deployed geometry 101x and ready to perform a variety of tasks at a worksurface 120. FIG. 1B illustrates the same embodiment of collapsible robot 101 in a retracted, compact geometry configuration 101r and ready to self-store in a storage location, such as an enclosure 150 positioned below worksurface 120. As shown in FIGS. 1A, 1B and 1C, enclosure 150 defines a storage location bounded by an interior height 152 smaller than the fully-extended body height 106x of adjustable body 104, and an interior width 151 narrower than a fully-extended arm configuration (not shown). In some embodiments, enclosure 150 may be a partial enclosure, i.e., having no door; in other embodiments, such as those shown in FIGS. 1A-1C, enclosure 150 includes a cabinet door and automatic toe kick (both of which are further described below). In some embodiments, and as shown for example in FIGS. 1A and 1B, adjustable body 104 may comprise a plurality of telescoping components; in other embodiments, and further described below, adjustable body 104 may comprise a plurality of articulated parts.

In the embodiments shown, collapsible robot 101 has a base 102 and an adjustable body 104 having an adjustable height 106 and a base end 103, the adjustable body 104 connected to base 102 at base end 103. FIG. 1A shows adjustable height 106 in a fully-extended configuration 106x. In some embodiments, and as shown in FIGS. 1A, 1B and 1C, collapsible robot 101 also includes a set of retractable robotic arms 110 coupled to adjustable body 104. (As used herein the term "set" refers to one or more.)

As shown in FIG. 1B, robotic system 100 also includes control circuitry 108a/108b, which is described in further detail below. Generally, in the embodiments described herein, control circuitry 108a/108b is configured to initiate collision-free ingress and egress of collapsible robot 101 into and out of enclosure 150, and to coordinate a set of collision-free movements of adjustable body 104 and robotic arms 110, enabling transformations between retracted, a compact geometry configuration 101r of the collapsible robot and an extended, deployed geometry configuration 101x outside of the enclosure 150. In some embodiments, control circuitry 108a/108b may reside entirely inside collapsible robot 101; in other embodiments, some elements of control circuitry 108a/108b may reside in another location, such as, for example, integrated with a powered docking station 160 residing in enclosure 150, and/or as further described below.

Referring to FIG. 1C, robotic system 100 includes a first set of motors 114 coupled to the set of retractable robotic arms 110. The set of motors 114 is configured to extend and retract the set of retractable robotic arms 110 within a range of motion bounded by a fully-extended arm configuration (not shown) and a fully-retracted arm configuration (as shown, for example, in the compact geometry configuration 110r of FIG. 1B). In some embodiments, cable-driven motors may be included in first set of motors 114, so that the total weight of the set of motors 114 may be displaced from retractable robotic arms 110 onto adjustable body 104 or base 102; in such embodiments, a set of associated cables may be configured to connect motors to moving components of the robotic arms. In some embodiments, multiple linear actuators may also be used. In some embodiments, rotational motors may be used.

In some embodiments, and as shown in FIG. 1C, collapsible robot 101 also includes a second set of motors 116 connected to adjustable body 104 and configured to extend and retract adjustable body 104 within a range bounded by a fully-extended body height (as illustrated in FIGS. 1A, 101x) and a fully-retracted body height (as illustrated in FIG. 1B, 101r). In some embodiments, the second set of motors 116 is further configured to pivot adjustable body 104 about an axis perpendicular to base 102 (and as further described below). In some embodiments, and as shown in FIG. 1C, the second set of motors 116 is located at the base end 103 of adjustable body 104 and is also connected to base 102. In the embodiment shown in FIG. 1C, base 102 is a mobile base, which comprises a third set of motors 118 connected to base 102 and configured to translate and rotate base 102 with respect to enclosure 150 (including within the interior of enclosure 150). Further details of a mobile base embodiment are described below and with respect to FIG. 2B.

Figure 1E:
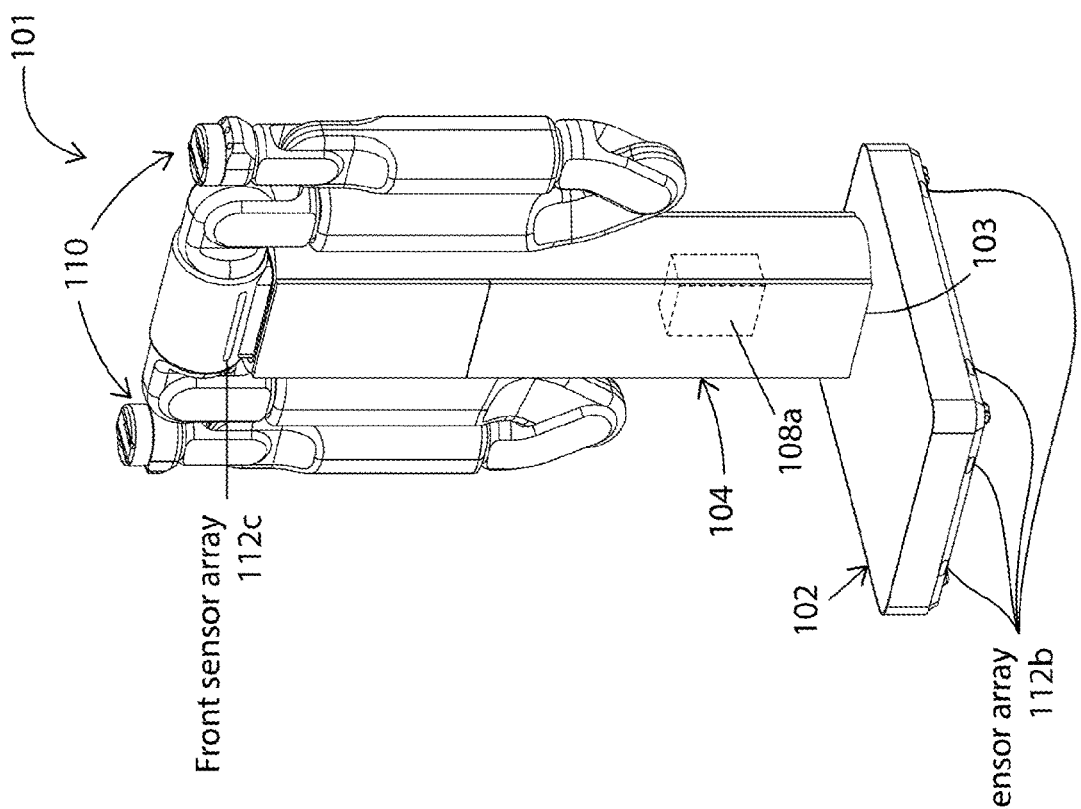
Figure 1D:
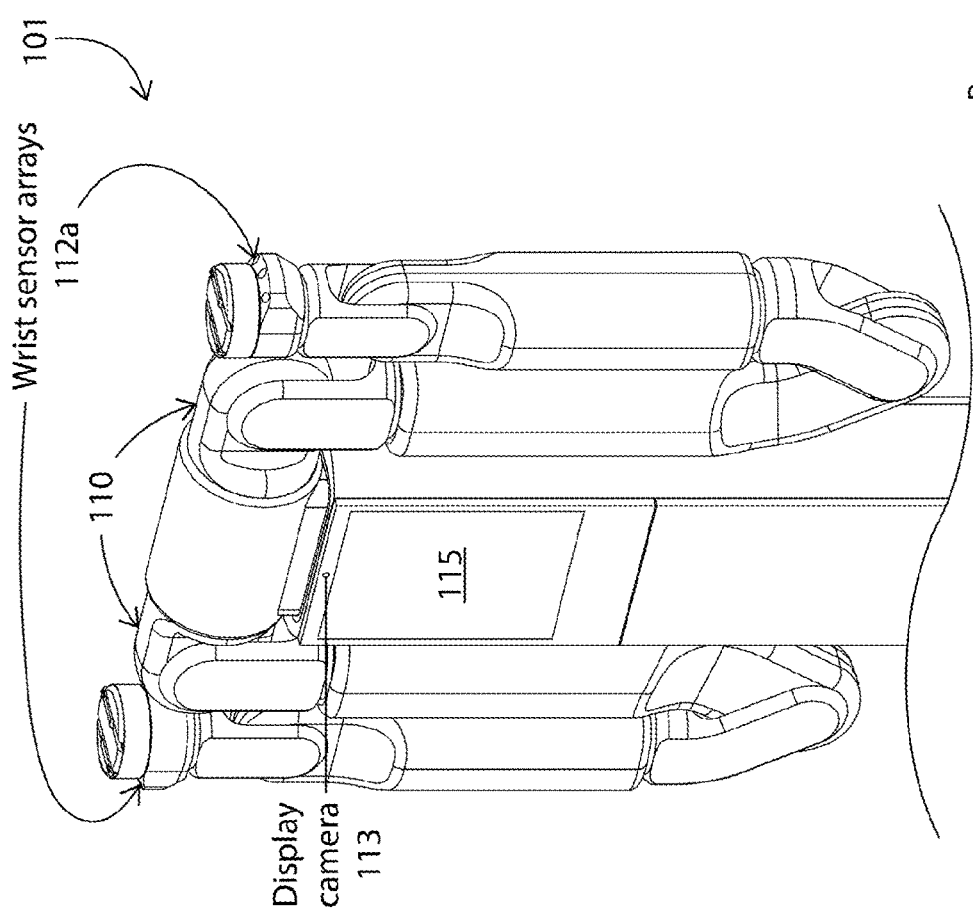

Collapsible robot 101 also includes a set of sensors for proprioception. FIGS. 1D and 1E illustrate one embodiment for various optional placements of the set of sensors connected to retractable robotic arms 110 (e.g. 112a), base 102 (e.g. 112b), and adjustable body 104 (e.g. 112c). In some embodiments, the set of sensors for proprioception in collapsible robot 101 comprises a set of cameras, which may include one or more 2-dimensional cameras, and/or one or more 3-dimensional cameras. In some embodiments, one or more LiDAR sensors may be used for depth perception. In some embodiments, one or more time-of-flight sensors and/or one or more depth sensors may be used to assist collapsible robot in avoiding collisions while performing tasks in its operating environment, and/or while docking at powered docking station 160 located inside enclosure 150 (as further described below). In some embodiments, one or more proximity sensors may be used, such as those used on automobiles to assist in parking.

FIG. 1D is an enlarged view of one embodiment of collapsible robot 101 as viewed from the back side of adjustable body 104, while FIG. 1E is an enlarged view of one embodiment as viewed from the front side of adjustable body 104. Referring to FIG. 1D, a plurality of wrist sensors 112a are located at gripper ends of retractable robotic arms 110. In some embodiments, the plurality of wrist sensors 112a includes at least one LiDAR sensor. FIG. 1D also shows an embodiment that includes a camera 113 mounted to adjustable body 104 on a backside and distal to base end 103, and a user interface 115 (e.g., a touch screen) mounted on a user-accessible area of adjustable body 104 (for example, on the backside of adjustable body 104, as shown). In some embodiments, camera 113 is an optional element that enables a user to monitor remotely the position of the collapsible robot in its operating environment. In some embodiments, user interface 115 comprises a touch screen configured to enable manual entry of user commands to collapsible robot 101 and/or manual entry of operating parameters and/or settings used by collapsible robot 101.

FIG. 1E illustrates additional optional placements of a plurality of sensors coupled to collapsible robot 101, as viewed from a front side of adjustable body 104. In the embodiment shown, collapsible robot 101 includes a front sensor array 112c coupled to adjustable body 104 distal to base end 103, and a base sensor array 112b integral with base 102 and further described below. In some embodiments, front sensor array 112c comprises a plurality of two-dimensional cameras and at least one LiDAR sensor and is configured to assist collapsible robot 101 in navigating through its operating environment and manipulating objects while performing various tasks. In some embodiments, base sensor array 112b comprises at least two time-of-flight and/or other proximity sensors per side of base 102 and is configured to detect obstructions and assist in avoiding collisions of base 102 with objects on the floor. In some embodiments, base sensor array 112b includes one or more LiDAR sensors for depth perception.

In the embodiment shown, control circuitry 108a (FIG. 1E) is electrically coupled to base 102, the sets of sensors 112a, 112b and/or 112c (FIGS. 1E and 1D), the sets of motors 114, 116, and 118 (FIG. 1C), and is configured to generate (1) a first set of control signals operable to initiate a collision-free body retraction of adjustable body 104 to fully-retracted body height 106r (FIG. 1B), and to coordinate a collision-free collapse of the set of retractable robotic arms 110 into a fully-retracted arm configuration 110r (FIG. 1B), and (2) a second set of control signals to initiate and conduct a collision-free self-storage of collapsible robot 101 in compact geometry configuration 101r within enclosure 150.

Sensor and motor placements, their functionalities, the total number of sensors and motors included in a collapsible self-storing robot may vary, depending upon expected or actual uses of the robotic system and the specific types of tasks it is designed to perform.

Figure 2B:
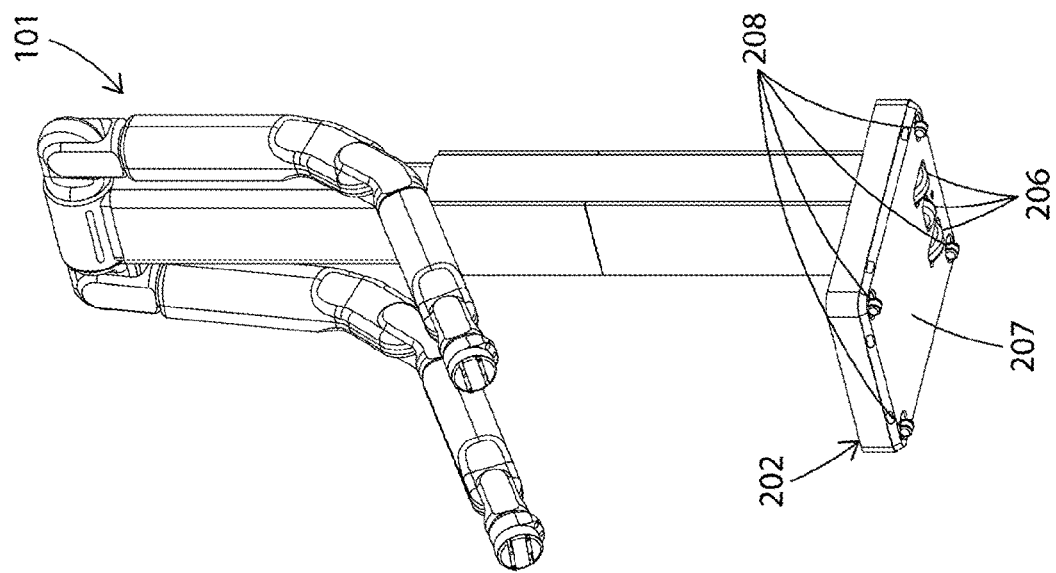
FIGS. 2A, 2B and 2C illustrate one embodiment of a base component of the collapsible self-storing robot illustrated in FIGS. 1A, 1B and 1C.
Figure 2A:
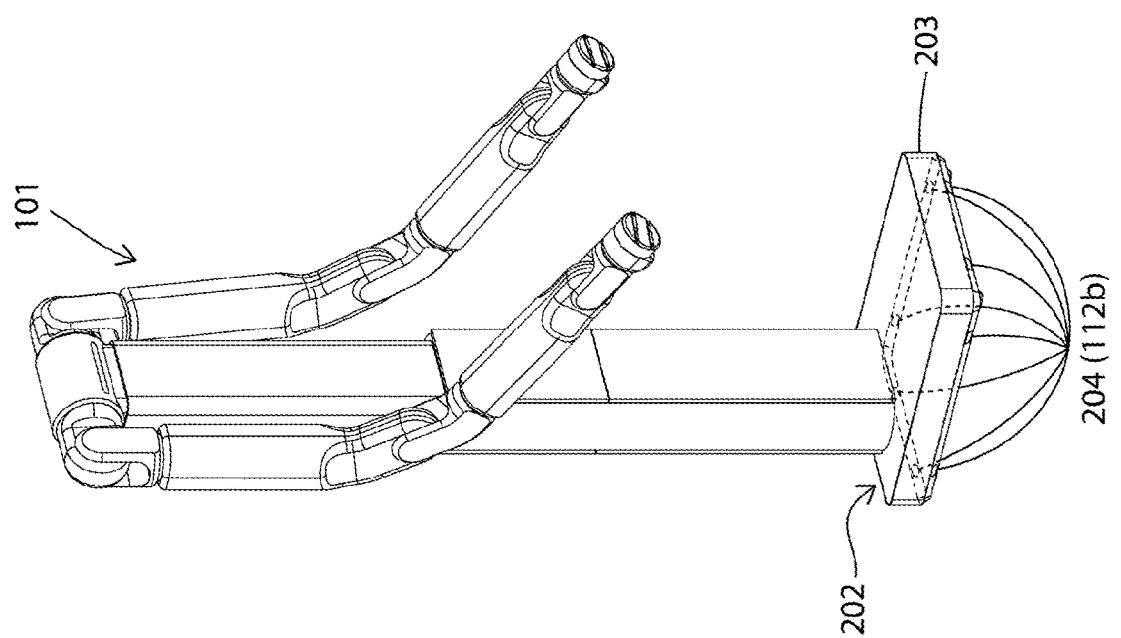

FIGS. 2A and 2B illustrate one embodiment of base 102 for the collapsible robot embodiment of FIGS. 1A, 1B and 1C. In this embodiment, base 102 is a mobile base 202 configured to permit untethered movements of the adjustable body 104 relative to enclosure 150. In some embodiments, and as illustrated in FIG. 2A, mobile base 202 comprises a base sensor array 204 (see also FIG. 1E, 112b), comprising a plurality of sensors positioned along an edge 203 of mobile base 202 and configured to sense an oncoming collision between the mobile base 202 and various objects in its operating environment, such as, for example, physical boundaries of enclosure 150 (e.g. walls, doors, and objects located within enclosure 150). In some embodiments, base sensor array 204 may include one or more proximity sensors, such as infrared and photocell sensors used in some autonomous vacuum cleaners, and/or one or more time-of-flight sensors.

In some embodiments, and as illustrated in FIG. 2B, mobile base 202 includes: (a) a set of motorized wheels 206 (for example, as shown in this embodiment, omni wheels) positioned on a bottom surface 207 of mobile base 202 and configured to orient mobile base 202 with respect to enclosure 150 and/or environmental obstacles (not shown); (b) a set of caster wheels 208 positioned on bottom surface 207 of mobile base 202 and configured to facilitate stable movement of mobile base 202 relative to enclosure 150, and/or while roaming through an operating environment.

Figure 2C:
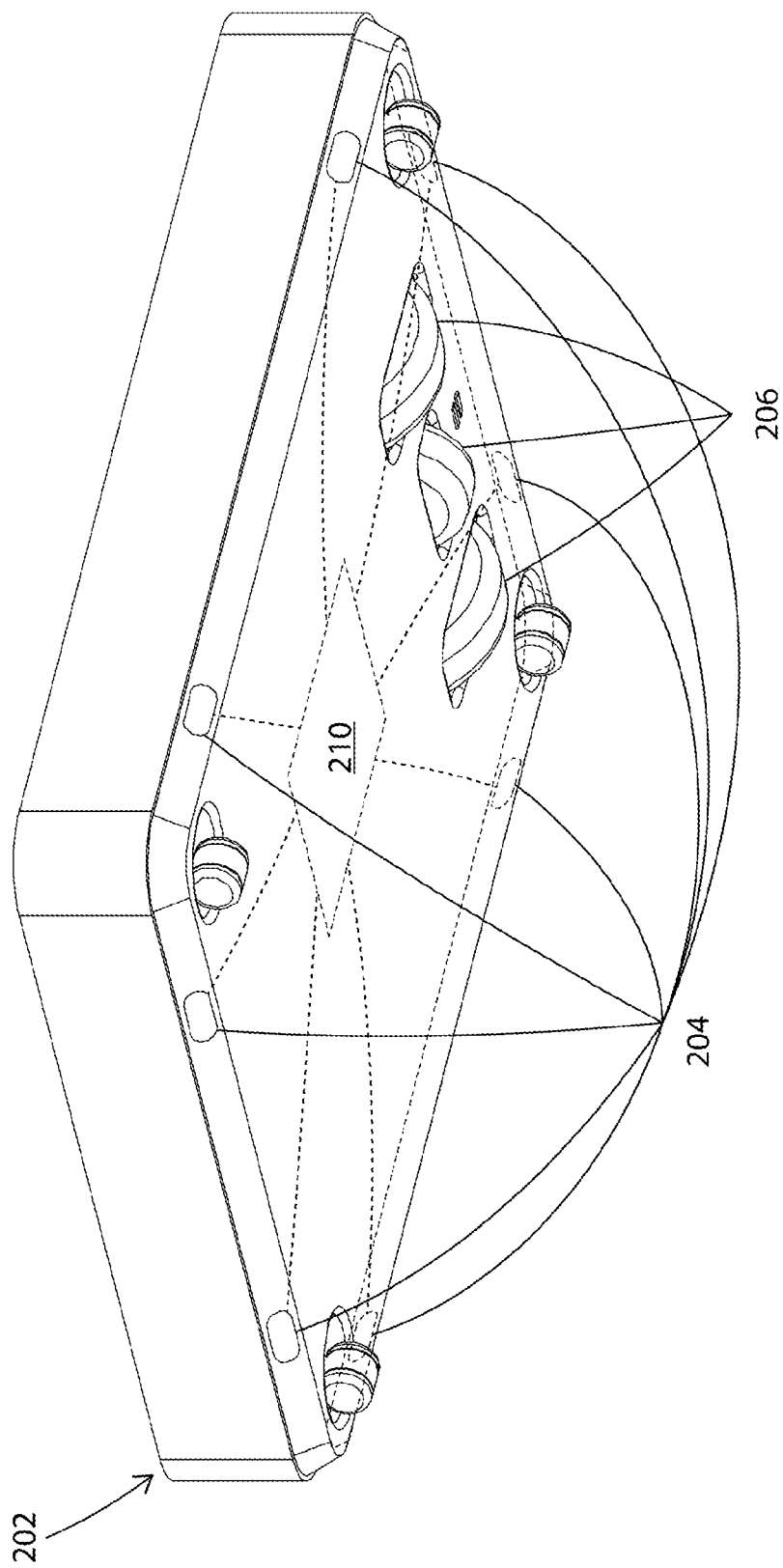

In addition, and as illustrated in FIG. 2C, mobile base 202 also includes base control circuitry 210, which is connected to the set of motorized wheels 206 and to the base sensor array 204, and generates a set of sensory feedback control signals based on output from sensor array 204 to drive the set of motorized wheels 206 so as to avoid an oncoming collision between mobile base 202 and the enclosure 150 or other objects in its operating environment, and to align mobile base 202 with enclosure 150. While the embodiments shown include specific configurations and number of omni wheels 206, caster wheels 208, and base sensors in the base sensor array 204, other configurations and numbers of these elements may be used. In some embodiments, another type of motorized wheel may be used as an equivalent functional alternative to one or more omni wheels 206 and/or one or more caster wheels 208; for example, two motorized wheels may be used as a differential drive.

Figure 3A:
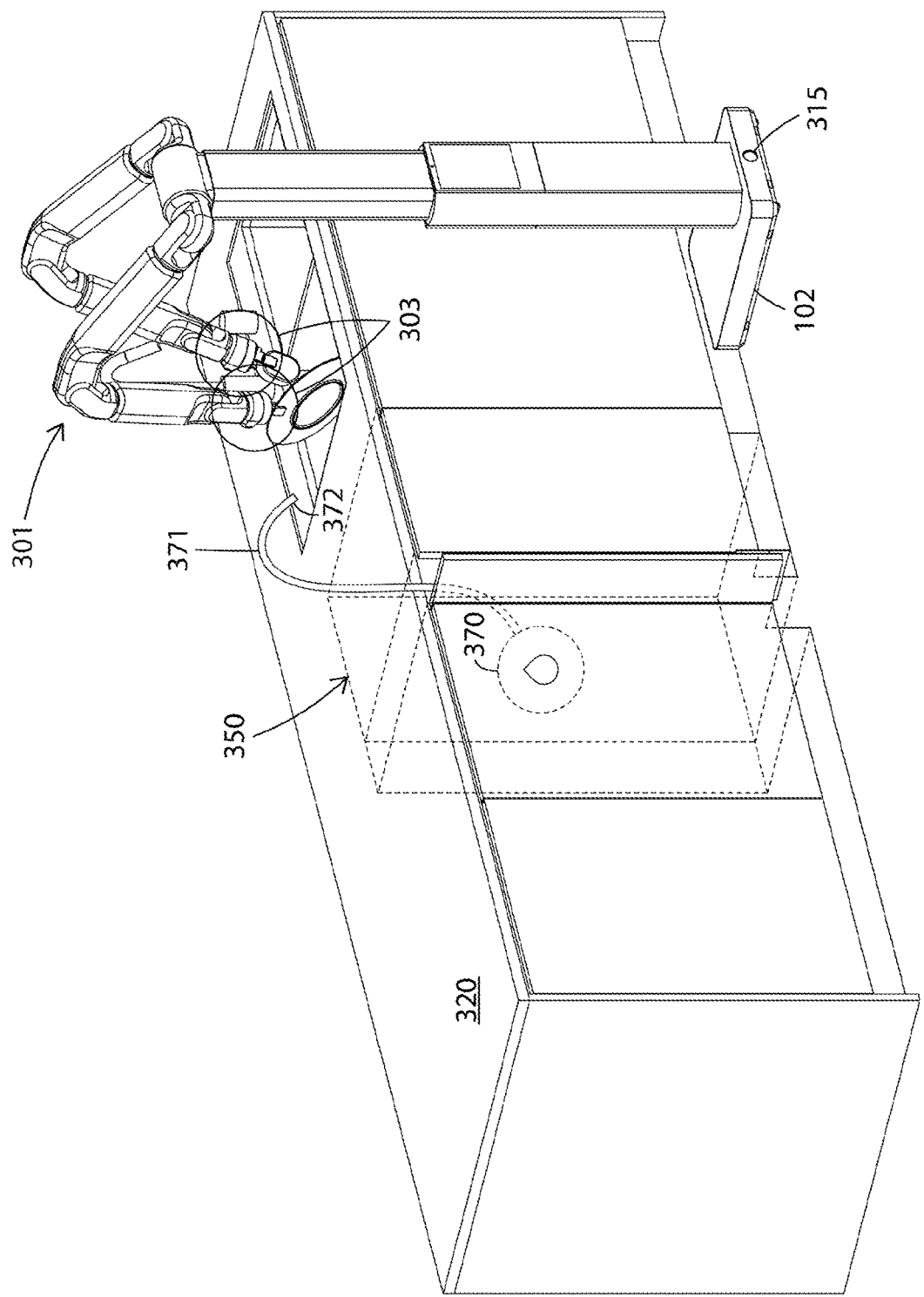
Figure 3C:
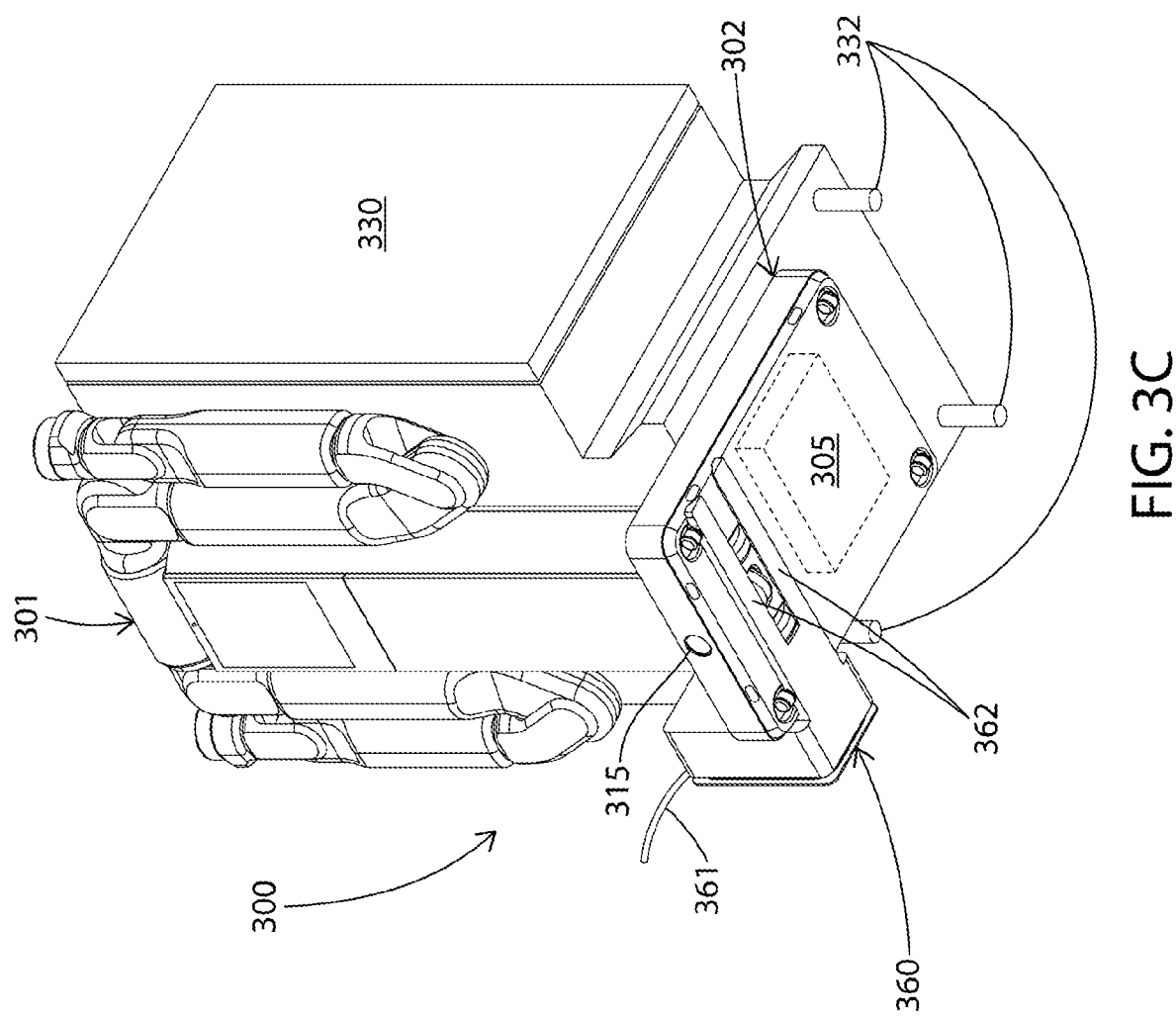

FIGS. 3A, 3B and 3C illustrate one use case of the robotic system disclosed herein. In this use case, robotic system 300 comprises a kitchen robot 301 designed to (a) self-deploy from a kitchen cabinet storage location 350 positioned below a kitchen countertop 320, so that it may perform a kitchen task at a height approximately at the level of kitchen countertop 320, such as, e.g., dishwashing above a kitchen sink (as shown in FIG. 3A), and then (b) self-collapse back into a compact geometry that permits self-storage back into kitchen cabinet storage location 350 (as shown in FIG. 3B) upon completion of the kitchen task, or upon command of a user. In some embodiments, kitchen robot 301 includes an emergency stop button 315.

As shown in FIG. 3A, kitchen robot 301 is one use case embodiment of collapsible robot 101. In this embodiment, kitchen robot 301 has two retractable robotic arms, each of which terminates in a set of grippers 303 designed to hold and manipulate dishes, utensils and other kitchen objects while transporting them, washing them, drying them, and/or loading them into and out of an automatic dishwasher. In one embodiment, kitchen robot 301 further comprises sets of sensors and motors as described above with respect to FIGS. 1C-1E: a front sensor array, a display camera, two wrist sensor arrays, each having two sensors, a base with a rectangular footprint and including a base sensor array comprising eight sensors (two sensors per side of the rectangular base); three omni wheels (two aligned parallel with the kitchen robot's frontside-to-backside axis, and the third aligned perpendicular to that axis); four caster wheels, one at each corner of the base. In this embodiment, at least twenty motors are included-eight motors per arm, effecting seven degrees of freedom and one for operating each the arm's gripper, three motors for omni wheels, and one motor for vertically adjusting height of the kitchen robot. This embodiment also includes a charging dock with a two-prong mechanical guide (as further described below).

When stored in a compact geometry configuration of the present disclosure, kitchen robot 301 conveniently stores itself below a residential kitchen countertop and adjacent to a power source, a water source, and a dishwasher, and in a compact space that takes advantage of kitchen cabinetry typically built and designed to accommodate a standard-sized automatic dishwasher, typically twenty-four inches in width. When self-stored in accordance with the present disclosure, kitchen robot 301 is conveniently and attractively concealed behind a kitchen cabinet door that blends in with the rest of the kitchen decor. In some embodiments, the compact geometry configuration of kitchen robot 301 assumes a narrow, elongated rectangular shape with compact height low enough to allow the robot to slide below kitchen countertop 320, and a width of about six to seven inches.

In some embodiments, and referring to FIG. 3A, kitchen robot 301 is designed to stand upright on a floor support or base 102 and operate alongside a compact dishwasher 330 (shown in FIG. 3B); it may load compact dishwasher 330 with dishes, start a wash cycle for the dishes loaded in compact dishwasher 330, and then remove the washed dishes from compact dishwasher 330 and place them in another location. In some embodiments, kitchen cabinet storage location 350 may include a connector 370 coupled to a source of water; connector 370 may include a hose 371 with a distal end 372, providing kitchen robot 301 an ability to manipulate hose 371 at distal end 372 while performing a dishwashing task above kitchen countertop 320. Kitchen robot grippers 303 are compatible with manipulating wet and soapy objects.

In some embodiments, and as shown in FIG. 3B, kitchen cabinet storage location 350 may be dimensioned such that it can store simultaneously both kitchen robot 301 and compact dishwasher 330. Thus, in some embodiments, robotic system 300 is configured to self-store kitchen robot 301 in a compact geometry configuration adjacent to compact dishwasher 330, which is also stored within kitchen cabinet storage location 350. In one embodiment, kitchen cabinet storage location 350 is of a height, depth and width specifically intended to house a standard size dishwasher, so that an existing kitchen with a standard size dishwasher in cabinet storage location 350 can be retrofitted with the robotic system described herein in combination with a compact dishwasher in the cabinet storage location 350. A powered docking station 360 is also located within kitchen cabinet storage location 350, creating a home bay (or "nook") 304 for the robotic system 300; powered docking station 360 includes a power source interface 361 for electrically coupling robotic system 300 with a power source (not shown), thereby enabling charging of a rechargeable battery 305 (not shown) of kitchen robot 301. In some embodiments, robot control circuitry 108a (here shown integral with kitchen robot 301) or home bay control circuitry 108b (here shown integral with powered docking station 360) may include a wireless communication link (e.g., WiFi, Bluetooth, etc.) between robotic system 300 and compact dishwasher 330, enabling robotic system 300 to communicate a plurality of dishwasher operation signals wirelessly to compact dishwasher 330, and thereby control its operation (e.g., start, stop, suspend, delay, soap-free mode, partial clean, water-save mode, etc.). In some embodiments, kitchen robot 301 may be enabled to control a stand-alone, commercially-available dishwasher; in other embodiments, compact dishwasher 330 may be customized for specific use with kitchen robot 301.

FIG. 3C illustrates a bottom view perspective of kitchen robot 301 as docked on powered docking station 360 and adjacent to compact dishwasher 330 in a single ensemble. In the embodiment shown, the single ensemble (powered docking station 360, kitchen robot 301, and compact dishwasher 330) is configured to reside in kitchen cabinet storage location 350 dimensioned for a standard-sized residential dishwasher (i.e., an interior volume that can accommodate a dishwasher 24 inches wide, 24 inches deep, and 35 inches tall); however, other use cases exist. In the embodiment shown, base 302 of kitchen robot 301 slips below compact dishwasher 330. Dishwasher supports 332 are positioned below compact dishwasher 330 so as to provide a raised base for compact dishwasher 330 above an open gap for kitchen robot 301 to slide into for self-storage within kitchen cabinet storage area 350.

Figure 4A:
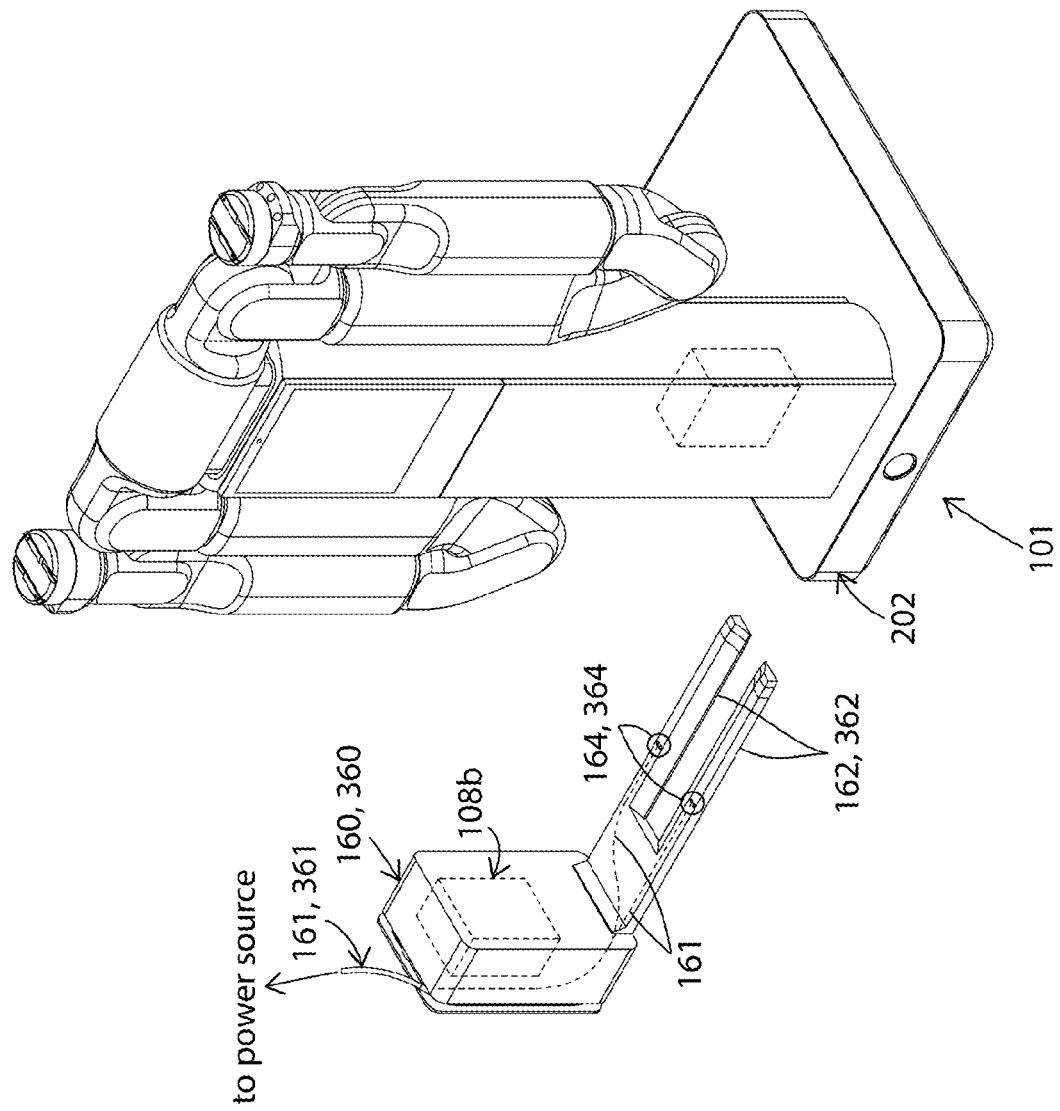
FIGS. 4A-4F provide views of various powered docking station embodiments of the robotic system described herein, including various methods for charging a rechargeable battery of a collapsible robot while docked at the powered docking station.

In the embodiment shown in FIG. 3C, kitchen robot 301 includes a rechargeable battery 305 connected to base 302, and powered docking station 360 is configured to charge rechargeable battery 305, as further described below. Powered docking station 360 also includes a power source interface 361 configured to be connected to a power source (not shown) so that kitchen robot 301 may be charged while stored. In some embodiments, power source interface 361 may include one or more charging pins 364 (as shown in FIG. 4A). In some embodiments, and as shown in FIG. 3C, powered docking station 360 includes a set of mechanical guide rails 362 configured to assist collision-free ingress and collision-free egress of kitchen robot 301 (or, more generally, collapsible robot 101 of FIG. 1B) into and out of kitchen cabinet storage location 350 (or, more generally, any storage location, such as enclosure 150 of FIG. 1B).

While these embodiments are described with respect to a specific use case for the robotic system of the present disclosure-namely, a self-storing collapsible kitchen robot use case—it will be understood by those of ordinary skill in the art that these embodiments, as well as others described herein, can be employed in many other contexts. The following descriptions of various embodiments for powered docking stations, enclosure doors and toe kicks, alternative base configurations, control circuitry, and collision-free plans are generally applicable for various use cases of the robotic system of the present disclosure.

Powered Docking Stations

Figure 4B:
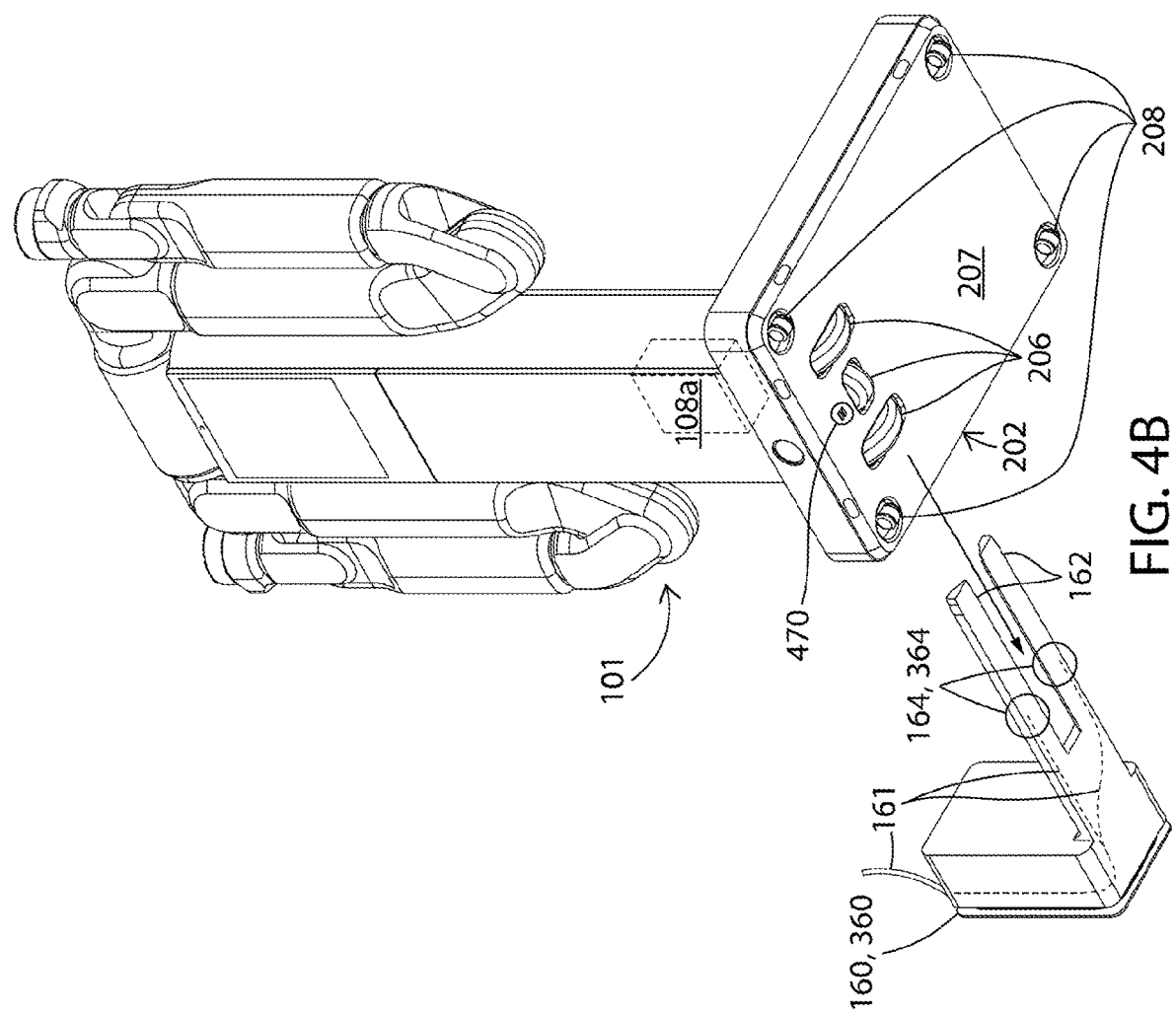
Figure 4C:
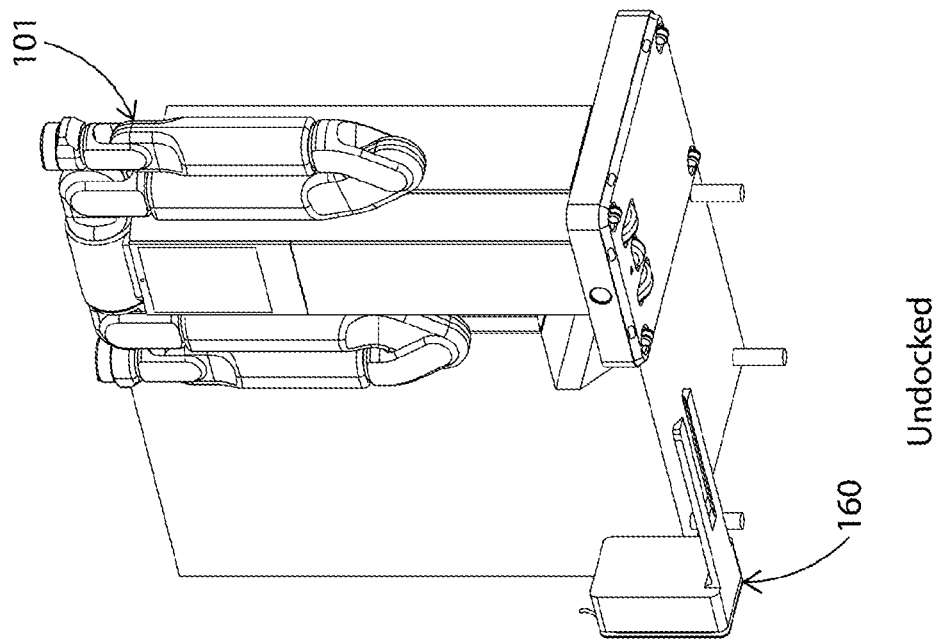
Figure 4C:
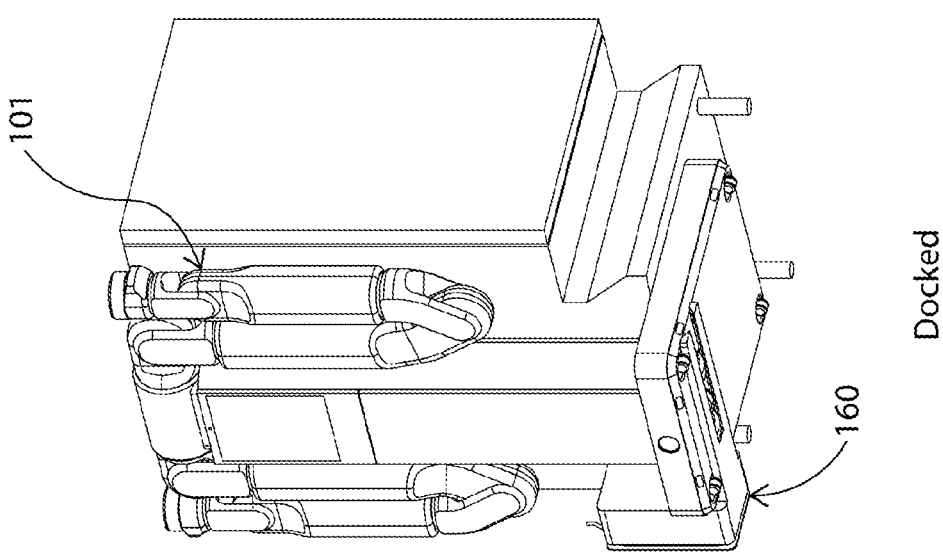
Figure 4D:
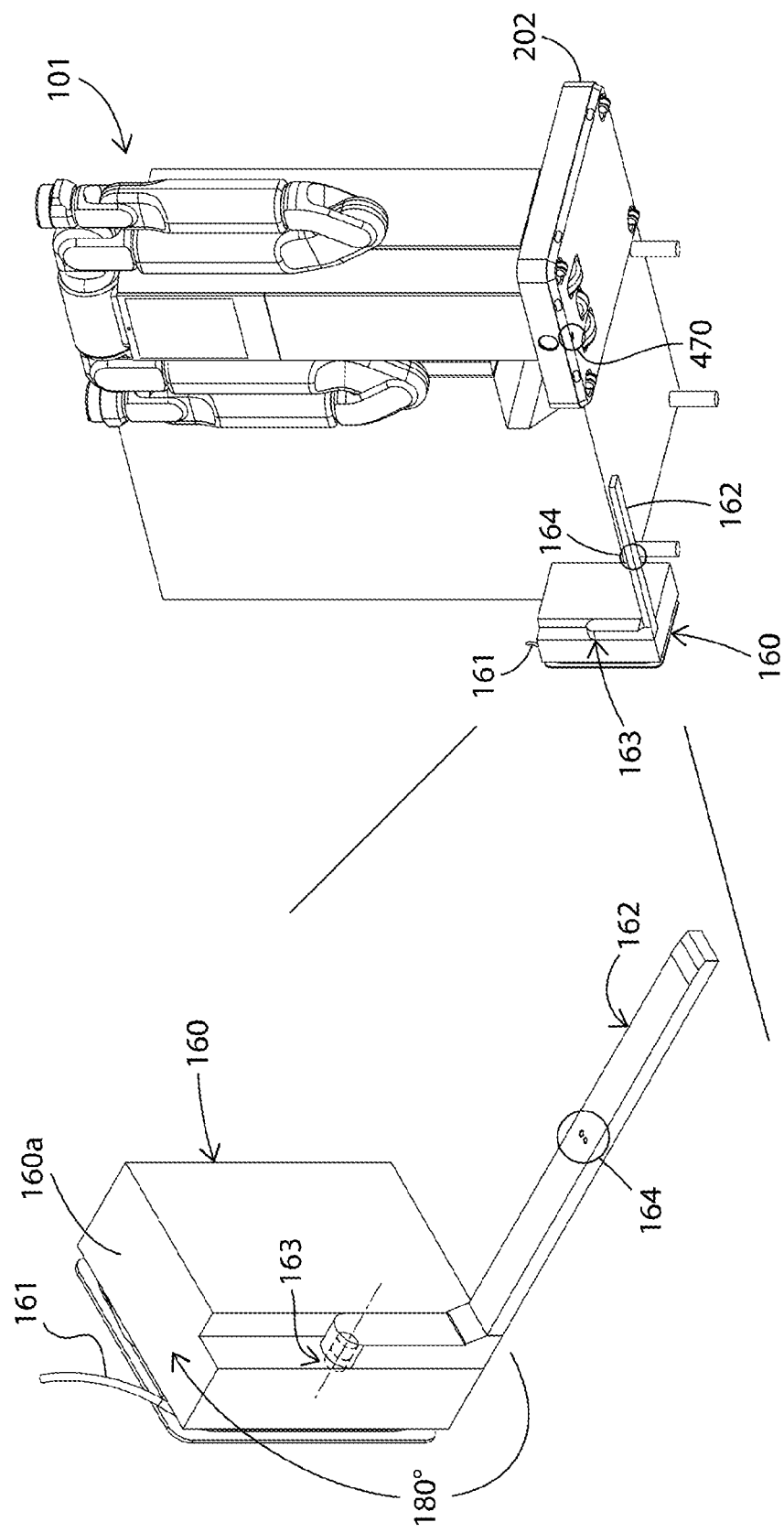
Figure 4E:
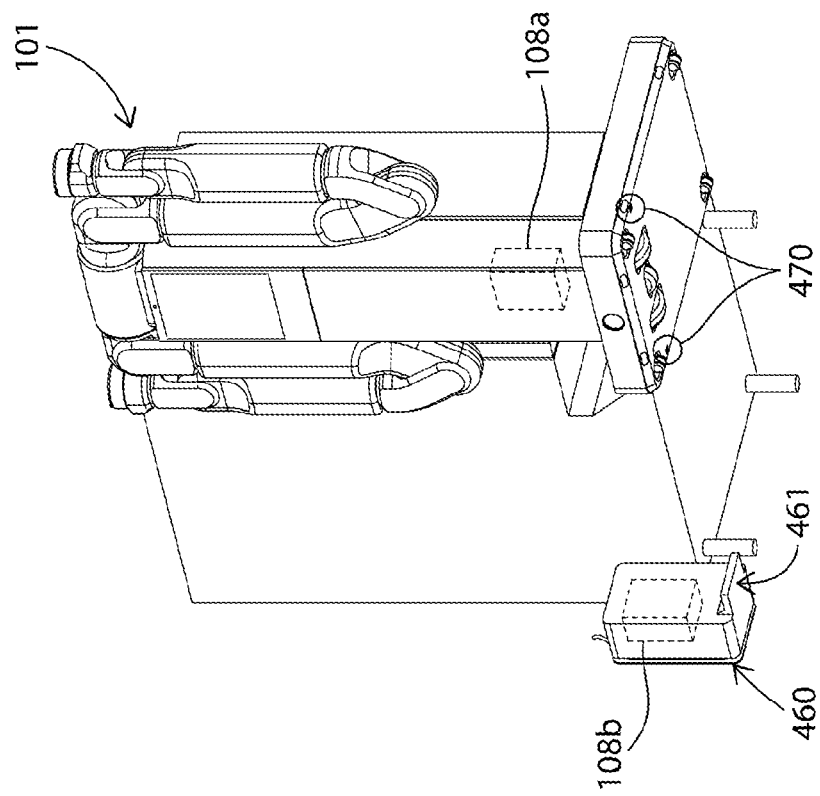
Figure 4E:
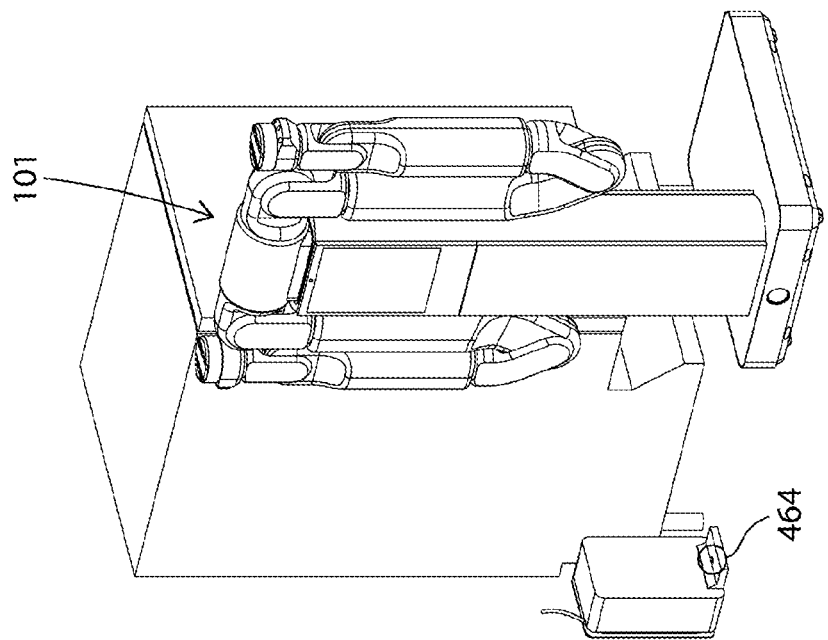
Figure 4F:
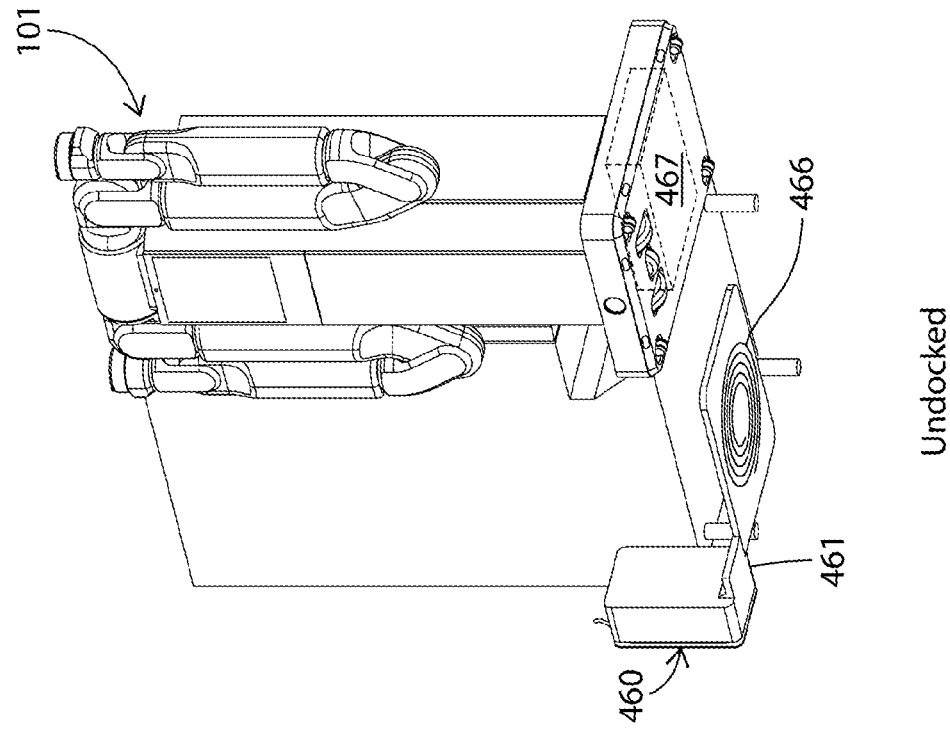
Figure 4F:
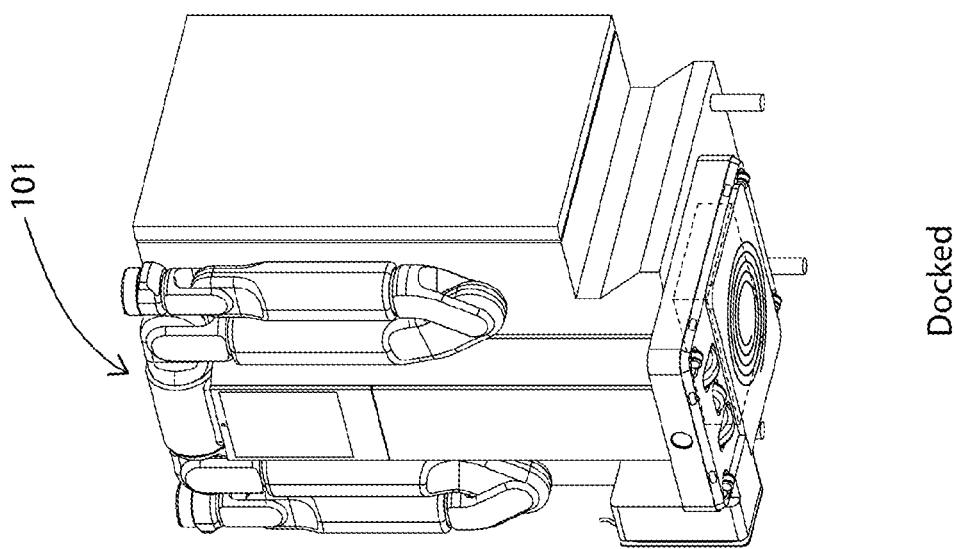

FIGS. 4A-4F provide views of various embodiments of powered docking station embodiments for the robotic system described herein, including various methods for charging a rechargeable battery of a collapsible robot while docked at the powered docking station. FIGS. 4A-4C provide close up and expanded views of powered docking station 160, as shown in FIG. 1B (and FIG. 3C, docking station 360 for kitchen robot 301). FIGS. 4D-4F show alternative methods and configurations.

Figure 5A:
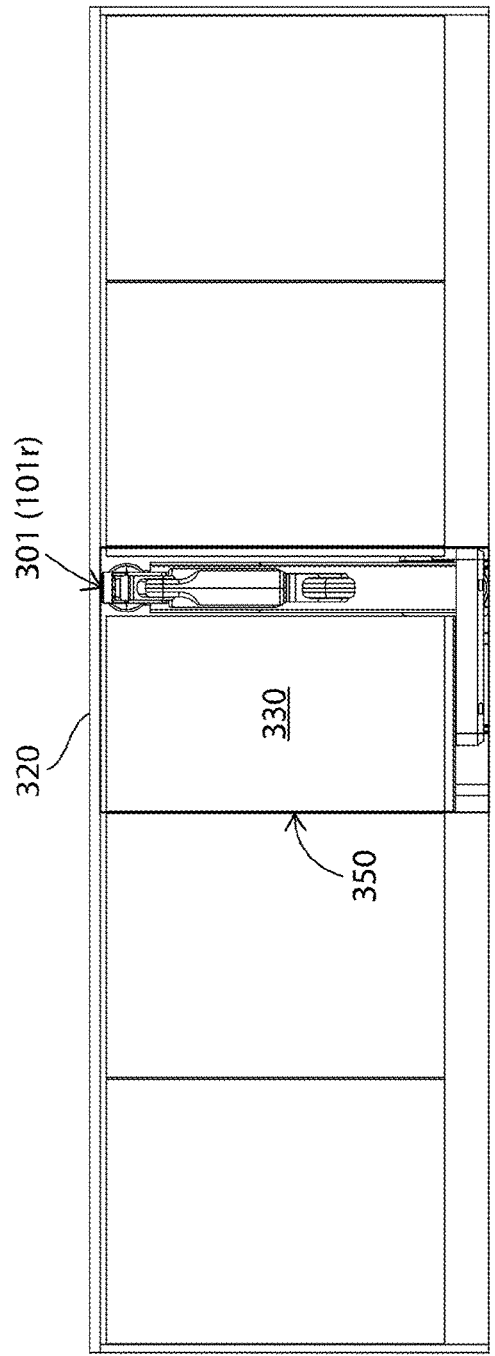
FIGS. 5A and 5B are cross-sectional views of a stored robotic system described herein, illustrating how the robotic system may fit into a confined compact space, such as a standard-sized automatic dishwasher storage area located below a kitchen countertop, while sharing that space with a compact dishwasher.
Figure 5B:
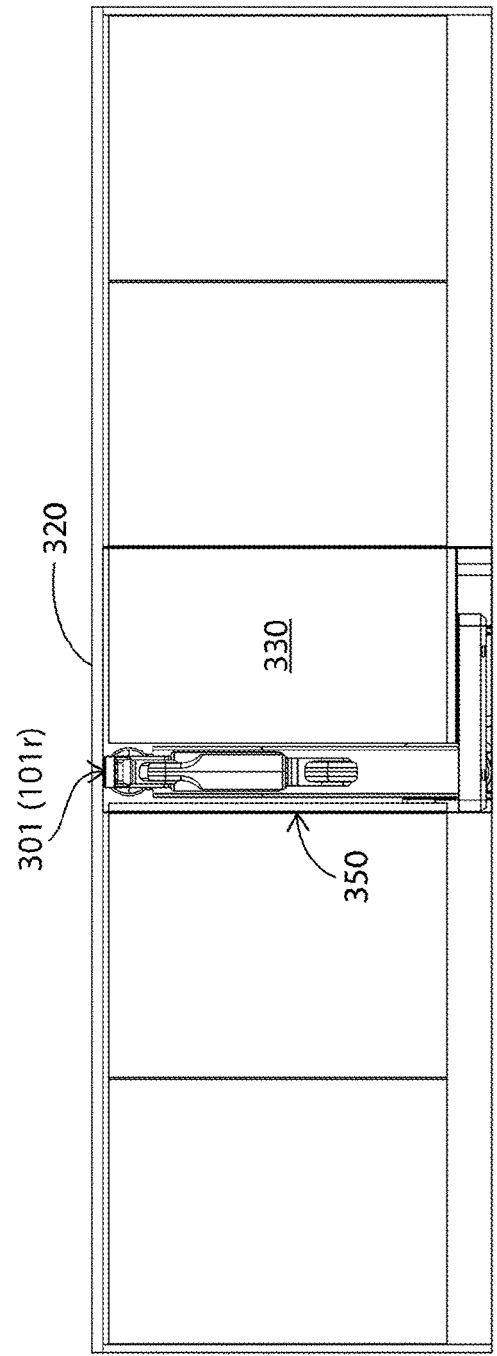

In some embodiments, as shown in FIG. 4A, one or more mechanical guide rails 162 (see also FIG. 3C, mechanical guide rails 362 for kitchen robot 301) includes at least one electrical contact—in this embodiment, charging pins 164 (or 364 for kitchen robot 301)—configured to electrically couple collapsible robot 101 to a power source (not shown) via a power source interface 161, thereby permitting optional charging of collapsible robot 101 on either side of enclosure 150 (as shown in FIGS. 5A and 5B, and further described below). In some embodiments, as shown in FIG. 4B, a two-prong powered docking station 160 may be implemented, each prong including a charging pin 164. In such embodiments, collapsible robot 101 is configured to be self-guided into docking station 160 along mechanical guide rails 162, and via base control circuitry 210 configured to operate motorized omni wheels 206 of mobile base 202. In such embodiments, bottom surface 207 of collapsible robot 101 also includes a charging pin 470 configured to align with charging pin 164 of powered docking station 160 once collapsible robot 101 is mechanically docked (see also e.g., FIG. 3C, 360). In some embodiments, one or more mechanical guide rails 162 may include a beveled edge to provide additional stability to motorized omni wheels 206 as collapsible robot 101 undergoes self-guided docking, and to help ensure precision alignment of charging pins 470 and 164.

FIG. 4C illustrates both docked and undocked configurations of one embodiment of the robotic system described herein and as shown in FIGS. 1B and 3C. On the left, FIG. 4C depicts collapsible robot 101 as fully docked in powered docking station 160, which in this embodiment includes two mechanical guide rails to assist motorized omni wheels 206 of base 202 to maneuver the collapsible robot into a docked position with respect to the powered docking station. On the right, FIG. 4C shows collapsible robot 101 in its fully undocked position.

FIG. 4D illustrates an embodiment of a powered docking station comprising a single mechanical guide rail, including an expanded close-up view. In some embodiments, and as shown in FIG. 4D, powered docking station 160 comprises a single mechanical guide rail 162 having one or more charging pins 164 configured to align with charging pin 470 on base 202 upon complete docking of collapsible robot 101. In such embodiments, powered docking station 160 may be configured to be flipped upside-down (180°), and a mechanical interface 163 for attaching guide rail 162 permits rotating guide rail 162 180° with respect to docking station 160. In this manner, a single mechanical guide rail 162 may be repositioned to reside on an opposite side 160a of powered docking station 160 when mounted inside enclosure 150. In such embodiments, positioning of the powered docking station within a compact enclosure is thus flexible, and allows for optional charging of collapsible robot 101 on either side of enclosure 150 (as shown in FIGS. 5A and 5B, and further described below), by rotating guide rail 162 with respect to docking station 160 and then flipping docking station 160 upside-down.

FIG. 4E illustrates yet another embodiment of a powered docking station for the robotic system of the present disclosure. In this embodiment, powered docking station 460 has no mechanical guide rails; a docking footrest 461 acts to stabilize the docking activity of collapsible robot 101. In some embodiments, powered docking station 460 provides a charging pin 464 integral with docking footrest 461 which, when in contact with charging pin 470 located on base 202 of collapsible robot 101, enables charging of a rechargeable battery (not shown) in collapsible robot 101.

FIG. 4F illustrates yet another embodiment of a powered docking station for the robotic system of the present disclosure. In this embodiment, powered docking station 460 has a docking footrest 461 that acts to stabilize the docking activity of collapsible robot 101. In this embodiment, powered docking station 460 provides a non-contact wireless charging alternative 466 which, when aligned with a contactless rechargeable battery 467 located on base 202 of collapsible robot 101, enables charging of collapsible robot 101.

Each of the above-described powered docking station embodiments are configured to permit a flexible orientation of the robotic system within a confined compact space. Such flexible-orientation designs are particularly useful where, for example, a collapsible robot is configured to share a standard-sized automatic dishwasher storage location with a compact dishwasher, and it is advantageous to place the compact dishwasher on one side or another of the storage location, depending upon the location of a sink to be accessed by the collapsible robot to be stored adjacent to the compact dishwasher. The embodiments shown are not mutually exclusive; for example, a powered docking station may have a combination of a docking footrest, guide rails, or other forms of electrical contacts and equivalent charging mechanisms, which may be implemented to dock, charge and/or power the collapsible robot.

FIGS. 5A and 5B are cross-sectional views of one embodiment of a stored robotic system described herein, illustrating how the robotic system may fit into a confined compact space, such as a standard-sized automatic dishwasher storage area located below a kitchen countertop, while sharing that space with a compact dishwasher, and while taking advantage of a flexible-orientation design for a powered docking station, as in the powered docking station embodiments described above. FIG. 5A depicts one embodiment of a collapsible robot, namely, kitchen robot 301, docked in its compact geometry configuration 101r and positioned, facing left, on the right of compact dishwasher 330 within kitchen cabinet storage location 350 and below kitchen countertop 320; FIG. 5B depicts the same, fully-docked kitchen robot 301 in its compact geometry configuration 101r, as in FIG. 5A, but in this orientation, positioned facing right and on the left of compact dishwasher 330 within kitchen cabinet storage location 350 and below kitchen countertop 320. In either placement for collapsible robot 101 (in this example, kitchen robot 301), the same powered docking station 160 may be used, since placement and charging orientation of powered docking station 160 is flexible, as described above.

Doors & Toe Kicks

Figure 6A:
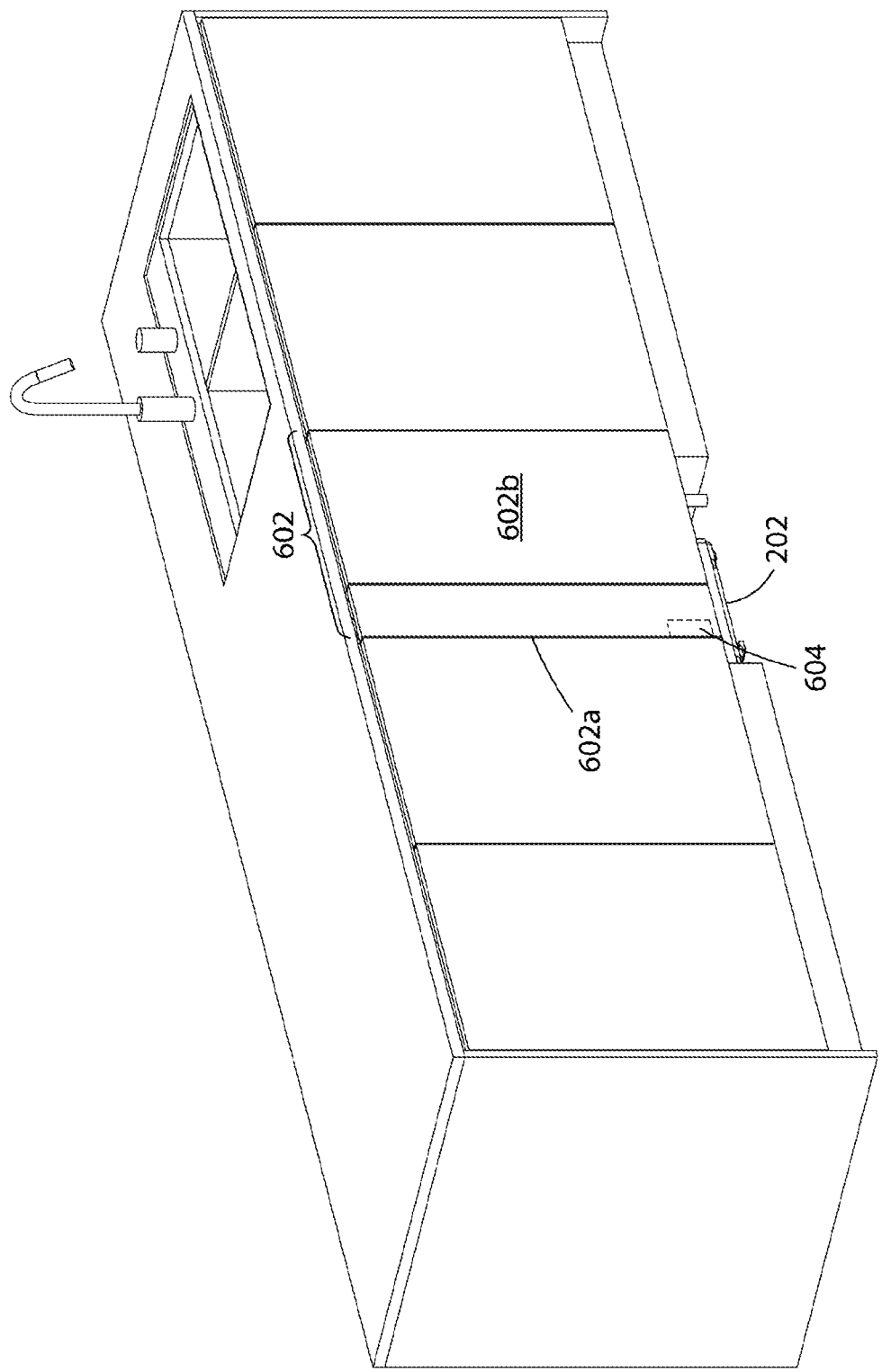
FIGS. 6A and 6B illustrate one embodiment of a kitchen cabinet configured to store a collapsible kitchen robot adjacent to a compact dishwasher behind a double door system.
Figure 6B:
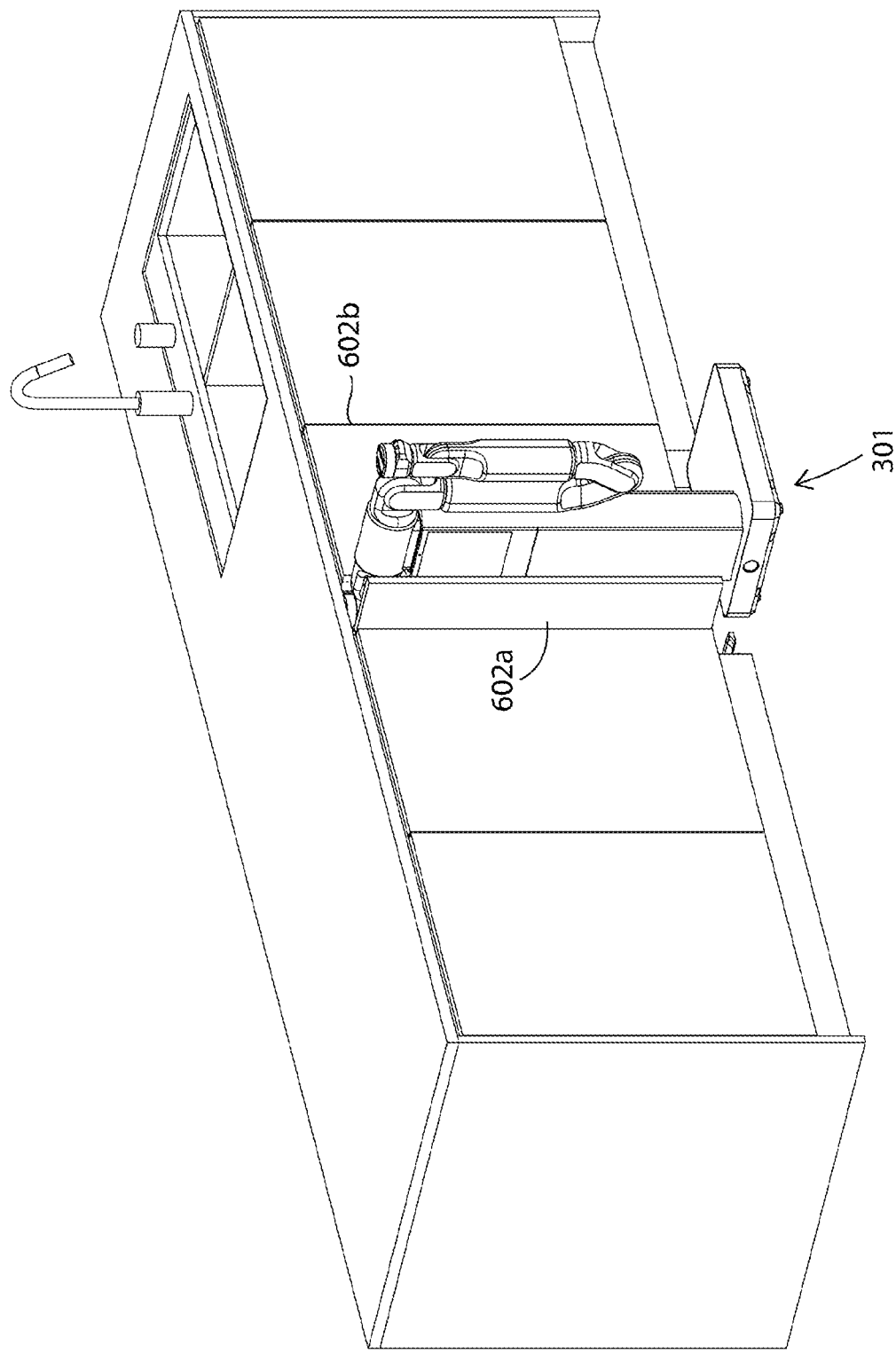

In some embodiments, with reference to FIG. 3B and as shown in FIGS. 6A and 6B, kitchen cabinet storage location 350 may be configured to permit storage of kitchen robot 301 and compact dishwasher 330 behind a double door 602.

In some embodiments, double door 602 includes a motorized compact robot door 602a, connected to a door drive 604, and a compact dishwasher door 602b. In one such embodiment, and as illustrated by FIGS. 6A and 6B, a bottom edge of double door 602 is positioned high enough above the floor so that automated and self-directed ingress and egress of kitchen robot 301 into and out of kitchen cabinet storage location 350 may be accomplished by an automatic opening of motorized compact robot door 602a, while compact dishwasher door 602b remains closed. In such configurations, base sensor array 112b (see FIG. 1E) of kitchen robot 301 may sense any objects or other potential obstructions that could prevent or hinder egress of kitchen robot 301 out of kitchen cabinet storage location 350, so that collisions upon opening compact robot door 602a can be avoided.

FIG. 6A illustrates kitchen robot 301 stored behind a closed compact robot door 602a; FIG. 6B illustrates kitchen robot 301 moving into or out of its compact storage location through compact robot door 602a while compact dishwasher door 602b remains closed.

In some embodiments, and as further described below, the robotic system of the present disclosure is stored in a cabinet enclosure below a worksurface where the cabinet enclosure comprises a toe kick. In those embodiments, an automatic toe kick can be configured to retract and expose base sensor array 112b prior to an automatic opening of compact robot door 602a.

Figure 7A:
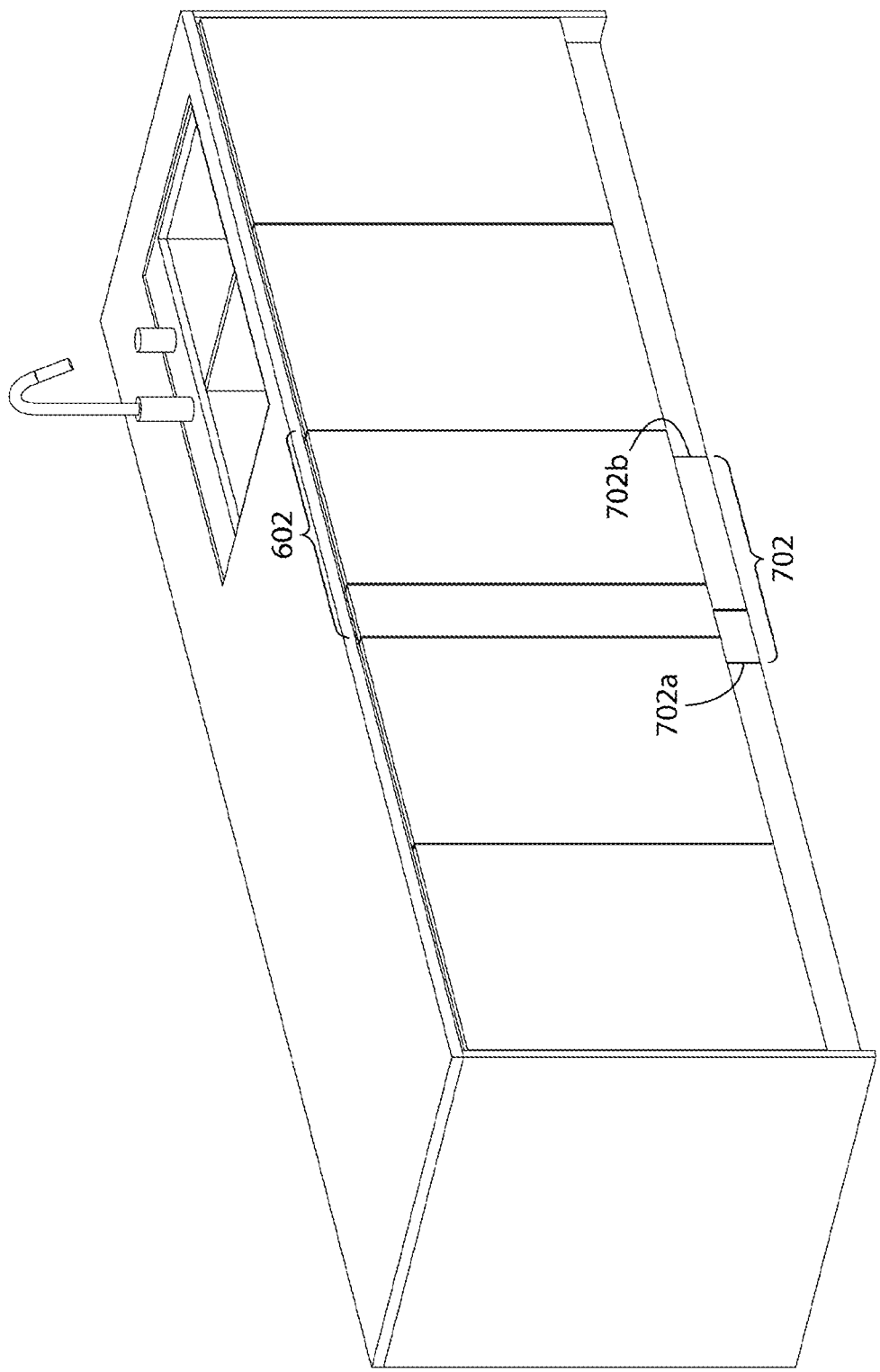
FIGS. 7A-7C illustrate another embodiment of a kitchen cabinet configured to store a collapsible kitchen robot adjacent to a compact dishwasher behind a double door system, in which the kitchen cabinet includes an automatic toe kick.
Figure 7B:
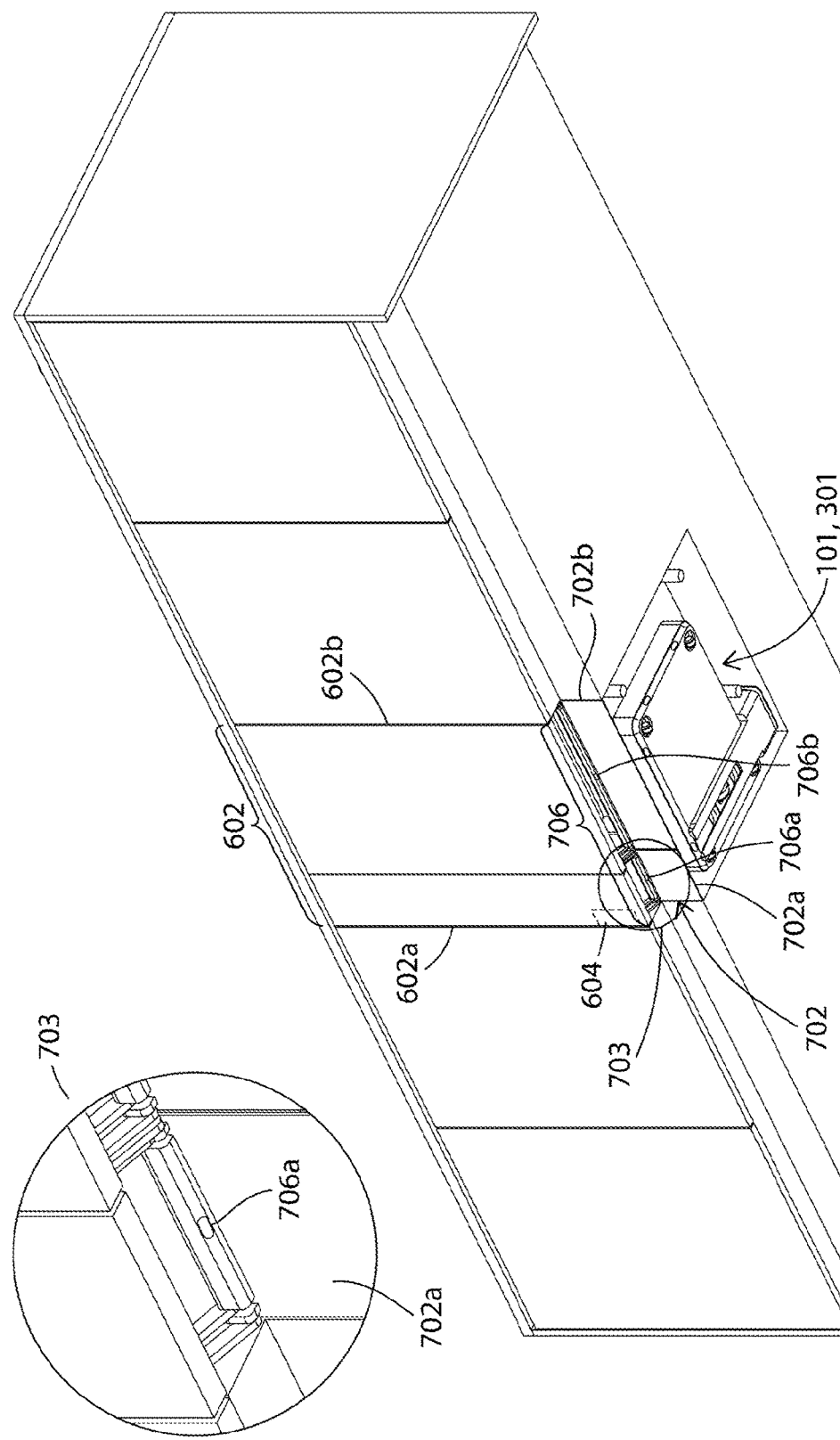

FIGS. 7A and 7B illustrate another embodiment of a motorized double door system for enclosing kitchen cabinet storage location 350, similar to the one shown in FIGS. 6A and 6B, but further comprising a toe kick below the kitchen cabinet door. As shown in FIG. 7A, and in some embodiments, double door 602 includes a recessed automatic toe kick 702 comprising a compact robot toe kick 702a and a compact dishwasher toe kick 702b, positioned below double door 602.

As shown in FIG. 7B, door drive 604 is configured to be connected to double door 602, and a door sensor 706 is configured to be electrically coupled to door drive 604 and double door 602. In this embodiment, door sensor 706 comprises a robot door sensor 706a and a dishwasher door sensor 706b. In some embodiments, door sensor 706 comprises one or more proximity sensors that facilitate collision-free opening and collision-free closing of double door 602. For example, when collapsible robot 101 is activated to emerge from its storage location (as further described below), door sensor 706a is configured to determine whether any obstructions to opening compact robot door 602a are present. If there are no obstructions, door sensor 706a sends a door activation signal to door drive 604, which in turn opens compact robot door 602a; if, on the other hand, an obstruction is detected, door sensor 706a creates a signal seeking intervention from a user of the robotic system (e.g., and an audible sound, a visual light flash, or a mobile app text message), indicating to the user that an obstruction to opening compact robot door 602a is present. Similar operation of door sensor 706b may detect and signal obstructions to opening compact dishwasher door 602b. In this manner, door sensor 706 enables collision-free opening and closing of double door 602. In some embodiments, as shown in FIG. 7B, a linkage mechanism 703 is connected to cabinet door 602 and configured to engage and disengage automatic toe kick 702.

In some embodiments, toe kick control circuitry 108c (not shown) is electrically coupled to door drive 604 and door sensor 706, and configured to engage and disengage automatic toe kick 702 in response to a door activation signal generated by door sensor 706. In other embodiments, engagement and disengagement of automatic toe kick 702 may be activated by one or more other sensors in the robotic system.

Figure 7C:
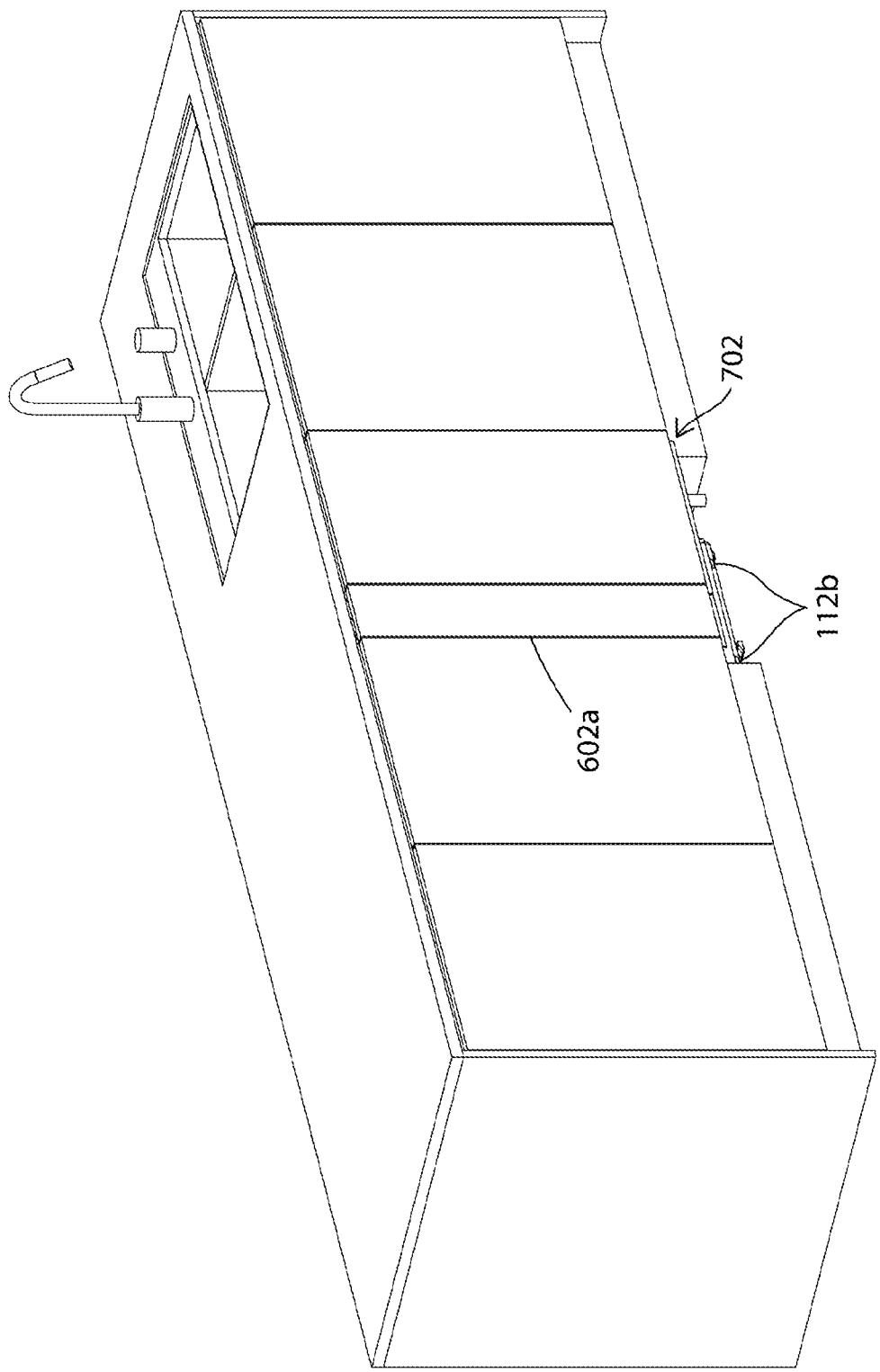

FIG. 7C illustrates the appearance of automatic toe kick 702 retracted to expose one or more sensors of base sensor array 112b prior to an automatic opening of compact robot door 602a. Schematic diagrams and various flowcharts of illustrating embodiments of control circuitry including robot control circuitry 108a on the collapsible robot, home bay control circuitry 108b on the powered docking station, and toe kick controller circuitry 108c), and embodiments for processes that may be used to operate various components of robotic system 100, are described in further detail below. Toe kick control circuitry 108c for automatic toe kick 702 may reside in powered docking station 360 (FIG. 3B) along with home bay control circuitry 108b, and/or in robot control circuitry 108a of collapsible robot 301.

Figure 8A:
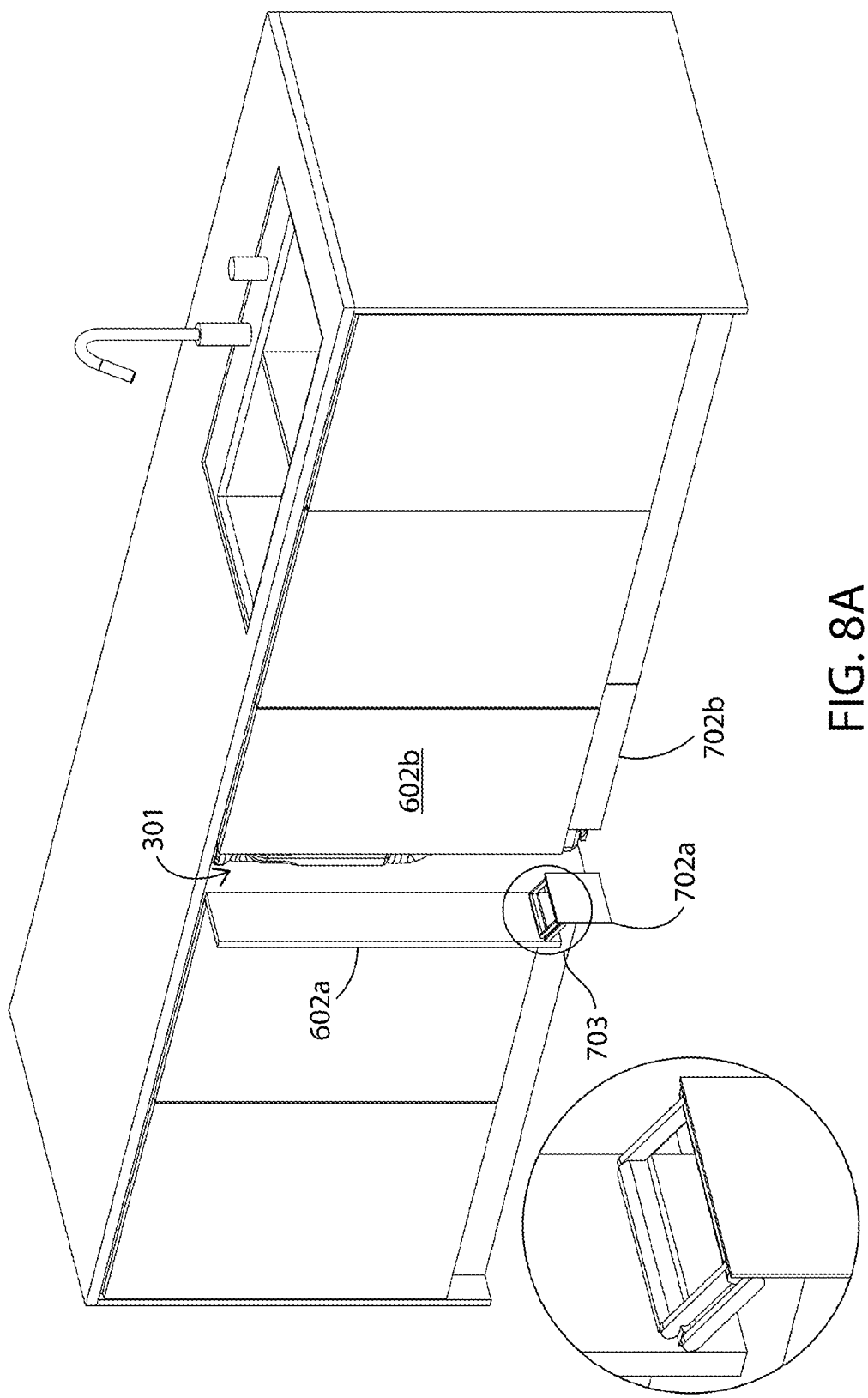
FIGS. 8A and 8B illustrate the operation of an automatic toe kick for some embodiments of the robotic system of the present disclosure.
Figure 8B:
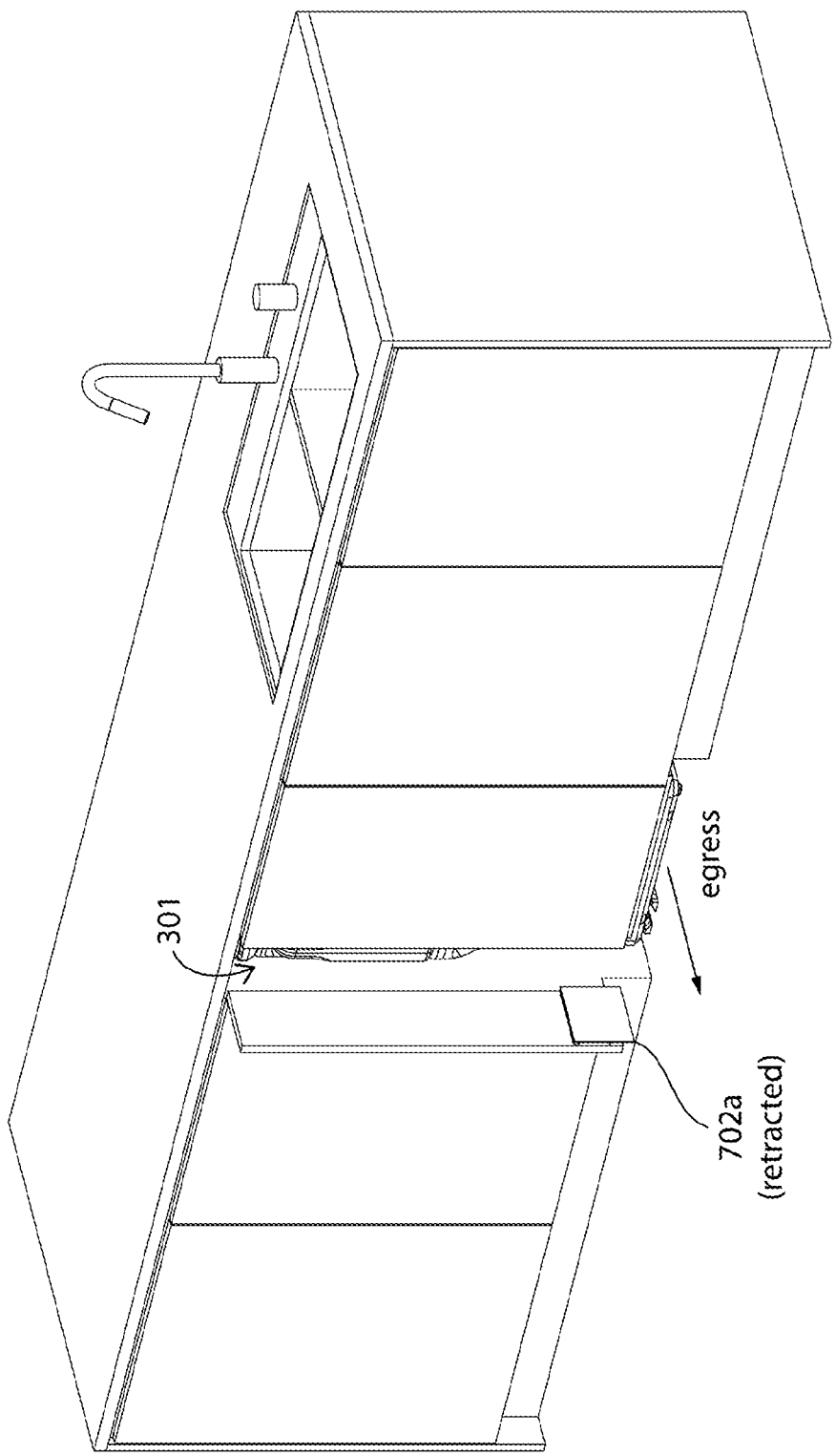

FIGS. 8A and 8B illustrate the operation of the automatic toe kick embodiments described above and shown in FIGS. 6A, 6B and 7A-7C. In this embodiment, automatic toe kick 702 includes a linkage mechanism 703 that may be driven by a motor (not shown) controlled by toe kick control circuitry 108c; in other embodiments, linkage mechanism 703 may not be motorized but still engaged/disengaged by toe kick control circuitry 108c (not shown). In this embodiment, automatic toe kick 702 is a retractable toe kick.

FIG. 8A shows an example embodiment where linkage mechanism 703 may be an unmotorized hinge connecting automatic toe kick 702a to compact robot door 602a; in this embodiment, an equivalent linkage mechanism is installed on compact dishwasher door 602b. In some embodiments, toe kick control circuitry 108c may be integrated into powered docking station 360; in other embodiments, it may be integrated into collapsible robot 301.

FIG. 8B shows the embodiment of FIG. 8A where automatic toe kick 702a is in a raised, retracted position to permit collapsible robot 301 collision-free egress from its storage area. In some embodiments, the linkage mechanism may be a motorized hinge or a functionally equivalent structure.

Figure 9A:
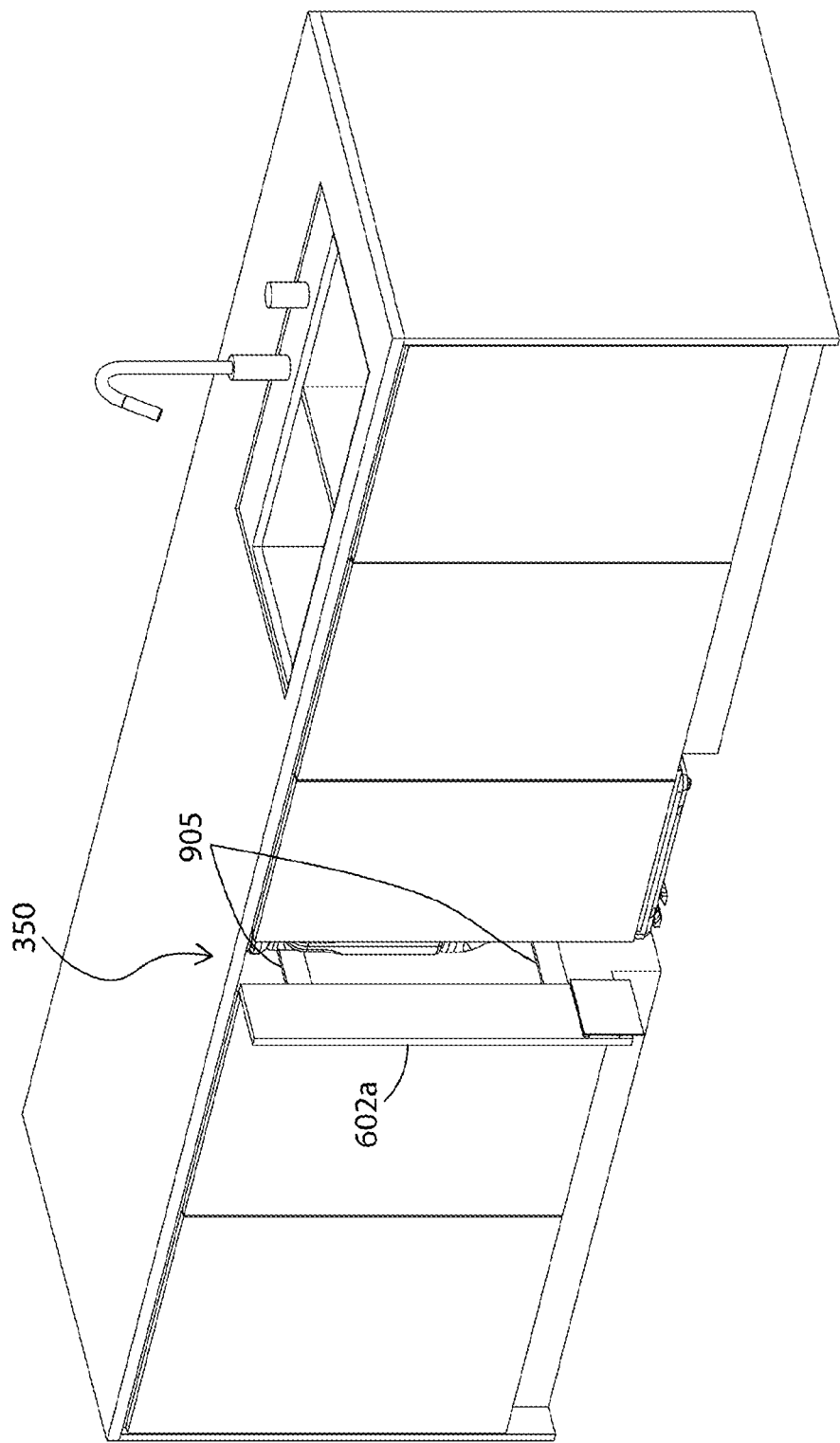
FIGS. 9A and 9B illustrate an alternative cabinet door for an enclosure of the robotic system described herein and one mode of collision-free opening of the enclosure.
Figure 9B:
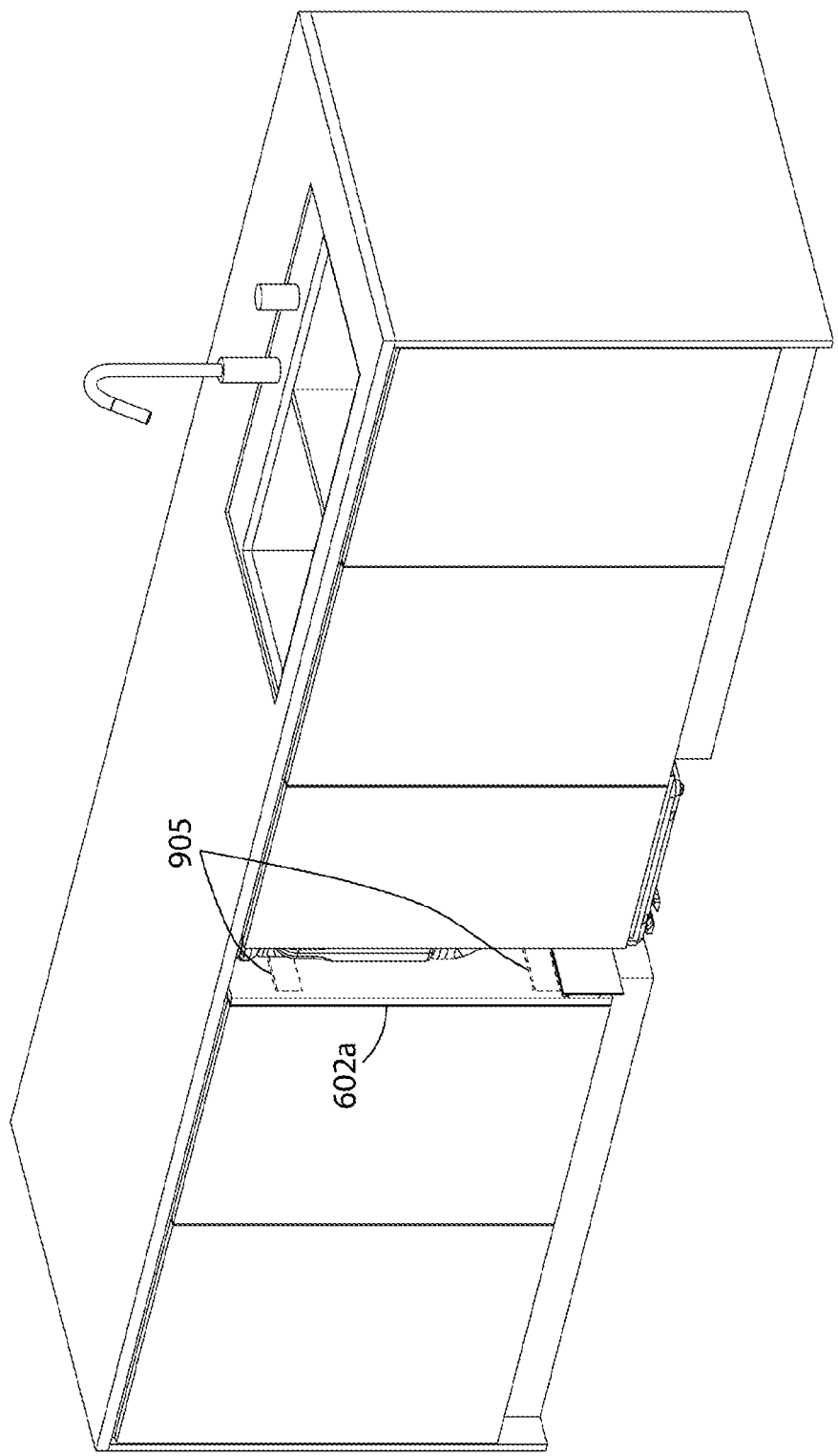

FIGS. 9A and 9B illustrate an alternative cabinet door for an enclosure of the robotic system described herein, and one mode of collision-free opening of the enclosure door. In this embodiment, kitchen cabinet storage location 350 includes interior cabinet guides 905 positioned opposite from compact dishwasher 330 (not shown) within the enclosure; interior cabinet guides 905 extend parallel to the floor and away from compact robot door 602a, in a manner that permits compact robot door 602a to slide along interior cabinet guides 905 and towards the rear of kitchen cabinet storage location 350; compact robot door 602a thereby inserts itself (either partially or fully) into the enclosure upon opening. In this embodiment, such design has the benefit of tucking away compact robot door 602a out of harm's way while kitchen robot 301 is actively exiting or entering kitchen cabinet storage location 350. FIG. 9B illustrates such beneficial feature.

Figure 10A:
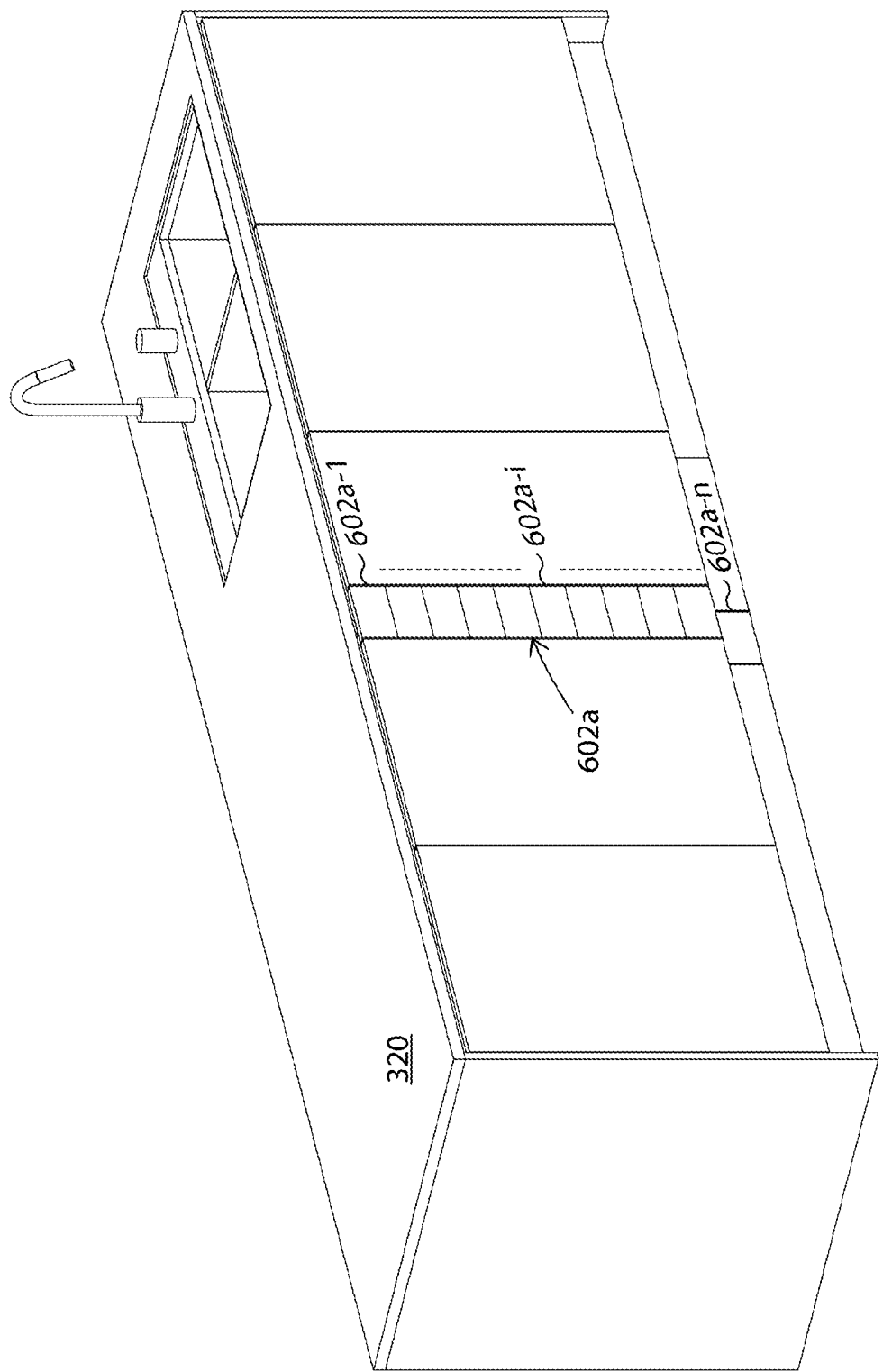
FIGS. 10A and 10B illustrate yet another alternative cabinet door for an enclosure of the robotic system described herein and one mode of collision-free opening of the enclosure.
Figure 10B:
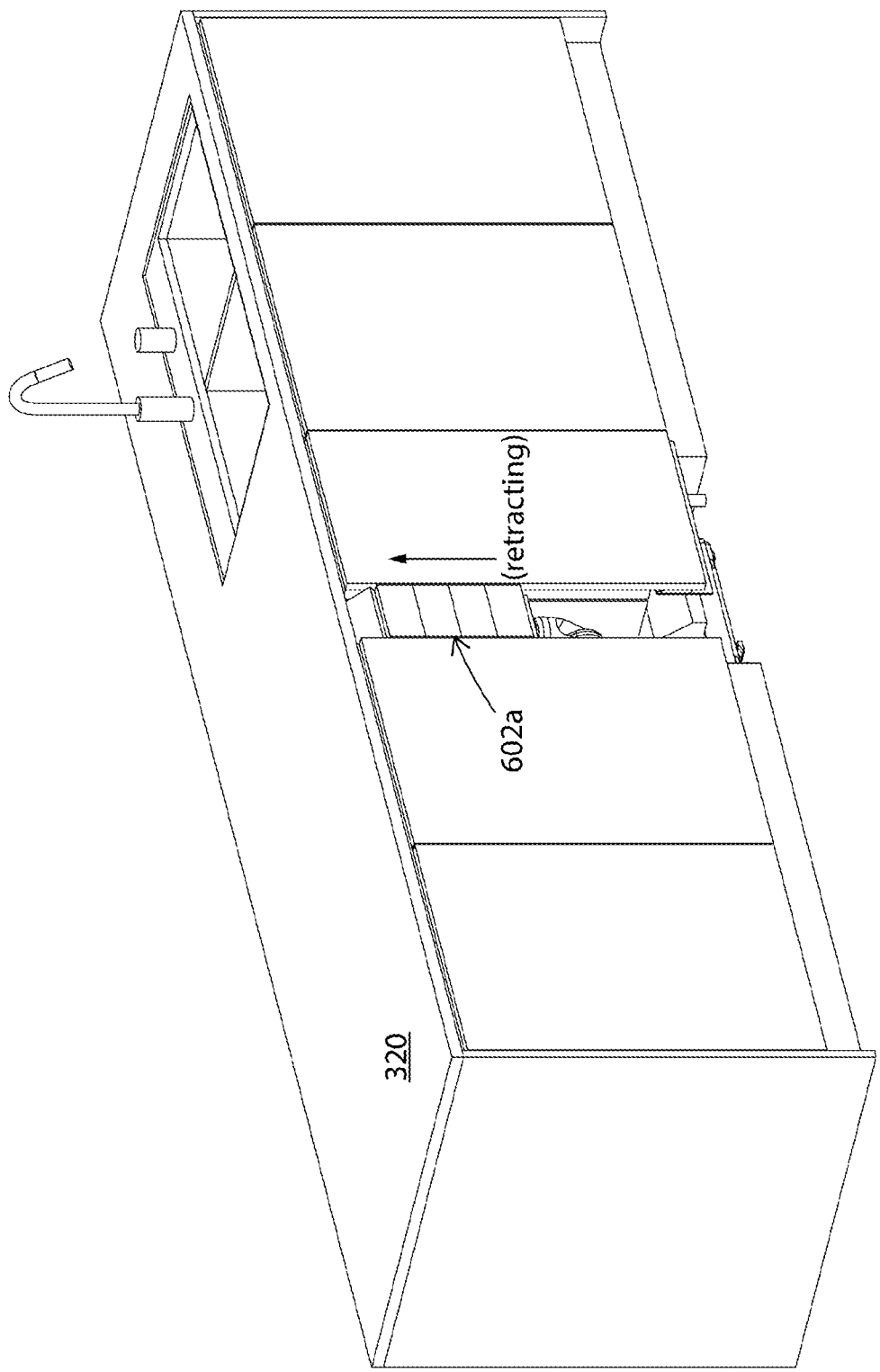

FIGS. 10A and 10B illustrate yet another alternative cabinet door for an enclosure of the robotic system described herein and another mode of operating the enclosure door. In this embodiment, compact robot door 602a may comprise a plurality of n articulated and interconnected door panels {602a-1, [ ... ], 602a-i, [ ... ], 602a-n}. In this embodiment, compact robot door 602a is configured to be raised away from the floor and upwards towards kitchen countertop 320, such that compact robot door 602a may slid inside kitchen cabinet storage location 350 upon opening. As with the embodiment shown in FIGS. 9A and 9B, this door embodiment also tucks away compact robot door 602a out of harm's way while kitchen robot 301 is active. FIG. 9B illustrates such beneficial feature (compact robot door 602a retracting below kitchen countertop 320).

Figure 11:
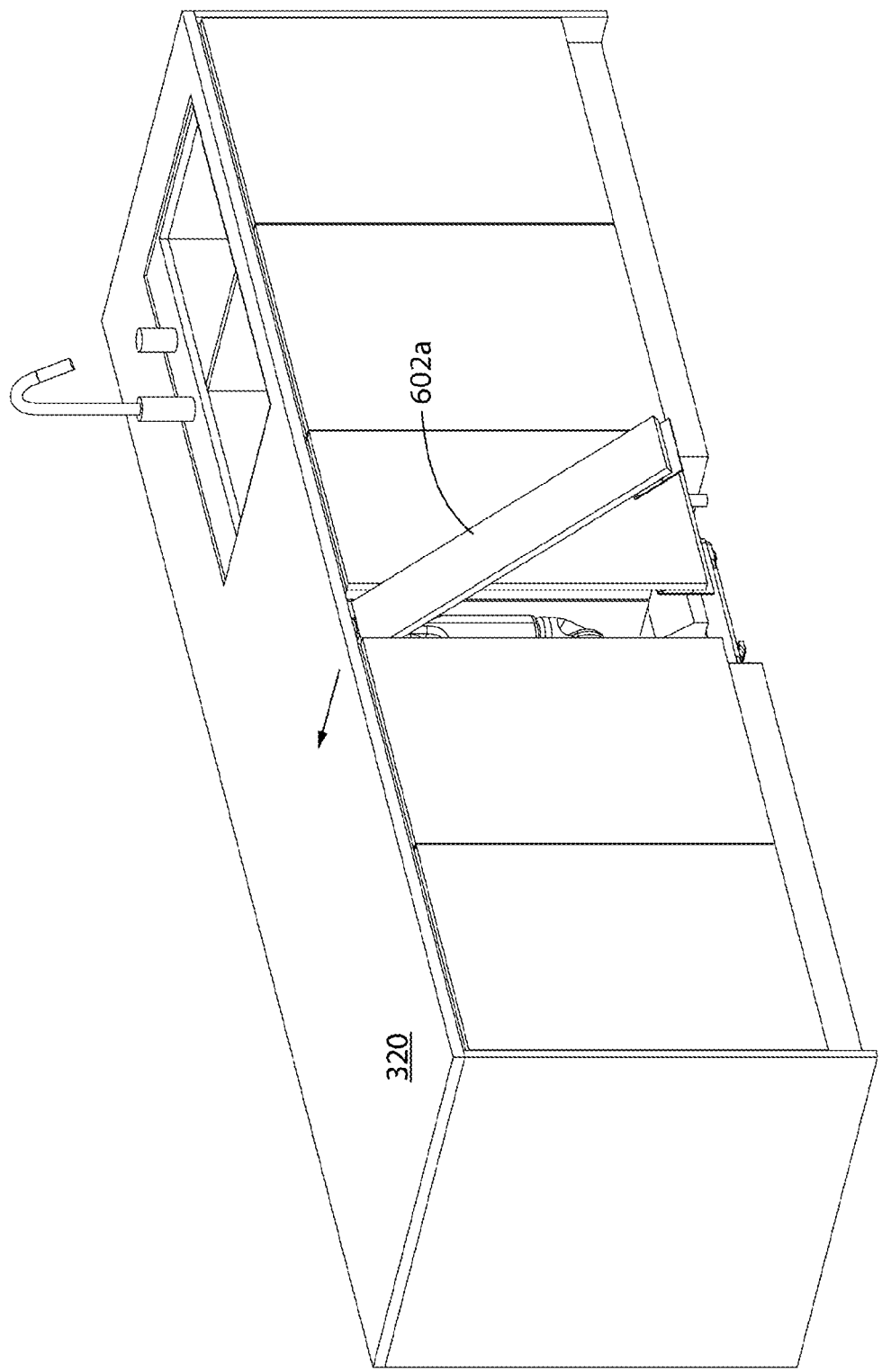
FIG. 11 illustrates yet another mode of collision-free opening of an enclosure of the robotic system described herein.

FIG. 11 illustrates yet another mode of collision-free opening of an enclosure of the robotic system described herein. In this embodiment, compact robot door 602a opens upwards and away from the floor and retracts inwards while sliding underneath kitchen countertop 320.

Figure 12A:
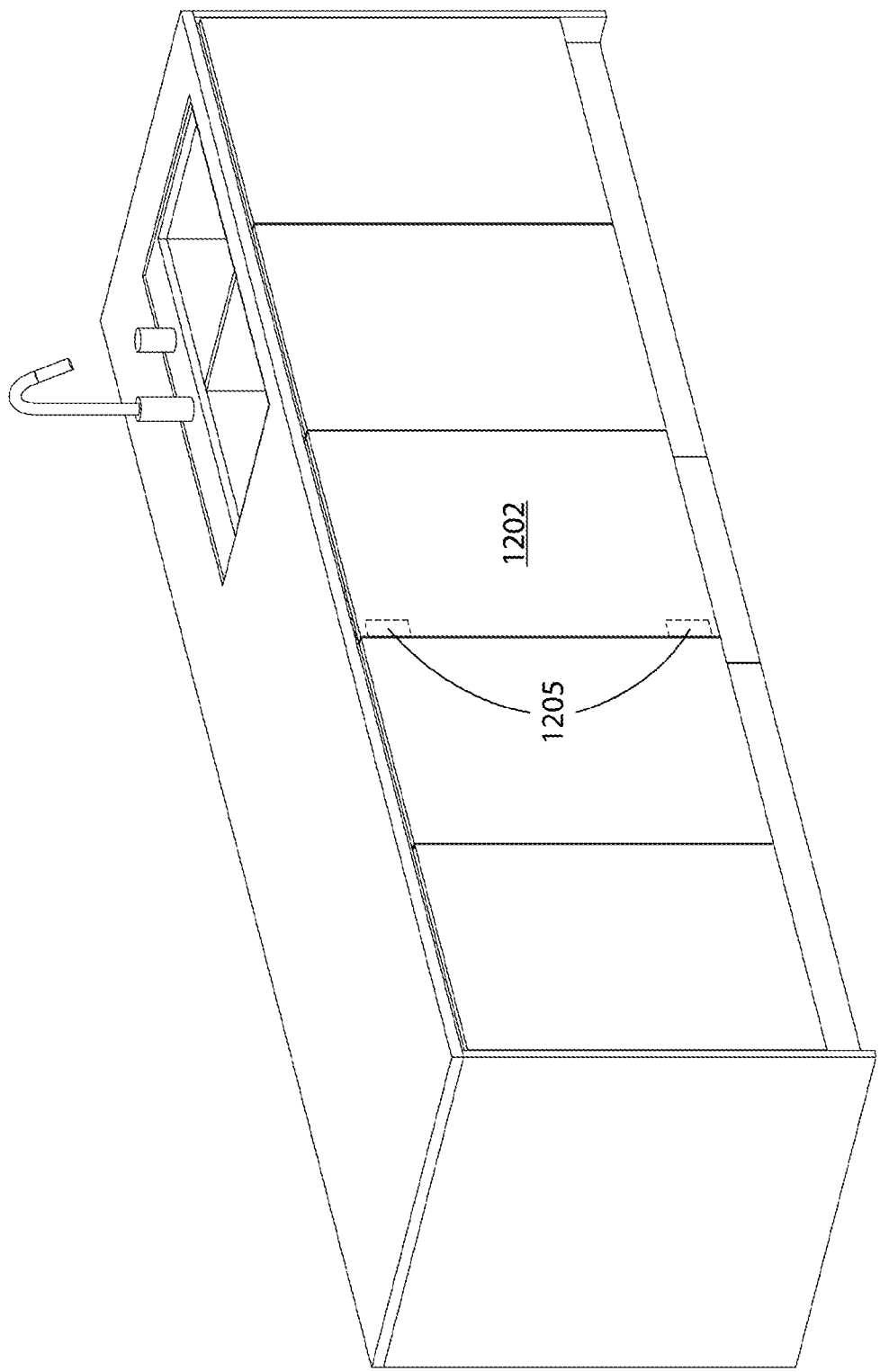
FIGS. 12A and 12B illustrate yet another alternative cabinet door for an enclosure of the robotic system described herein and one mode of collision-free opening of the enclosure.
Figure 12B:
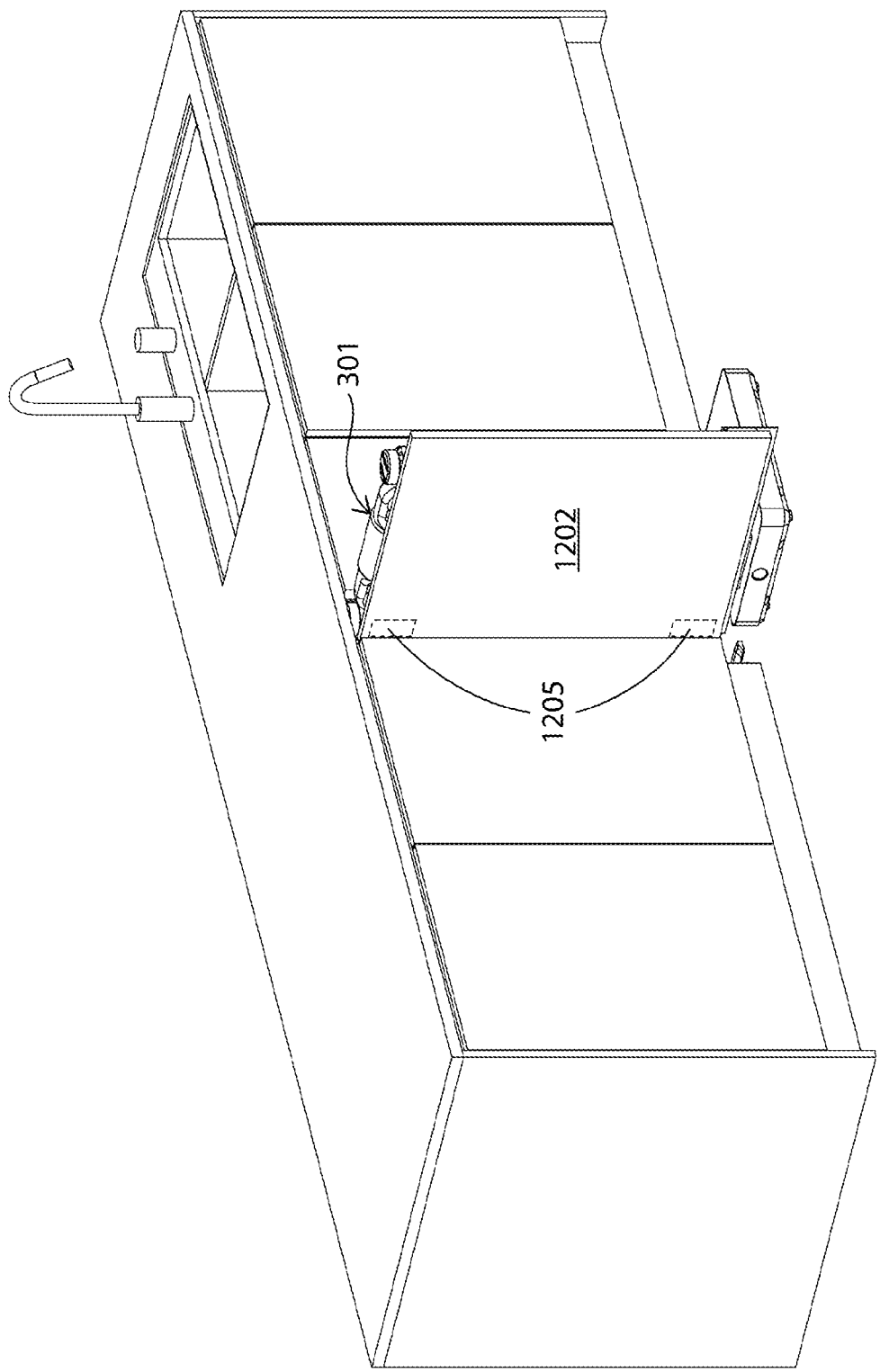

FIGS. 12A and 12B illustrate yet another alternative cabinet door for an enclosure of the robotic system described herein and one mode of collision-free opening of the enclosure. FIG. 12A illustrates kitchen cabinet storage location 350 comprising a single cabinet door 1202 connected along one side of kitchen cabinet storage location 350 with a set of side hinges 1205 (any number of hinges may be used); as illustrated in FIG. 12B, single cabinet door 1202 may open to permit ingress and egress of kitchen robot 301 while in a fully open state.

Alternative Base Configurations for Collapsible Robot

Figure 13A:
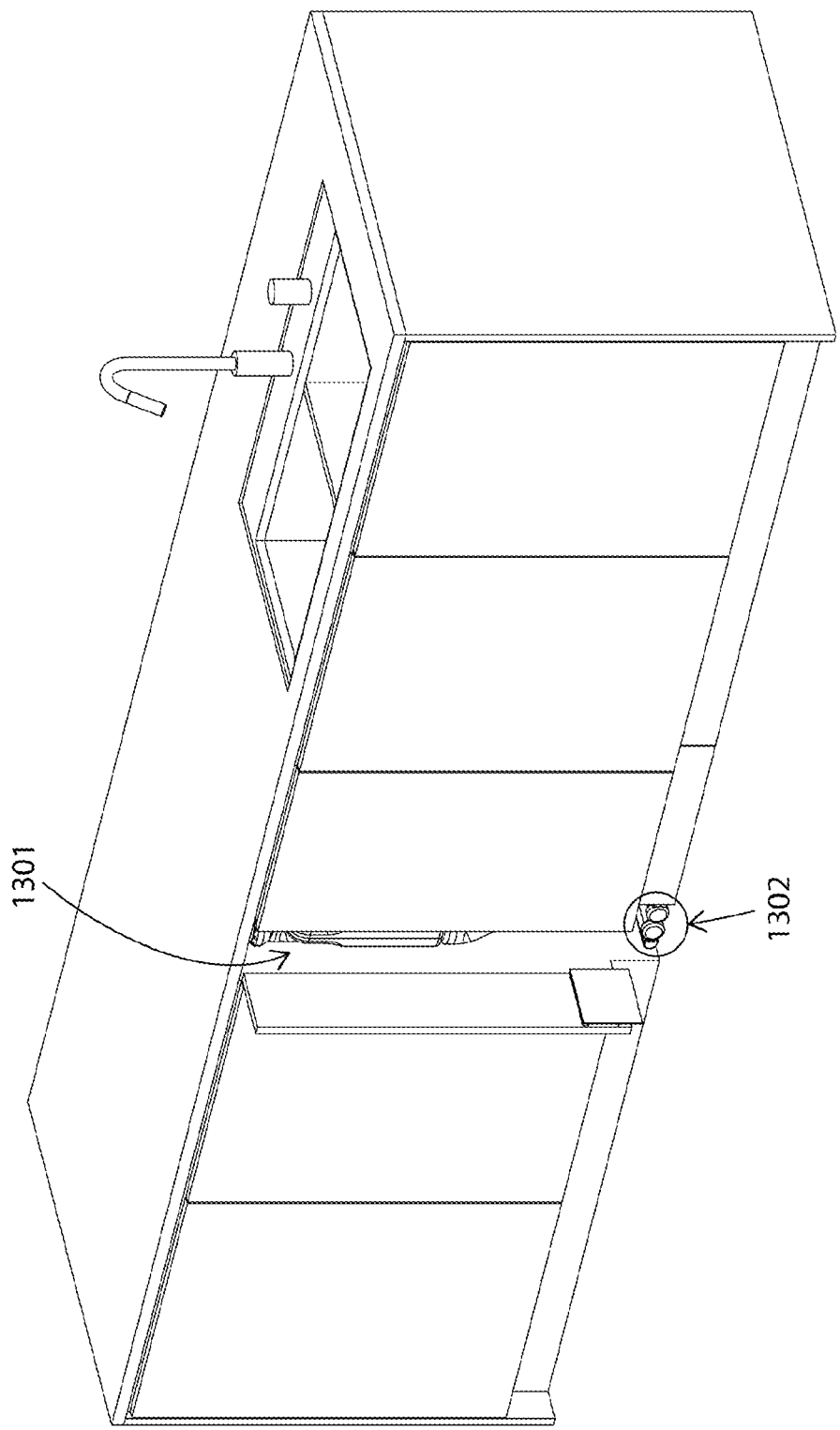
FIGS. 13A-13C illustrate an alternative embodiment for a mobile base of the robotic system presently disclosed.
Figure 13B:
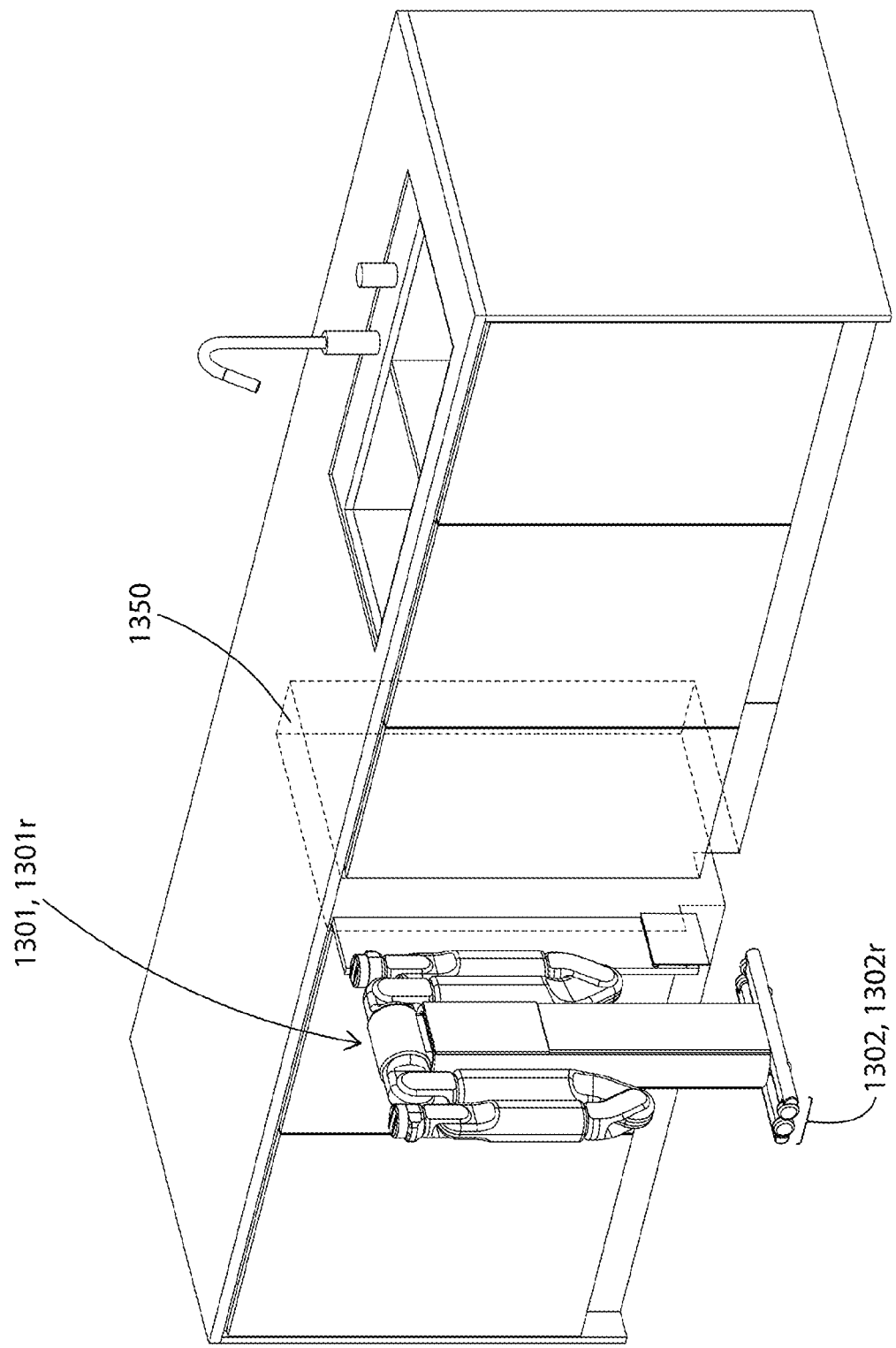
Figure 13C:
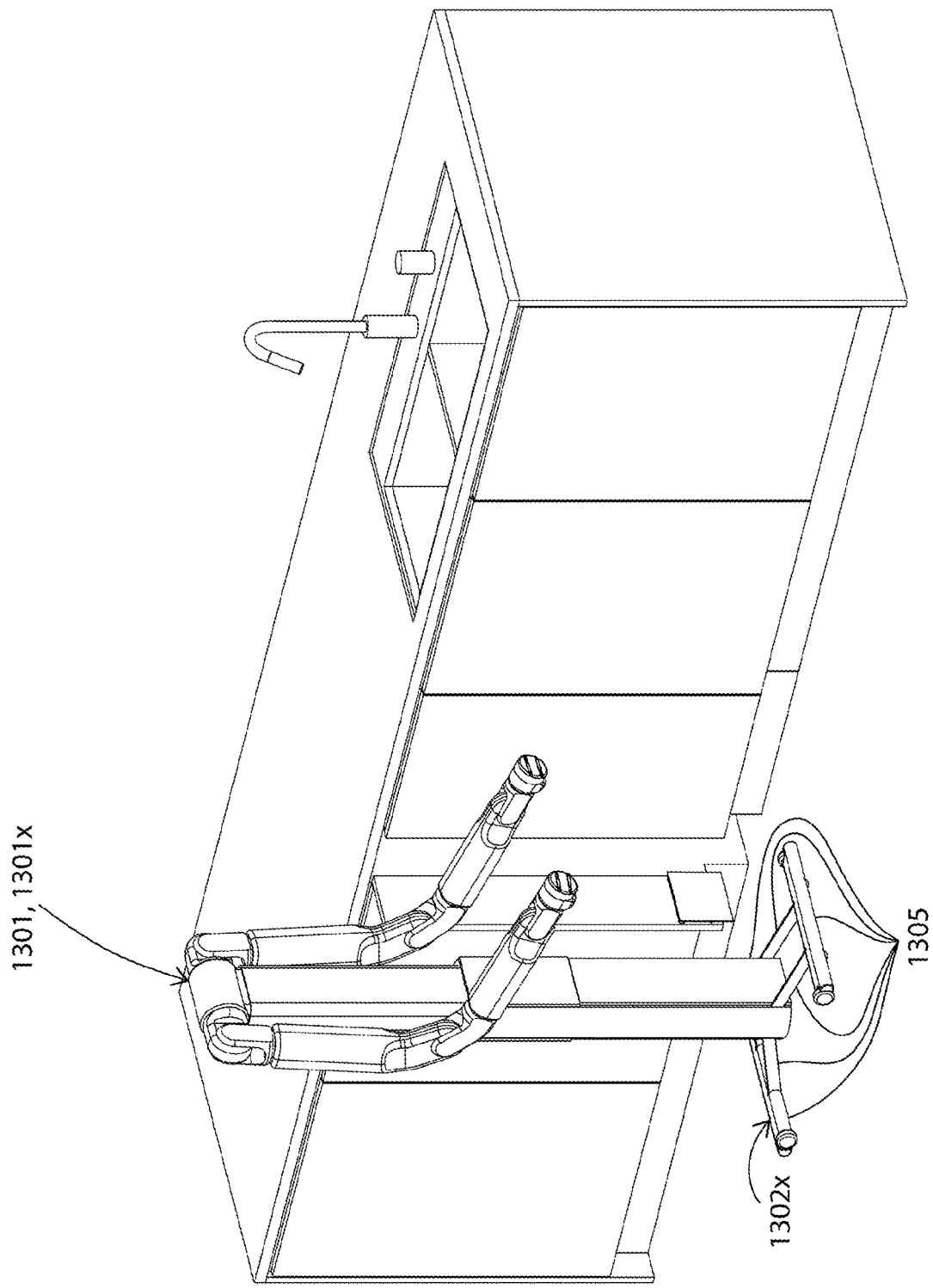

FIGS. 13A-13C illustrate an alternative embodiment for a mobile base of the robotic system presently disclosed. In this embodiment, and as shown in FIG. 13A, a collapsible robot 1301 comprises a mobile foldable pedestal 1302 adaptable to self-adjust its floor support footprint, while still able to support and stabilize collapsible robot 1301 during self-storage. In this embodiment, and as shown in FIG. 13B, mobile foldable pedestal 1302 need not slide below compact dishwasher 330 for self-storage (compare with, e.g., kitchen robot 301 and embodiments shown in FIGS. 3A-3C and 6A-6B); in this embodiments, foldable pedestal 1302 permits collapsible robot 1301 to enter into a space 1350 in a compact geometry configuration 1301r under circumstances in which space 1350 may be too narrow to accommodate a larger base footprint (such as, for example, a base footprint adequate to stabilize a fully-deployed robot performing tasks outside of space 1350). In such embodiments, space 1350 may be independent from any other storage location or appliance and need not be adjacent to a compact dishwasher.

FIG. 13C illustrates one embodiment of foldable pedestal 1302 in an extended configuration 1302x. As shown, in this embodiment, foldable pedestal 1302 comprises a plurality of stabilizing bars 1305 configured to support collapsible robot 1301 in a deployed geometry configuration 1301x. In this embodiment, caster wheels 208 (not shown) and motorized omni wheels 206 (not shown) are mounted on the plurality of stabilizing bars 1305 and a bottom surface of foldable pedestal 1302, respectively.

Figure 14A:
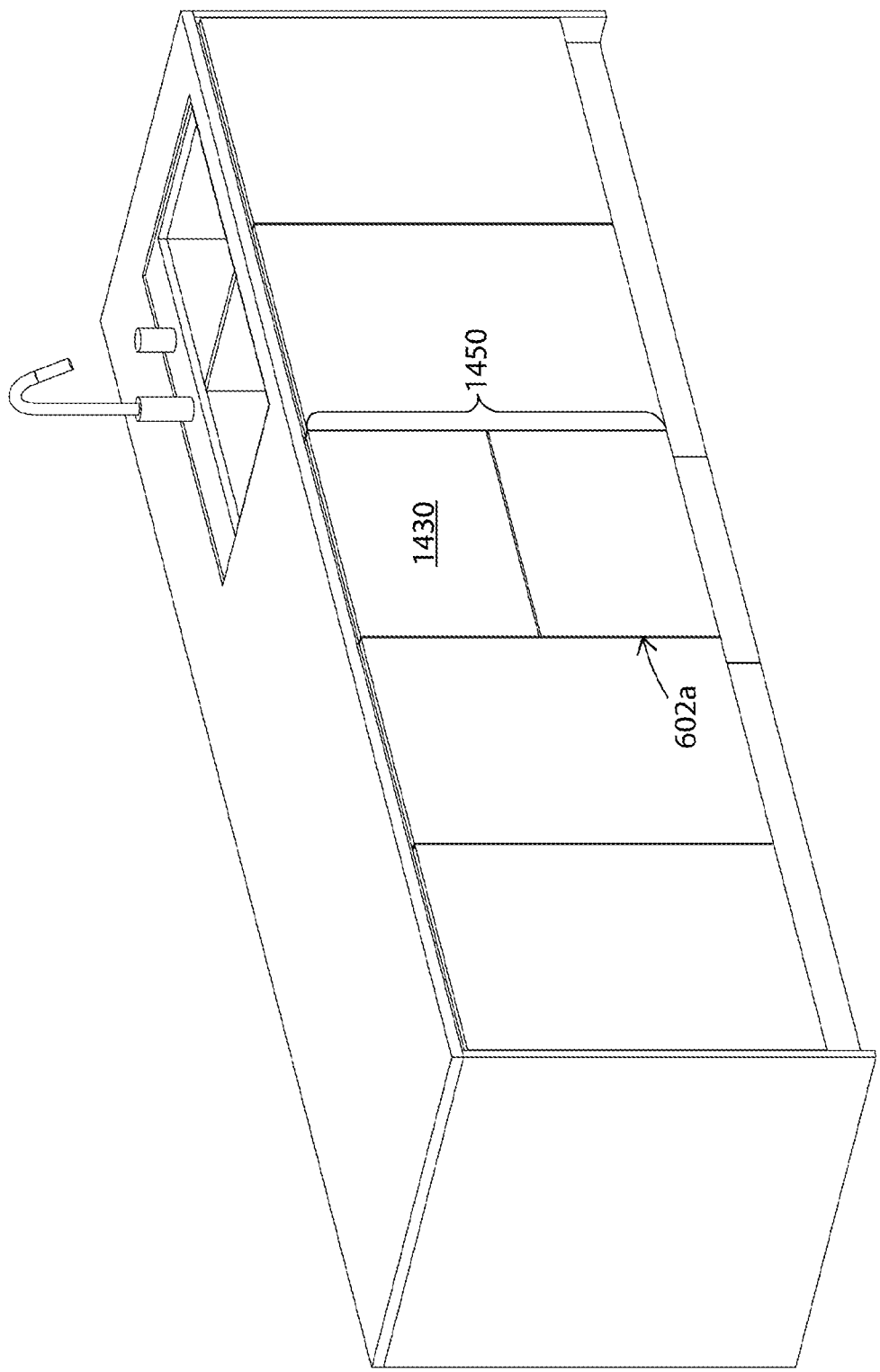
FIGS. 14A-14E illustrate an alternative embodiment for a robotic system presently disclosed.
Figure 14B:
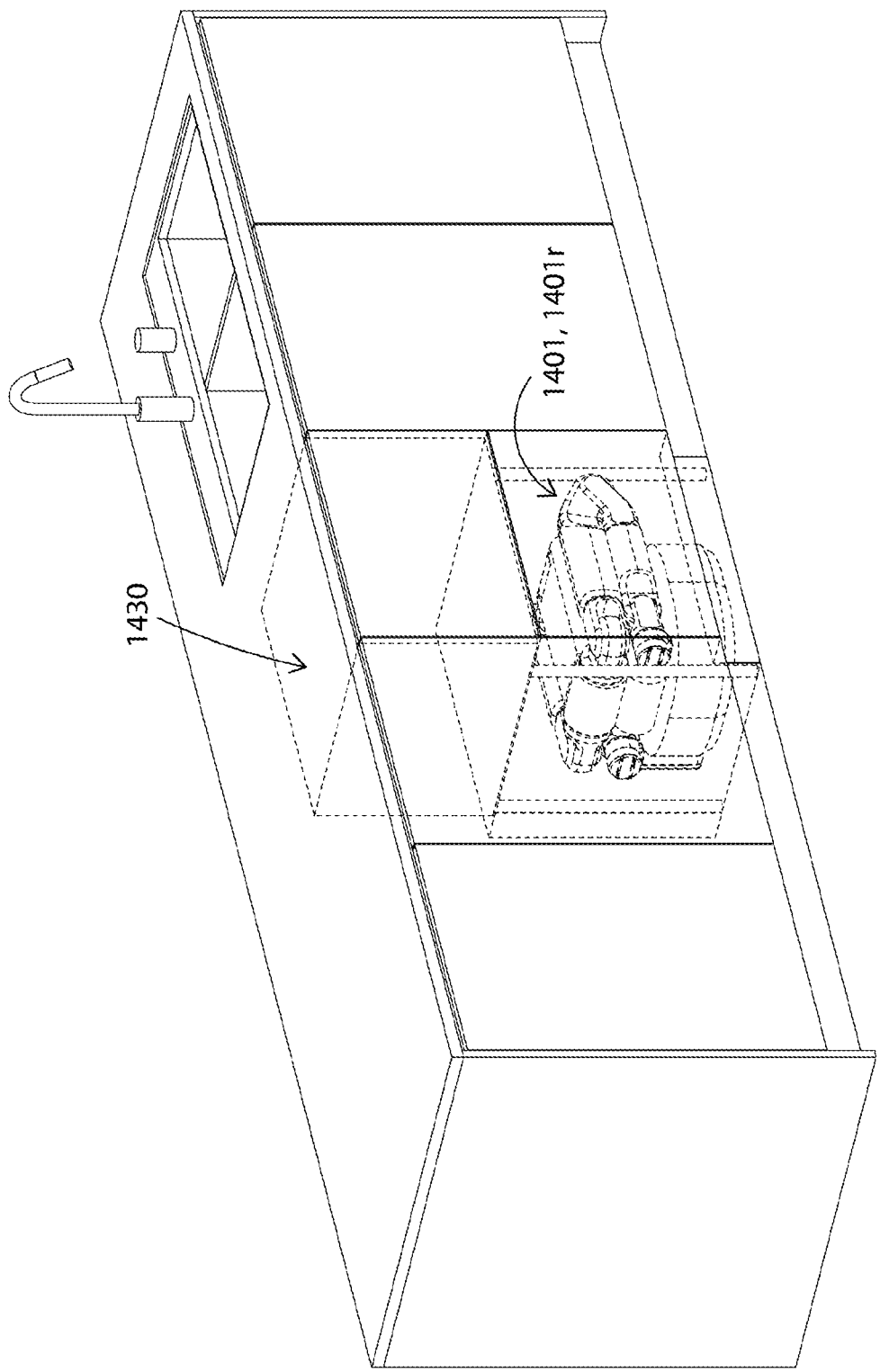
Figure 14C:
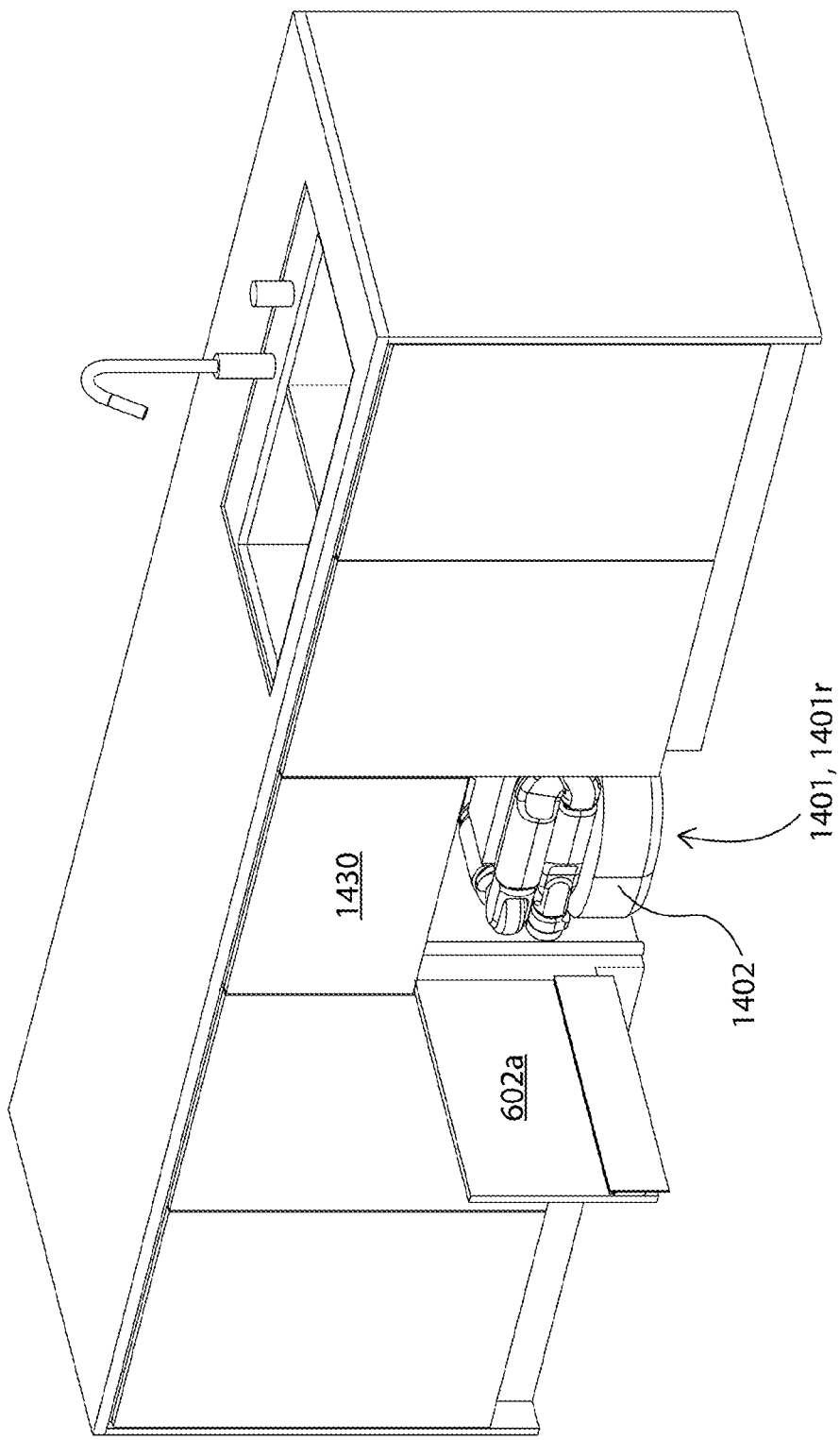
Figure 14D:
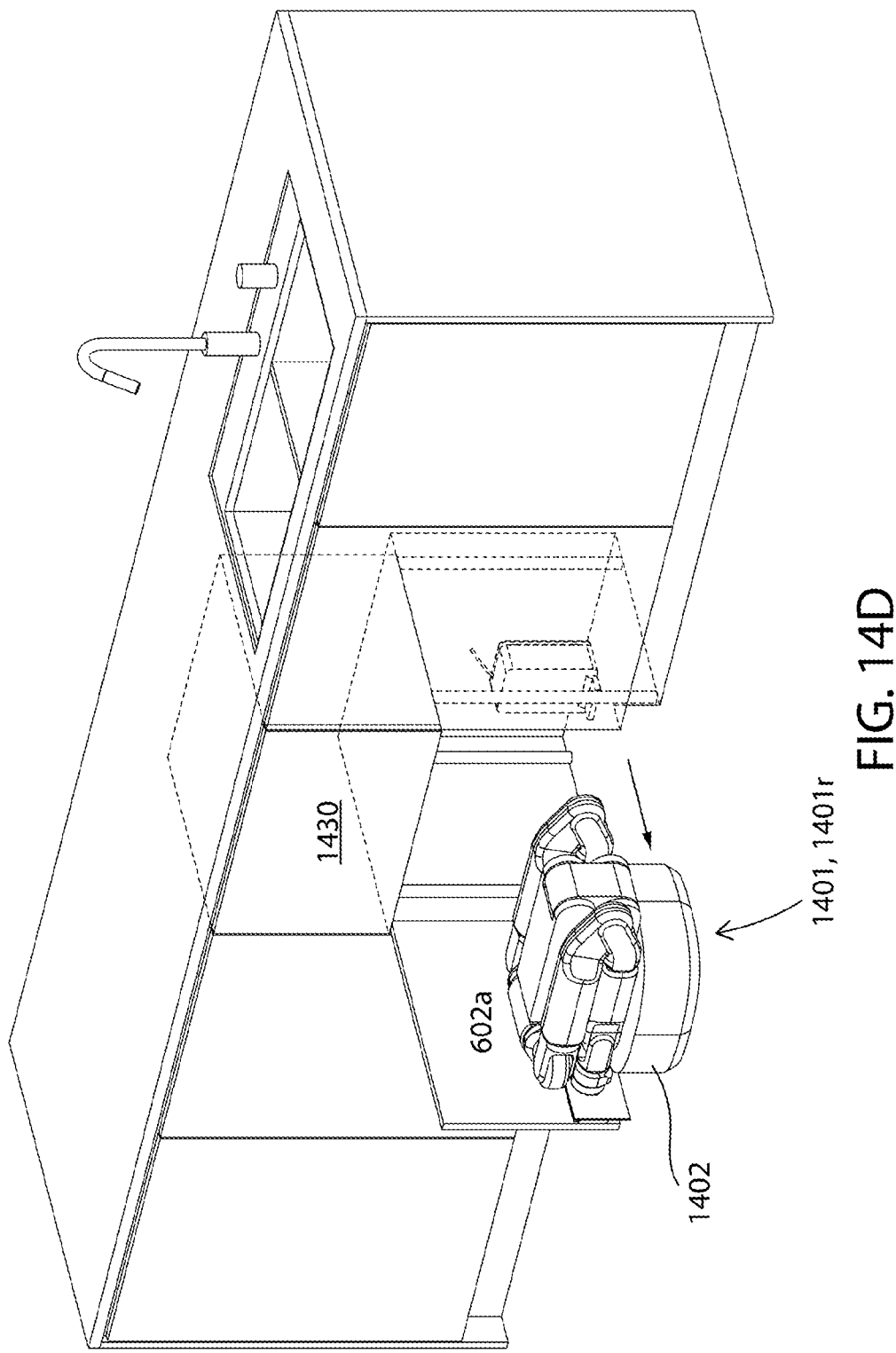
Figure 14E:
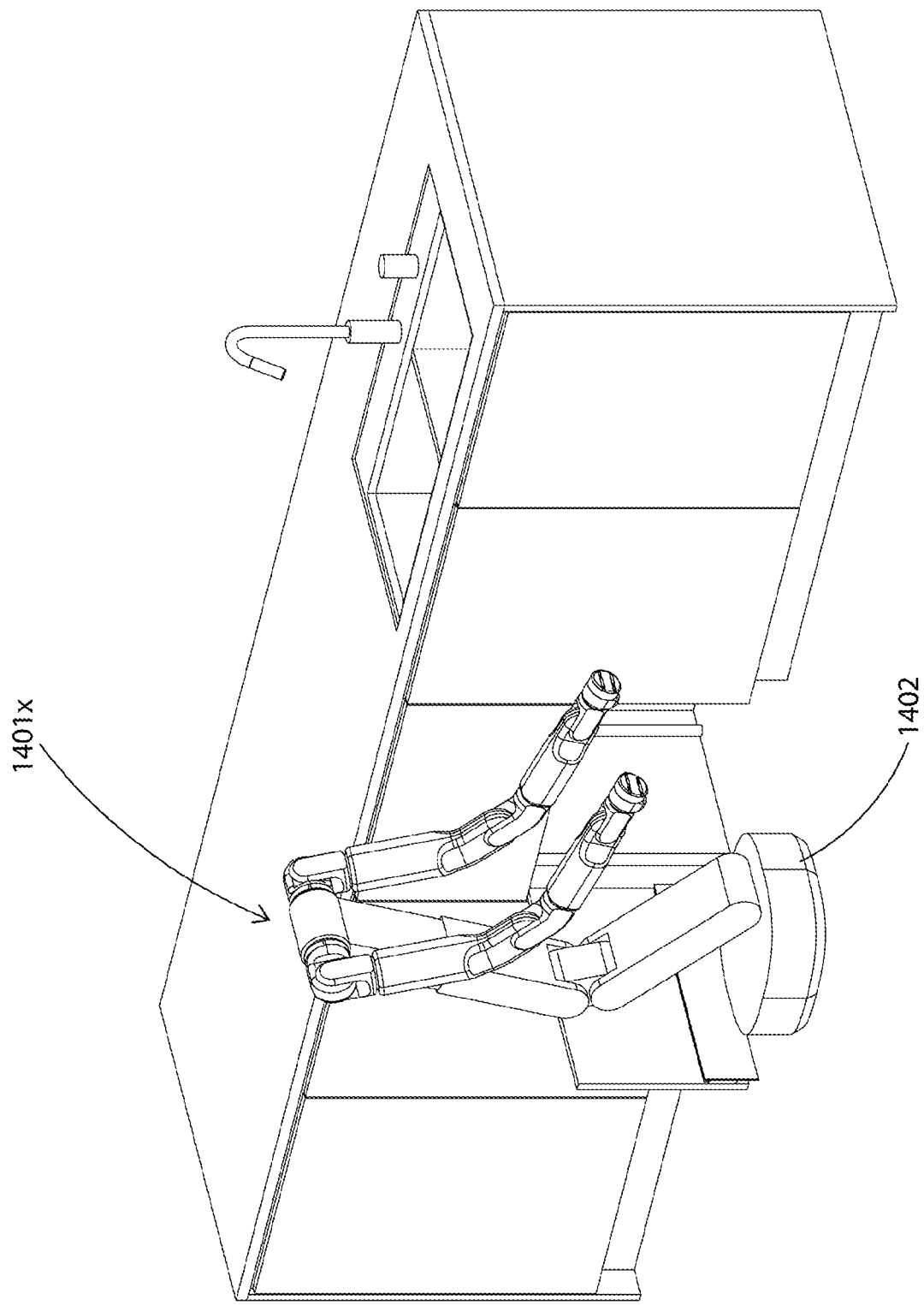

FIGS. 14A-14E illustrate an alternative embodiment for a robotic system presently disclosed. In this embodiment, and as shown in FIG. 14A, compact dishwasher 1430 resides in an upper location of kitchen cabinet storage location 1450; for example, compact dishwasher 1430 may be configured to reside in a cabinet drawer. As shown in FIG. 14B, in this embodiment, collapsible robot 1401 may self-store in a compact geometry 1401r adjacent to and below compact dishwasher 1430. As illustrated in FIGS. 14C-14E, collapsible robot 1401 comprises a mobile base 1402 configured to translate along the floor to support and stabilize collapsible robot 1401 while in its compact geometry configuration 1401r and deployed geometry configuration 1401x.

Figure 15A:
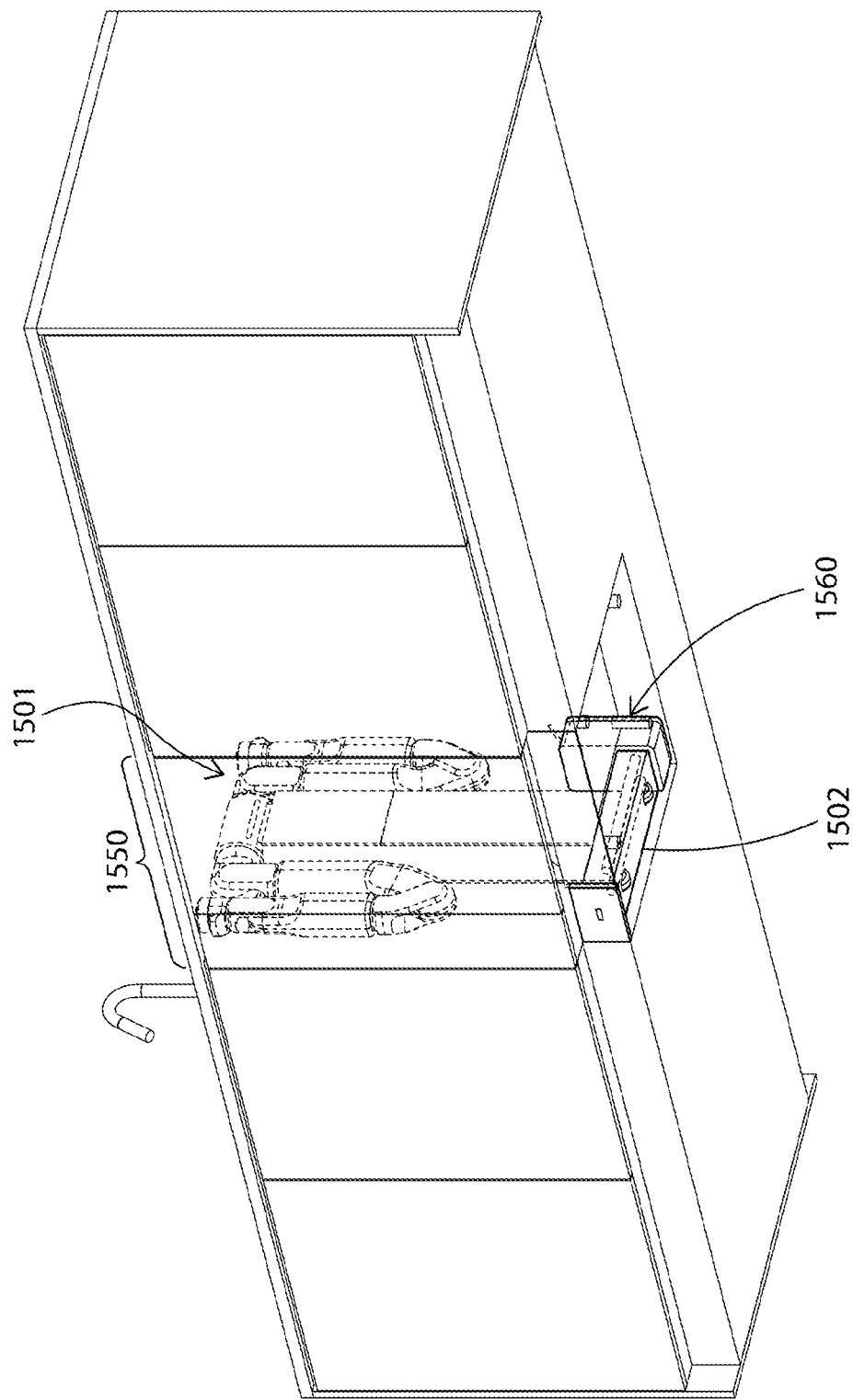
Figure 15B:
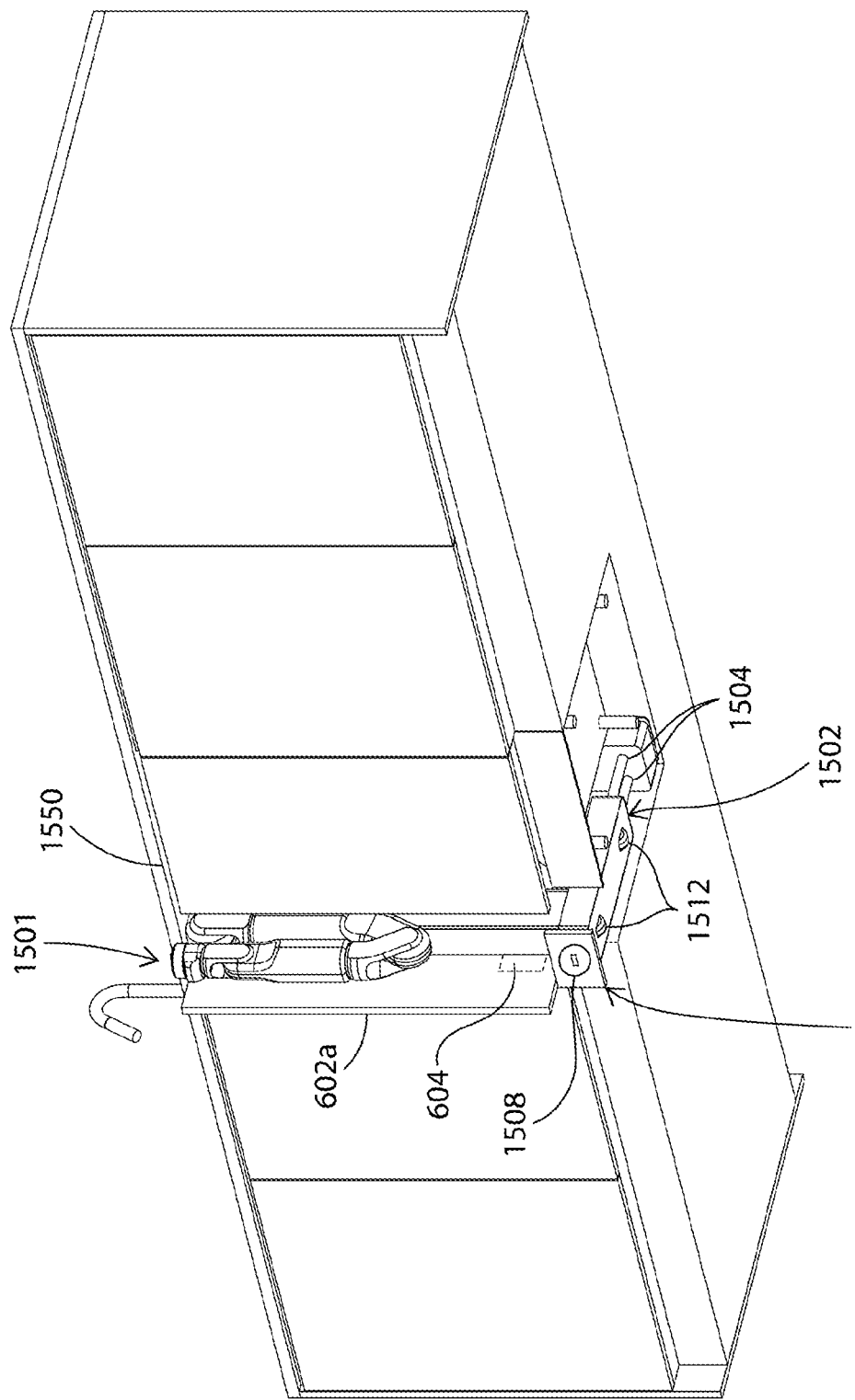

FIGS. 15A-15E illustrate another alternative embodiment of a collapsible robot for the robotic system presently disclosed. In this embodiment, and as shown in FIGS. 15A and 15B, a collapsible robot 1501 comprises a base 1502 connected to one or more telescoping rails 1504 residing within enclosure 1550 and connected to powered docking station 1560. Powered docking station 1560 provides power to collapsible robot 1501 through at least one telescoping rail 1504. Telescoping rail 1504 acts as a mechanical guide rail configured to permit controlled and collision-free automatic ingress and automatic egress of collapsible kitchen robot 1501 into and out of enclosure 1550 via a set of motorized wheels 1512 integral with a base 1502.

Referring to FIG. 15B, in one embodiment, a door sensor 1508 is connected to automatic toe kick 1506; door sensor 1508 is configured to detect any obstacles before control circuitry 1510 (not shown) engages door drive 604 to open compact robot door 602a. In this embodiment, automatic toe kick 1506 is attached to collapsible robot 1501 and moves along with it. In some embodiments, door sensor 1508 may be a proximity sensor.

Figure 15D:
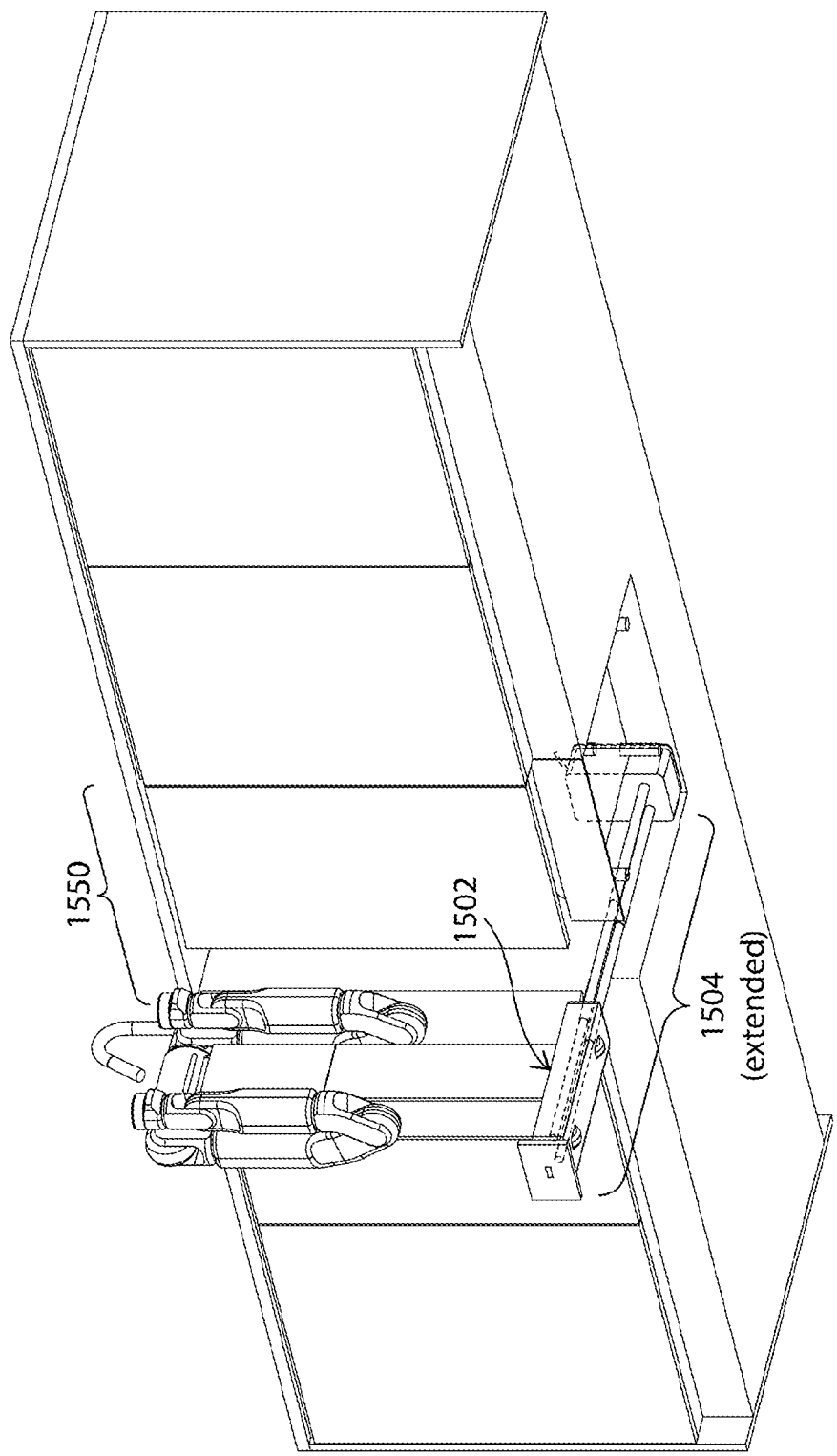
Figure 15E:
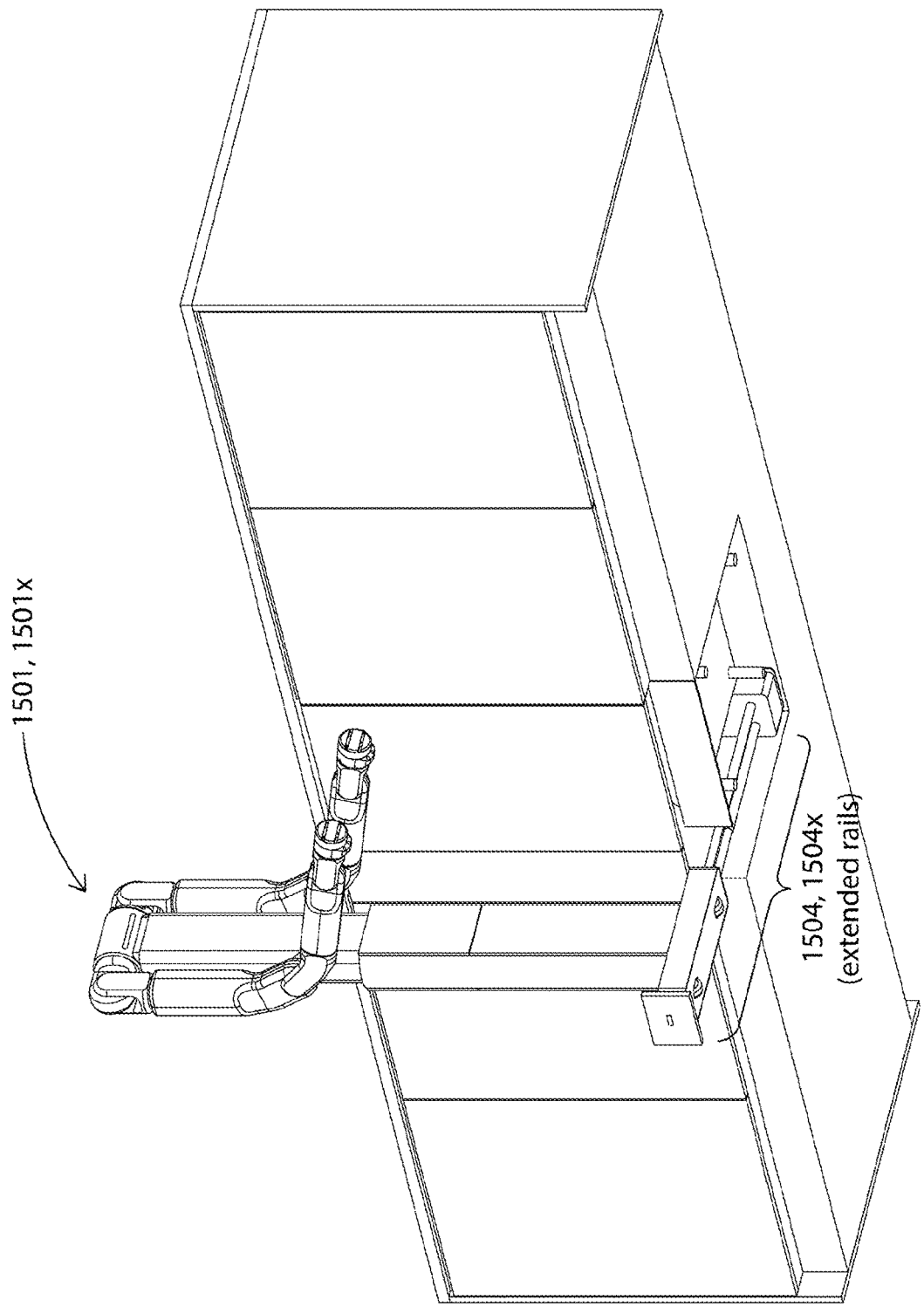

The embodiment shown if FIGS. 15C-15D collectively illustrate egress of collapsible robot 1501 out of enclosure 1550 as base 1502 is pushed outward by motorized action of base wheels 1512 and the one or more telescoping rails 1504 as they extend outwards from enclosure 1550. As shown in FIG. 15E, in some embodiments, collapsible robot 1501 self-deploys into a deployed geometry once telescoping rails 1504 are fully extended and collapsible robot 1501 is cleared of enclosure 1550 (e.g., entirely outside of it).

Figure 16A:
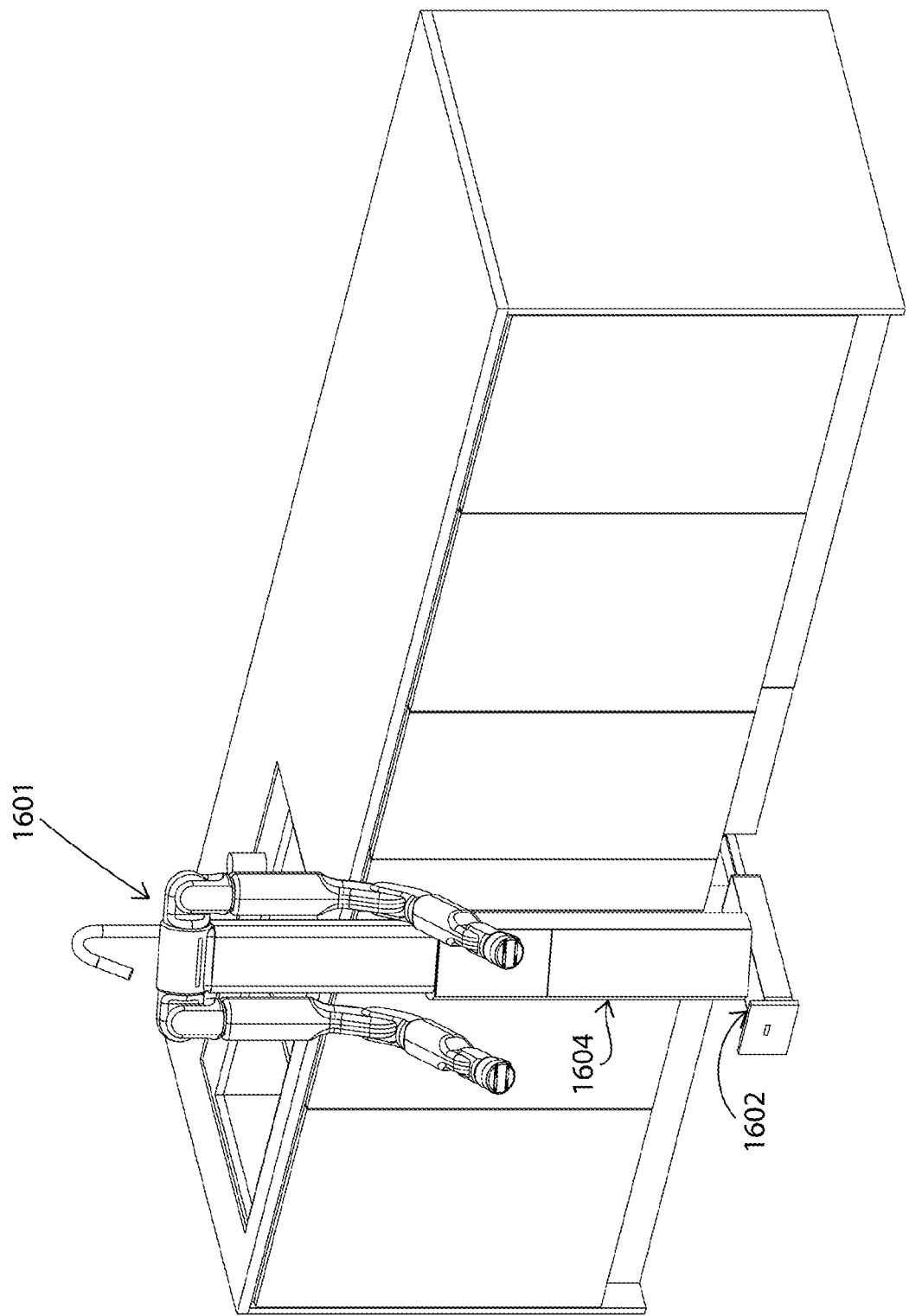
FIGS. 16A-16C illustrate an embodiment of a pivoting base of a collapsible robot of the robotic system of the present disclosure.
Figure 16B:
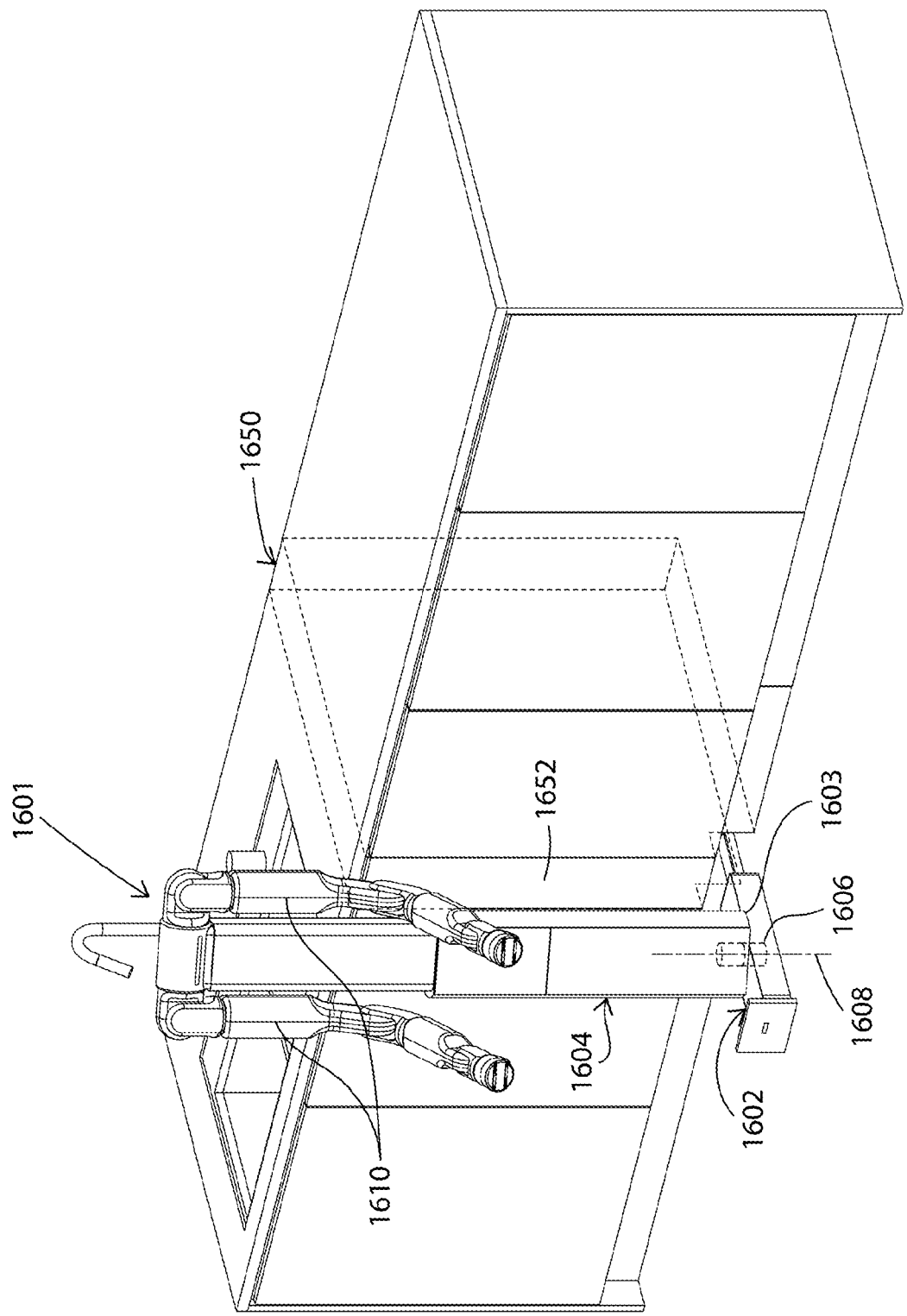
Figure 16C:
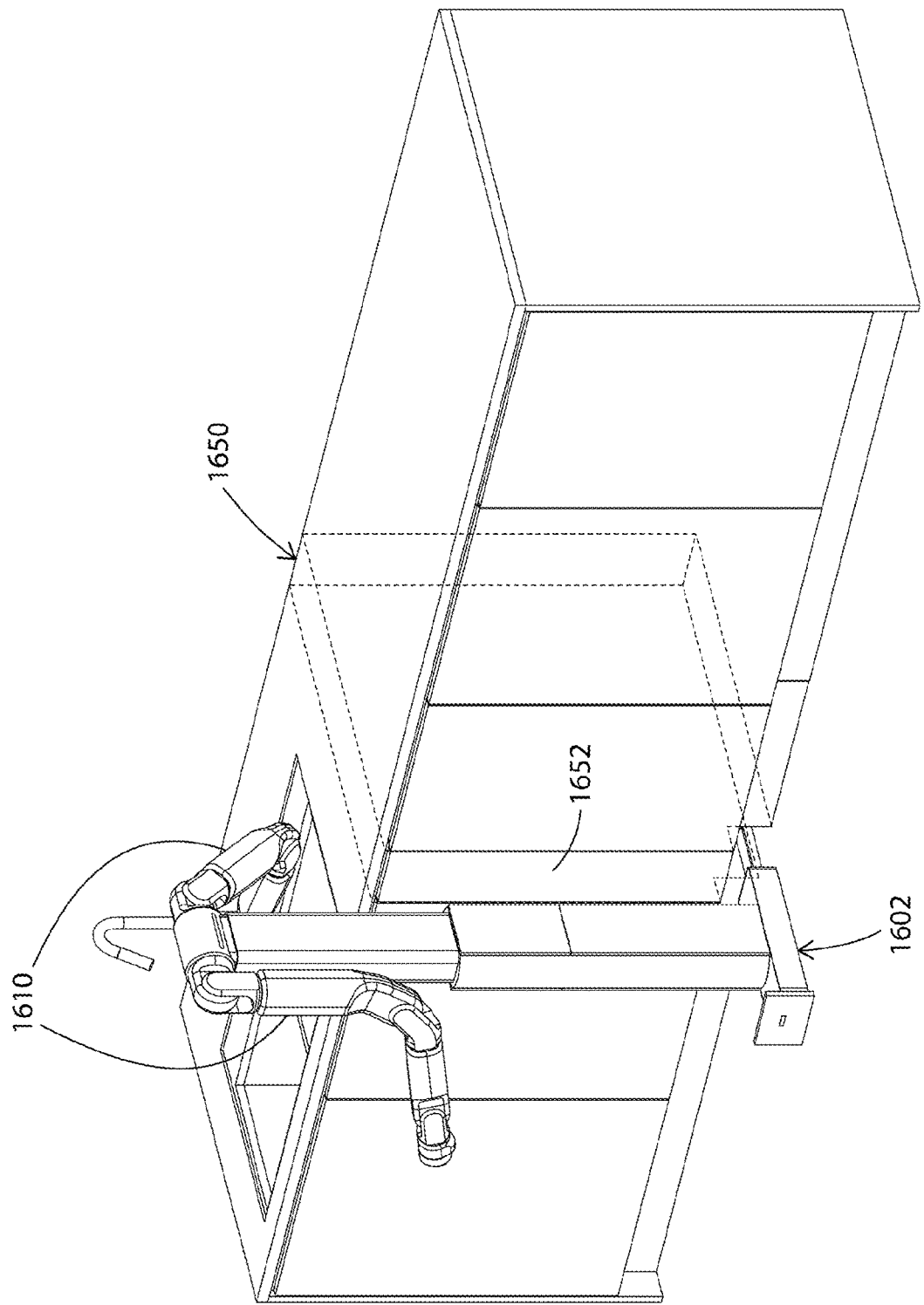

FIGS. 16A-16C illustrate an embodiment of a pivoting base of a collapsible robot of the robotic system presently disclosed. In some embodiments, and as shown in FIG. 16A, a collapsible robot 1601 includes a pivoting base 1602 connected to adjustable body 1604 at a base end 1603. As shown in FIG. 16B, pivoting base 1602 comprises a motor 1606 configured to pivot adjustable body 1604 about an axis 1608 orthogonal to base 1602. As collectively shown in FIGS. 16A-16C, pivoting base 1602 provides improved flexibility of collapsible robot 1601 when changing orientation of robotic arms 1610 with respect to a worksurface, and permits collapsible robot 1601 to align adjustable body 1604 with an entrance 1652 to an enclosure 1650 for self-storage.

Control Circuitry

Figure 17:
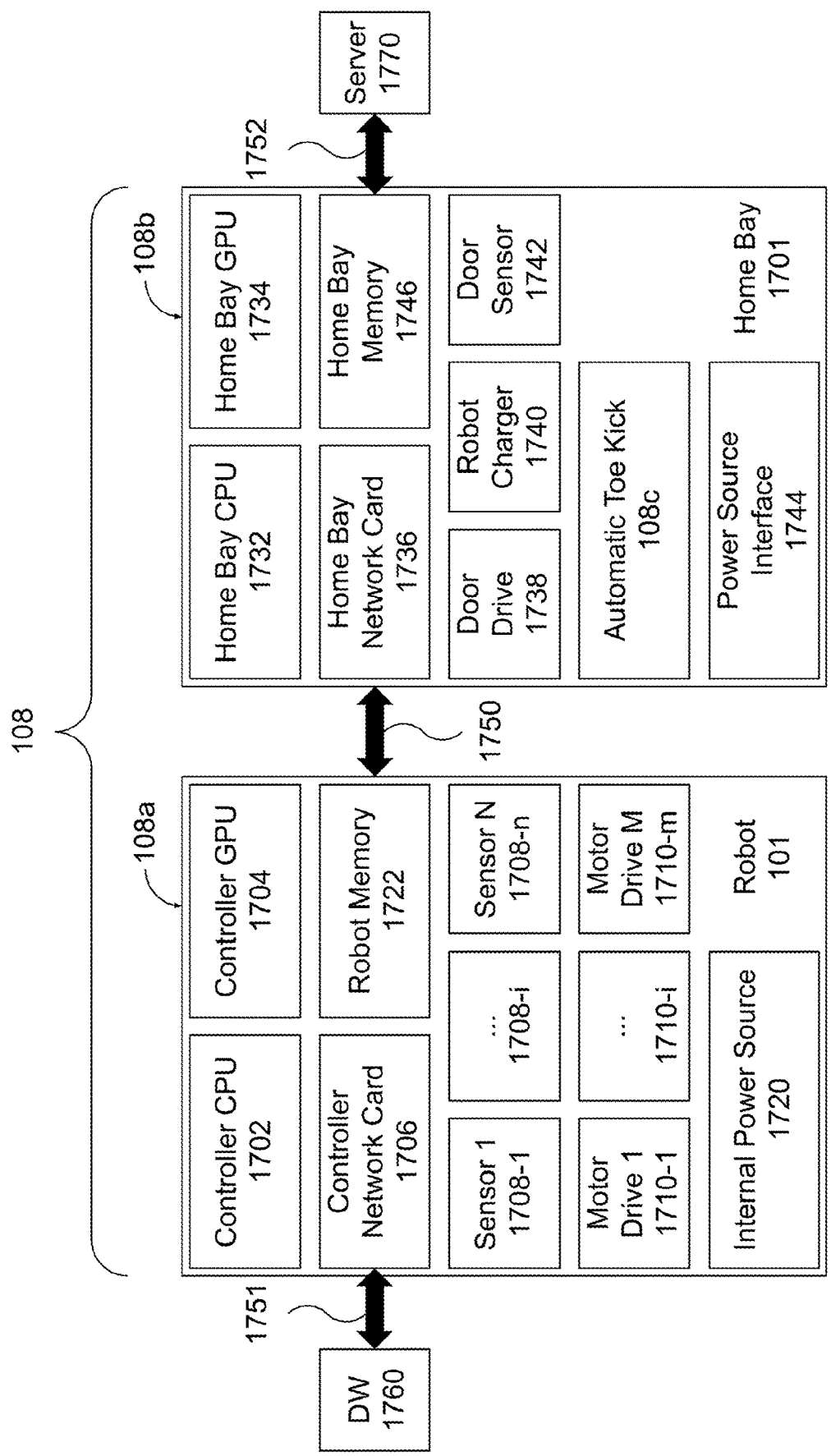
FIG. 17 is a schematic drawing of one embodiment of control circuitry for the robotic control system of the present disclosure.

FIG. 17 is a schematic drawing of one embodiment of control circuitry for the robotic control system presently disclosed. In the embodiment shown, and referring also to FIG. 1B, control circuitry 108 coordinates controlled and collision-fee movements of collapsible robot 101, which is generally configured to extend and retract one or more robotic arms 110 in order to perform tasks at or above a worksurface 120. In some embodiments, and as described above, control circuitry 108 may comprise robot control circuitry 108a connected to collapsible robot 101, and home bay control circuitry 108b connected to powered docking station 160. In some embodiments, control circuitry 108 is configured to receive an activation signal from a user or the collapsible robot 101, and to generate a plurality of control signals in response to the activation signal to coordinate collision-free ingress and collision-free egress of the collapsible robot into and out of a storage location below worksurface 120—including a self-collapse of the robot into a compact geometry configuration for self-storage, as well as a self-deployment of the robot into a deployed geometry configuration after emerging from self-storage. In some embodiments, control circuitry 108 is also configured to coordinate automatic retractions and extensions of robotic arms together with extension, retraction and translation movements of the adjustable body, in a home-use environment such as a residential kitchen.

In some embodiments, and as shown in the schematic diagram of FIG. 17, control circuitry 108 is partitioned into three main components: robot control circuitry 108a; home bay control circuitry 108b; and automatic toe kick control circuitry 108c (which may be incorporated into home bay control circuitry 108b, as shown).

Referring to FIG. 17, in the embodiment shown, robot control circuitry 108a is connected to or integral with robot 101 and comprises: (a) a robot controller CPU 1702; (b) a robot controller graphics processing unit (GPU) 1704, which assists in collision avoidance, and in some embodiments comprises a system-on-a-chip; (c) a robot controller network card 1706, which is configured communicate with a wireless-enables automatic dishwasher 1760 over a wireless communication link 1751; (d) a set of n sensors {1708-1, ..., 1708-i, ..., 1708-n}; (e) a set of m motors {1710-1, ..., 1710-i, ... 1710-m}; (f) an internal power source 1720; (g) a robot nonvolatile computer memory 1722; and (h) a wireless communication link 1750 that enables robot 101 to communicate wirelessly with home bay 1701. In some embodiments, these robot control circuitry components are interconnected and function in accordance with the detailed embodiments of the sensors, motors and control aspects of collapsible robot 101 as described herein.

Referring to FIG. 17, in the embodiment shown, home bay control circuitry 108b is connected to or integral with home bay 1701 and comprises: (a) a home bay controller CPU 1732, which performs the bulk of the computer processing for the robotic system; (b) a home bay controller GPU 1734; (c) a home bay controller network card 1736, which is configured to communicate over a wireless communication link 1752 with a server 1770; (d) a door drive 1738; (e) a home bay robot charger 1740; (f) a door sensor 1742; (g) a power source interface 1744; (h) a home bay non-volatile computer memory 1746; and (i) a wireless communication link 1750 that enables home bay 1701 to communicate wirelessly with robot 101. In some embodiments, and as shown in FIG. 17, home bay control circuitry also includes automatic toe kick control circuitry 108c, as described above. In some embodiments, these home bay control circuitry components are interconnected and function in accordance with the detailed embodiments and control aspects of robotic system 100 as described herein.

Figure 18:
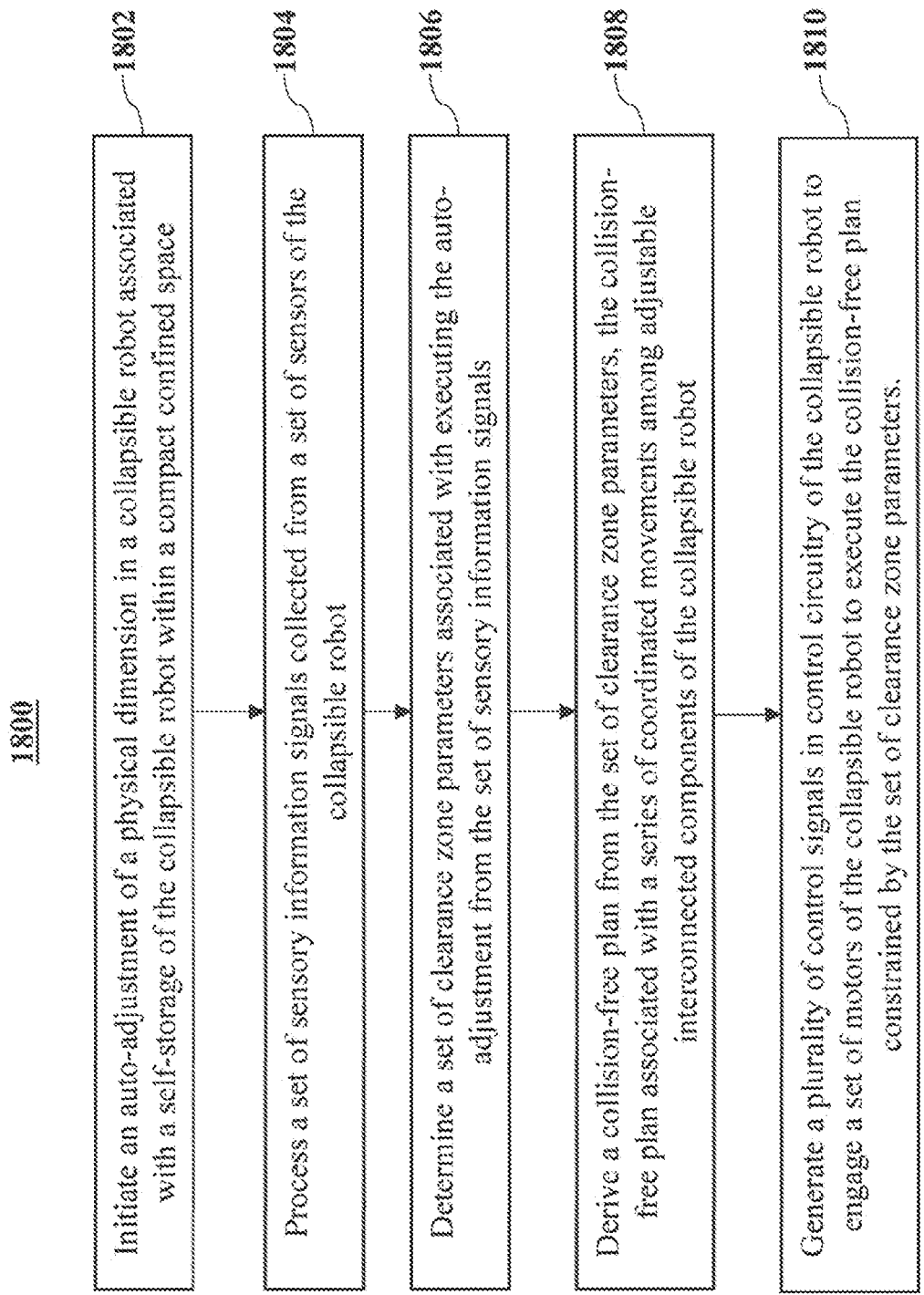
FIG. 18 is a flowchart describing one embodiment of a process for operating the robotic system of the present disclosure.

FIG. 18 is a flowchart describing one embodiment of a process for operating the robotic system of the present disclosure. In general, the robotic system presently disclosed initiates and performs a controlled collapse of the collapsible robot into a pre-defined compact geometry that permits self-storage in a confined, compact area when not in use. In order to perform a safe and collision-free movement, the system first determines if the environment presents any obstacles or impediments. Similarly, the system also coordinates collision-free self-deployments of the robot into a deployed geometry suitable for performing autonomous tasks outside of the compact storage area, after establishing safe clearance for such self-deployment.

Thus, in some embodiments, and as shown in FIG. 18, a method 1800 for operating a collapsible robot comprises the following steps:

Step 1802 includes initiating an auto-adjustment of a physical dimension in a collapsible robot. The auto-adjustment is associated with a self-storage of the collapsible robot within a compact confined space; it may include a self-collapse of the collapsible robot into its compact geometry configuration prior to self-storage, or it may include a self-deployment of the collapsible robot into a deployed geometry configuration so that it is ready to perform tasks.

Step 1804 includes processing a set of sensory signals relating to information collected from the robot's set of sensors. In some embodiments, the sensory information signals are collected from one or more cameras mounted on the collapsible robot and comprise digital images of the operating environment; in some embodiments, the sensory information signals are collected using LiDAR sensors.

Step 1806 includes determining a set of clearance zone parameters associated with executing the auto-adjustment from the set of sensory information signals. In some embodiments, clearance zone parameters may include three-dimensional spaces into which the collapsible robot may safely self-deploy (or self-collapse) without colliding with any object in the operating space.

Step 1808 includes deriving a collision-free plan from the set of clearance zone parameters, where the collision-free plan comprises a dataset associated with a series of coordinated movements among the robot's adjustable interconnected components. Collision-free plans include plans where the collapsible robot may either self-deploy or self-collapse without colliding with objects in the collapsible robot's operating space and without colliding with its own interconnected parts (for example, parts of its adjustable body and/or its retractable arms).

Finally, Step 1810 includes generating a plurality of control signals in the robot's control circuitry to engage the set of motors that execute the collision-free plan constrained by the set of clearance zone parameters.

In some embodiments, auto-adjustments of the robot may be initiated after the robotic system receives an activation signal from a user or from the robot itself requesting self-storage. In some embodiments, once the robotic system establishes that no obstacles or other impediments in the environment are present, a controlled collapse of the robot into a pre-defined compact geometry configuration that permits self-storage in a compact confined space may be initiated, and a process of collision-free ingress into that compact confined space is performed. Further details on one embodiment for collision-free self-collapse and self-storage are described below.

Similarly, in some embodiments, auto-adjustments of the robot may be initiated after the robotic system receives an activation signal from a user, from the robot itself, or from an external sensor requesting self-deployment from a storage location. In some embodiments, once the robotic system establishes that no obstacles or other impediments to egress and/or deployment in the environment are present, a collision-free exit from the storage location may be initiated. Once egress from the storage location is completed and no obstacles to deployment are detected, a self-extension (self-deployment) of the robot from a compact geometry configuration associated with self-storage into a deployed geometry configuration (for performing tasks) may begin. The deployed geometry configuration permits the robot to obtain a configuration suitable to perform tasks at or above a worksurface located outside of the storage location's compact confined space. Further details of one embodiment for task activation including collision-free egress and self-deployment from a compact storage location are described below.

Collision-Free Self-Storage, Collision-Free Deployments, and Collision-Free Plans The robotic system presently disclosed includes a collapsible robot configured to extend and retract adjustable robotic components (e.g., at least one robotic arm to perform tasks above a worksurface), and control circuitry for coordinating its movements, such as a controlled, collision-free self-collapse, collision-free self-deployments, and collision-free movements into and out of the compact storage area.

In some embodiments, control circuitry of the robotic system of the present disclosure includes a network interface card configured to communicate wirelessly with a server. In such embodiments, a collision-free collapse of the set of retractable robotic arms may be accomplished with reference to a database of collision-free plans stored on the server and accessible by the control circuitry through the network interface card.

In some embodiments, deriving a collision-free plan comprises retrieving the collision-free plan from a database of collision-free plans stored in a non-volatile computer memory, for example, in non-volatile computer memory 1746 of home bay control circuitry 108*b*. In some embodiments, deriving the collision-free plan comprises computing the dataset and/or instructions associated with the series of coordinated movements from the set of clearance zone parameters and the set of sensory information signals, and then saving the collision-free plan in a database of collision-free plans stored in a non-volatile computer memory of the control circuitry 108, for example non-volatile computer memory 1746.

Figure 19:
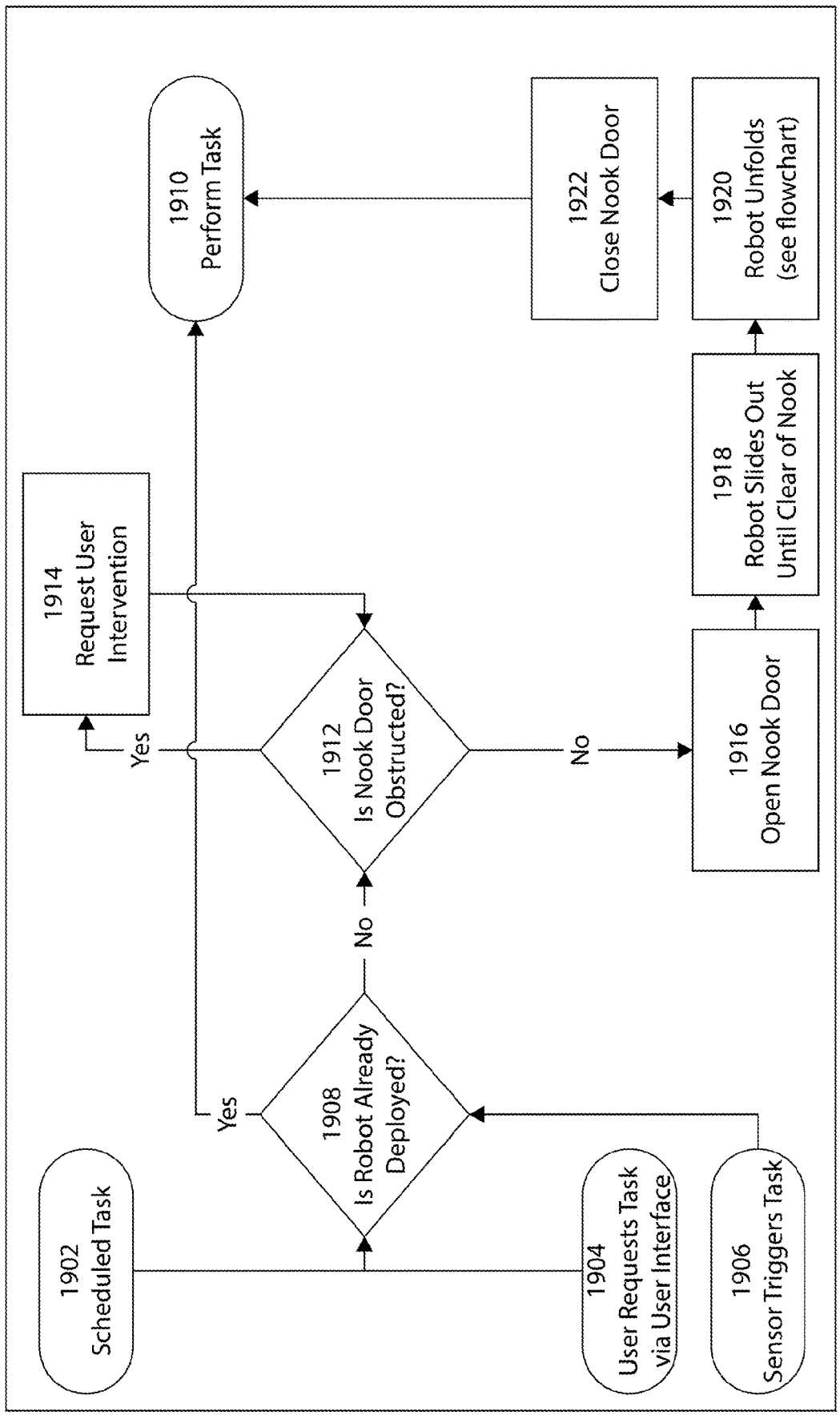
FIG. 19 is a flowchart describing one embodiment of a self-deployment process for the robotic system of the present disclosure in which a collapsible robot has been self-stored in a compact geometry configuration.

FIG. 19 is a flowchart describing further details of one embodiment of robotic system 100 performing the method of FIG. 18. In the embodiment shown, FIG. 19 describes a task activation process 1900, which includes egress and self-deployment for the robotic system of the present disclosure, in which a collapsible robot has been self-stored in a compact geometry configuration (e.g., 101*r* of FIG. 1B) within a compact enclosure (e.g., 150 of FIG. 1B).

In some embodiments, and as shown in FIG. 19, a task may be activated in one of three ways: (1) a task request is scheduled (Step 1902); (2) a user enters a task request via an input to a user interface (Step 1904); or (3) one or more sensors in the system triggers a task request (Step 1906) such sensors may include, for example, a camera system trained with artificial intelligence to recognize circumstances warranting the robot's deployment.

For example, in the kitchen robot use case described above, one task may include cleaning dishes ("dish cleaning task"). In this scenario, Step 1902 may activate the dish cleaning task at a specific and pre-scheduled time (e.g., after dinner at 8:00 pm), Step 1904 may activate the dish cleaning task upon an express user request (e.g., via a mobile app API communicating over a wireless communication link to kitchen robot 301), or Step 1906 may activate the dish cleaning task via a kitchen camera system trained with artificial intelligence to recognize a collection of dirty dishes on a kitchen countertop next to a kitchen sink.

In some embodiments, and as shown in FIG. 19, once a specific task is initiated (via Steps 1902, 1904 or 1906), the following algorithm steps are performed by robotic system 100 via control circuitry 108*a*/108*b* and associated computer software executing on robot CPU 1702 and/or home bay CPU 1732:

In Step 1908, robotic system 100 performs a process to determine if the collapsible robot is already deployed, which may be signaled by a software status indicator stored in robot memory 1722 or in the home bay memory 1746, or it may be signaled via one or more sensors connected to the collapsible robot. If deployed, then control circuitry 108*b* initiates signals to perform the requested task (Step 1910). If not deployed, then (in this embodiment) collapsible robot 101 is presumed stored in a compact geometry configuration behind an enclosure door, and Step 1912 is performed.

Step 1912 processes door sensor signals to confirm there is no door obstruction, as described above (see descriptions of Doors & Toe Kicks). If there is a door obstruction, then Step 1914 seeks user intervention to clear the obstruction— for example, by generating audible and/or visual signals in the operating environment. In some embodiments, a user employs a mobile phone app (not shown) to monitor and interact with robotic system 100. In such embodiments, robotic system 100 may seek user intervention via a notification signal over a wireless communication link to the mobile phone app on the user's mobile phone to signal the presence of a door obstruction preventing self-deployment which needs to be cleared (as described above).

Step 1916 performs a process to open a door to enclosure 150 (or nook) once robotic system 100 determines there is no door obstruction (as, for example, described above with respect to door sensor 706 of FIG. 7B). Once the door is opened via Step 1916, Step 1918 generates control signals to effect egress of the collapsible robot out of the nook; then, Step 1920 initiates a self-deployment of the collapsible robot ("robot unfolds"), as described generally in FIG. 18 (for which the auto-adjustment is a self-deployment) and in further detail below (see FIG. 20). In this embodiment, once self-deployment is successfully initiated, Step 1922 closes the nook door, and Step 1924 initiates signals to perform the requested task.

In the above-described embodiment, Steps 1902, 1904, 1906, 1908, 1912, 1914, 1916, and 1922 are performed by software operating on home bay control circuitry 108*b* (including automatic toe kick control circuitry 108*c*, if applicable), while Steps 1910, 1918, and 1920 are performed collectively by software operating on robot control circuitry 108*a* and home bay control circuitry 108*b* (including automatic toe kick control circuitry 108*c*, if applicable).

Figure 20:
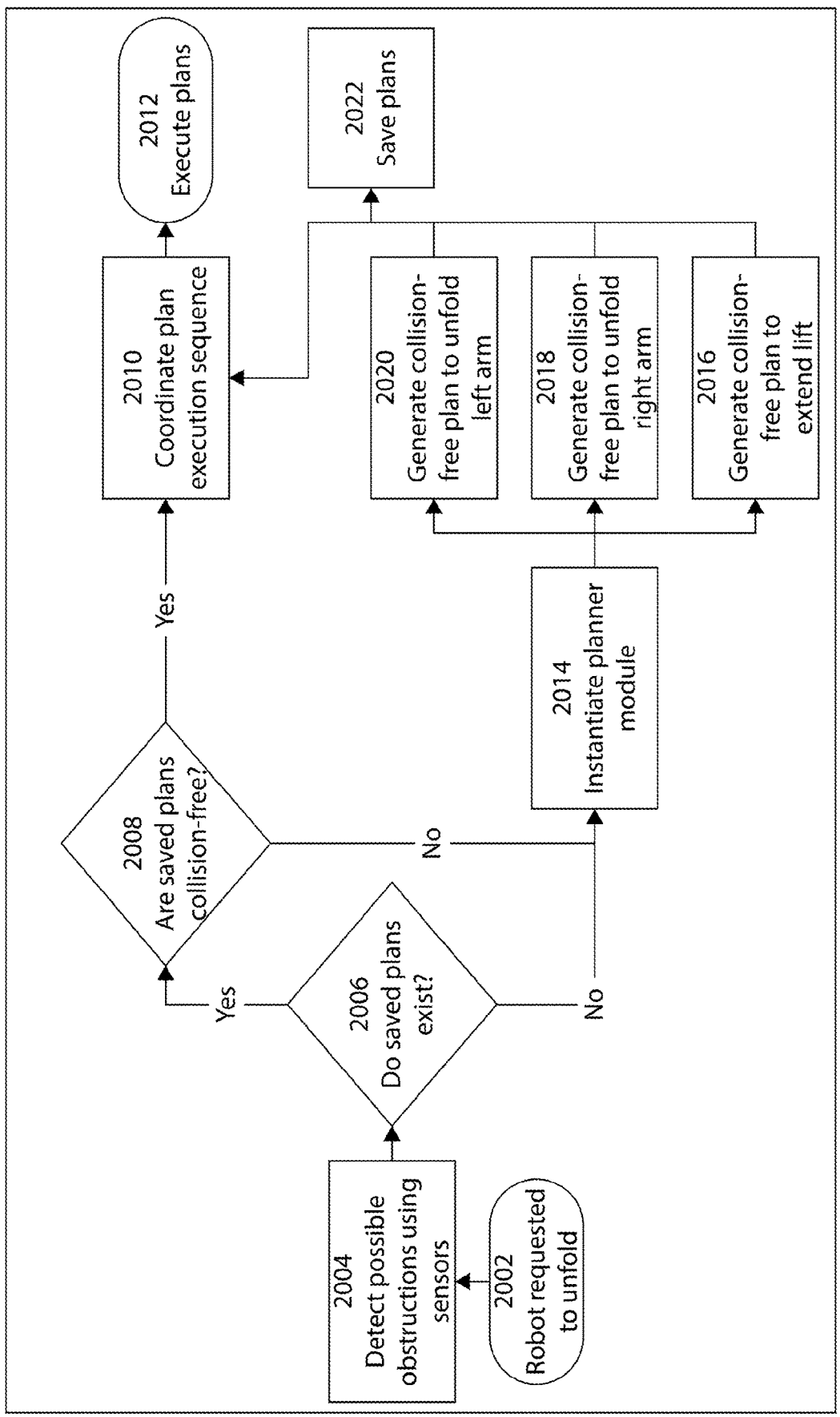
FIG. 20 is a flowchart describing one embodiment of a self-deployment process for a collapsible robot of the robotic system of the present disclosure.

FIG. 20 is a flowchart describing one embodiment of a self-deployment process 2000 for a collapsible robot of the robotic system of the present disclosure. FIG. 20 describes further embodiment details for method steps generally described in FIG. 18; FIG. 20 also describes one embodiment for Step 1920 ("Robot Unfolds") described in FIG. 19. In this embodiment, collapsible robot 101 has two retractable robotic arms and an adjustable body.

In some embodiments, and as shown in FIG. 20, once a collision-free egress from compact enclosure 150 is achieved, the following algorithm steps are performed by robot system 100 and/or via control signals communicated wirelessly to the collapsible robot 101 to self-deploy the collapsible robot into a deployed geometry configuration suitable for performing tasks at or above a worksurface outside of a compact enclosure.

In Step 2002, a self-deployment initiation signal is received, such as, for example, by Step 1916 once the nook door is fully opened (as described above). Step 2002 is a specific example of Step 1802 (FIG. 18) for initiating an auto-adjustment in which collapsible robot 101 is requested to self-deploy ("unfold"). Upon receipt of the self-deployment initiation signal, the following sequence of steps occurs:

Step 2004 performs a process whereby the robotic system detects possible obstructions using sensors (described above) such as a front sensor array 112*c* (FIG. 1E) and wrist sensor arrays 112*a* (FIG. 1D).

Step 2006 performs a process to determine if saved movement plans are stored in non-volatile computer memory as "cached motion plans"-either in robot memory 1722 or home bay memory 1746, or in a remote non-volatile memory (not shown) on server 1770 communicating with robotic system 100 over a wireless communication link 1752. Such cached motions plans may include, for example, one plan for unfolding or otherwise extending a right robotic arm, one plan for unfolding or otherwise extending a left robotic arm, and one plan for lifting or otherwise extending adjustable body 104. In some embodiments, a plurality of cached motion plans may exist for each of the movable and interconnected robotic components. If cached motion plans exist, then Step 2008 is performed.

Step 2008 performs a process to determine if the cached motion plans are collision-free. In some embodiments, a collision-free plan is determined with reference to a set of clearance zone parameters associated with sensory information collected from sensors at Step 2004. If the cached motion plans are determined to be collision-free, then Step 2010 performs a process to coordinate an execution sequence for those plans. More specifically, Step 2010 acts as a scheduler for executing each cached motion plan for each moving component of collapsible robot 101, so as to avoid collisions between such moving components. In some embodiments, Step 2010 may intermix motion plans for various parts of the interconnected robotic components—for example, Step 2010 may schedule unfolding one part of the right robotic arm, then one part of the left robotic arm, then another part of the right robotic arm, then another part of the left robotic arm, etc. Such alternating/intermixing of motion plans, in some embodiments, may speed up the overall unfolding process represented by FIG. 20. Once Step 2010 has completed its coordination task to determine a scheduling sequence for unfolding collapsible robot 101, Step 2012 executes the cached motion plans in accordance with the scheduling sequence defined by Step 2010. In some embodiments, Step 2012 is performed entirely by software operating on robot control circuitry 108*a*.

If Step 2006 determines that no cached motion plans exist, or if Step 2008 determines that the cached motion plans are not collision-free, then Steps 2014, 2016, 2018 and 2020 are performed before Step 2010 may occur. Specifically:

Step 2014 instantiates a planner module, which in some embodiments comprises software executing on home bay control circuitry 108*b*, to establish motion plans for each of the moveable robotic components (which, in this example, include a set of two retractable robotic arms 110—left robotic arm and right robotic arm—and an adjustable body 104); in some embodiments, the planner module of Step 2014 may alternatively or additionally comprise software executing on robot control circuitry 108*a*. In some embodiments, the planner module may include determining a set of clearance zone parameters associated with executing the requested self-deployment (unfolding) from a set of sensory information signals collected at Step 2004.

Step 2016 then generates a collision-free plan to extend ("lift") the adjustable body; Step 2018 generates a collision-free plan to unfold a right arm; and Step 2020 generates a collision-free plan to unfold a left arm. In this manner, planner module may derive an overall collision-free plan from a set of clearance zone parameters and associated with a series of coordinated movements among adjustable interconnected components of collapsible robot 101. The overall collision-free plan, along with the collision-free plans for each of the robotic components, is then saved in a dataset comprising all cached motion plans (Step 2022). Upon deriving the collision-free plans, Steps 2010 and 2012 may be performed, as described above.

Figure 21:
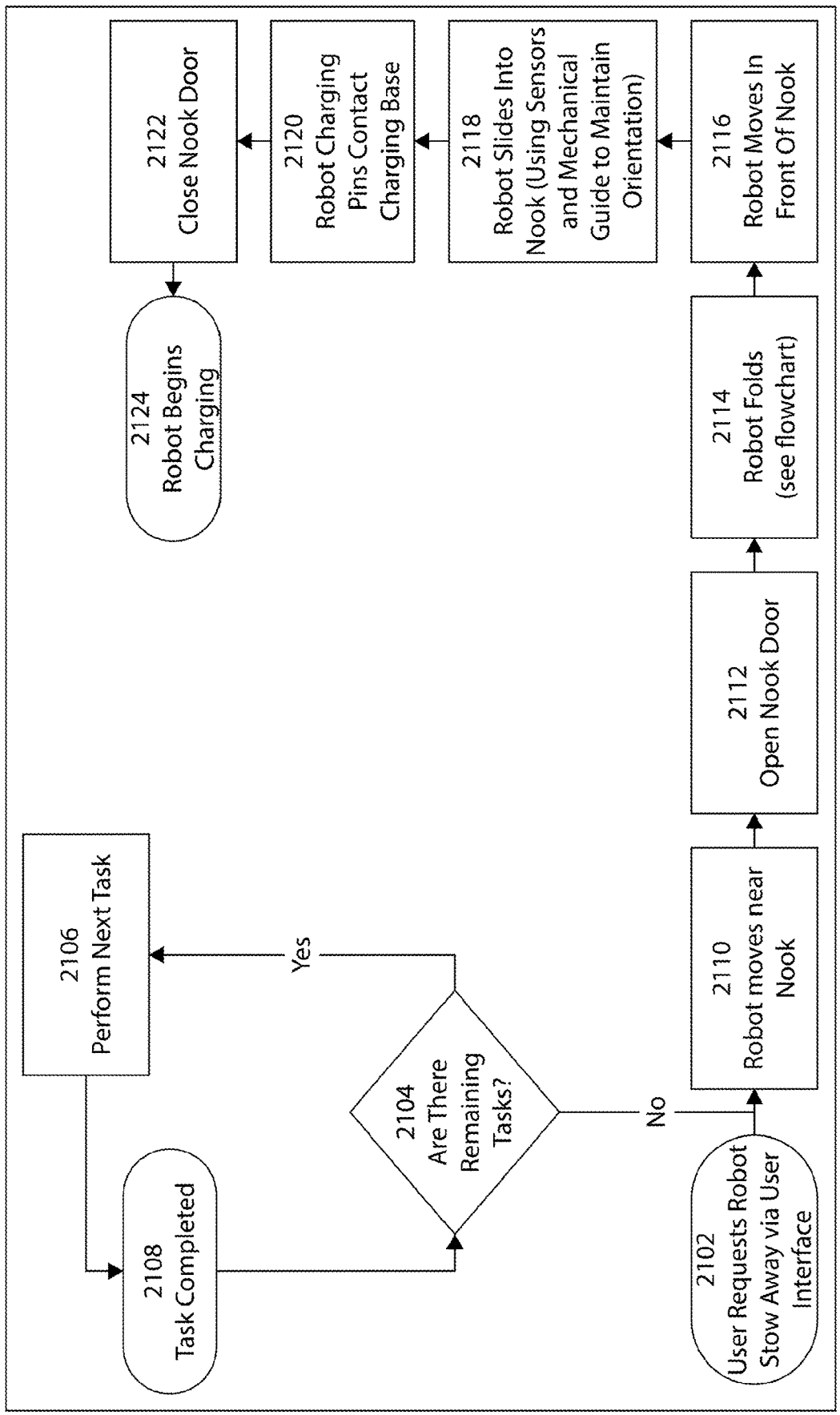
FIG. 21 is a flowchart describing one embodiment of a self-storing process for a collapsible robot of the robotic system of the present disclosure.

FIG. 21 is a flowchart describing one embodiment of a self-storing process 2100 for a collapsible robot of the robotic system of the present disclosure. In this embodiment, and with reference to FIGS. 1A and 1B, collapsible robot 101 starts in a deployed geometry configuration 101*x* suitable to perform tasks at or above a worksurface 120 in an operating environment. In some embodiments, self-storage may be initiated in one of two ways: (1) in Step 2102, a user requests collapsible robot 101 to self-store via an activation signal ("enter nook") from a user interface, such as a mobile phone app and touchscreen (not shown); or (2) in Step 2104, robotic system 100 determines if there are any remaining tasks; if so, then Step 2106 performs the next remaining task, and Steps 2104 and 2106 loop until all tasks are completed. Once there are no remaining tasks, then Step 2108 generates an activation signal ("enter nook") to initiate the self-storing process 2100.

In some embodiments, and as shown in FIG. 21, once an activation signal ("enter nook") for self-storage is received, the following algorithm steps are performed by robotic system 100 in connection with a collision-free self-storage process 2100:

First, Step 2110 performs a process whereby robotic system 100 establishes that no obstacles or other impediments to self-storage exist. As described above, this step is performed by robot control circuitry 108*a* and software executing on robot controller GPU 1704, which performs collision avoidance algorithms having sensory information signals as inputs. If no such obstacles/potential collisions are detected, software operating on home bay control circuitry 108*b* of robotic system 100 directs movement of collapsible robot 101 near a pre-defined nook (storage location 150 having a docking station 160) for collapsible robot 101.

If storage location 150 includes a door, robotic system 100 establishes clearance for opening the door using, for example, door sensor 706 (as described above; see Doors & Toe Kicks). If clearance is detected, robotic system 100 opens the door (Step 2112) using, for example, door drive 604 (described above), and a collision-free self-collapse is initiated (Step 2114; as further described below); collapsible robot 101 thereby assumes, for example, compact geometry configuration 101*r*. In some embodiments, one general process for performing the collision-free collapse is described in the flowchart of FIG. 18; a more detailed embodied is described below (with reference to FIG. 22)

Next, Step 2116 performs a process by which collapsible robot 101 (in its compact geometry configuration 101*r*) moves to an entrance of storage location 150. At Step 2118, software operating on home bay control circuitry 108*b* directs collapsible robot 101 (in its compact geometry configuration 101*r*) to enter storage location 150; collapsible robot 101 then enters storage location 150, using robot control circuitry 108*a* and associated software, and self-docks at powered docking station 160, thereby electrically coupling (at Step 2120) to a power source via power source 1744 (FIG. 17) of home bay 1701.

Once collapsible robot 101 is self-docked at powered docking station 160, Step 2122 performs a process by which robotic system 100 closes the enclosure door using, for example, door drive 604, door sensor 706, and home bay control circuitry 108*b* (and automatic toe kick control circuitry 108*c*, where applicable), as described above. Once collapsible robot 101 is self-docked at powered docking station 160, collapsible robot 101 may begin charging (Step 2124).

Figure 22:
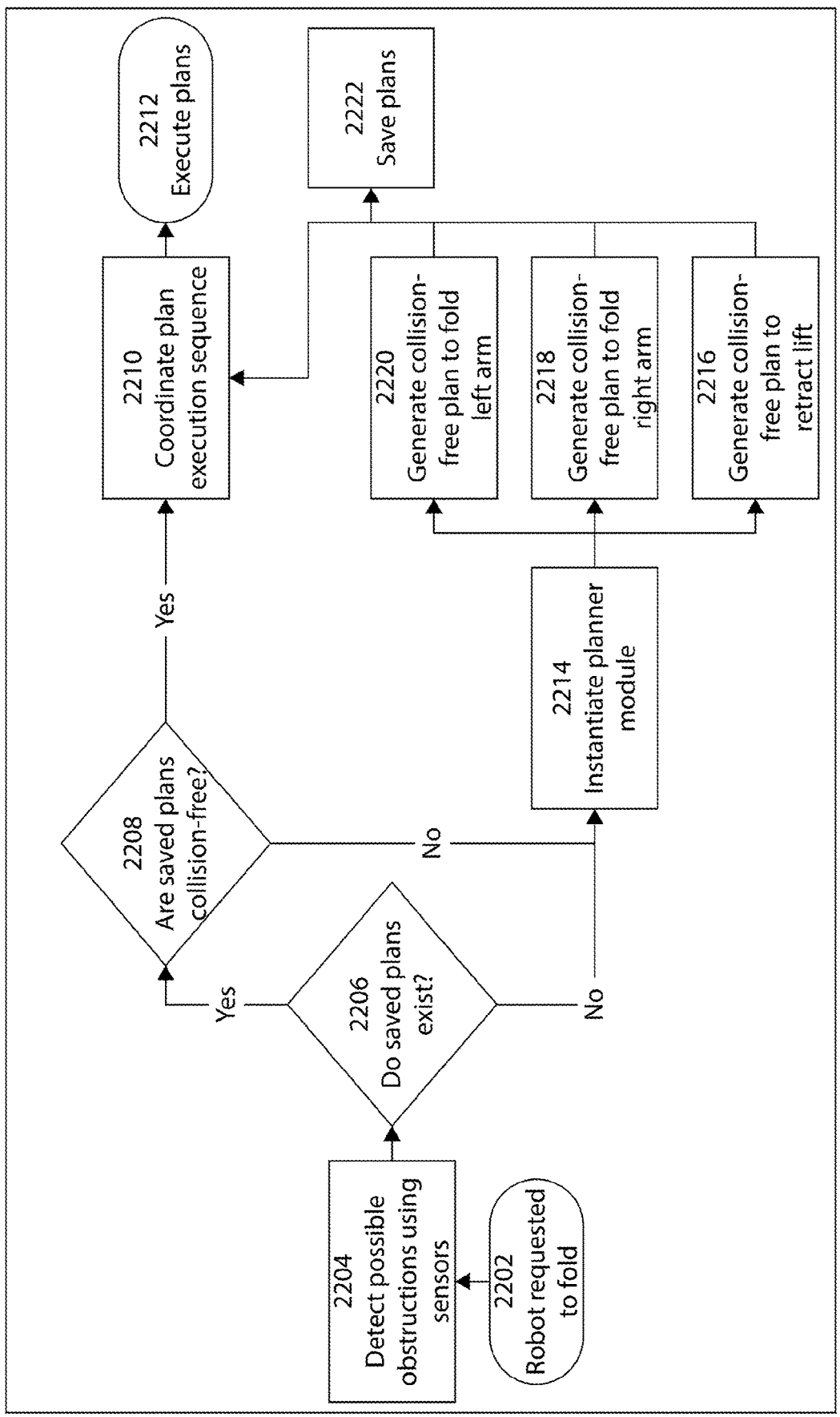
FIG. 22 is a flowchart describing one embodiment of an auto-collapse process for a collapsible robot of the robotic system of the present disclosure.

FIG. 22 is a flowchart describing one embodiment of an auto-collapse process 2200 for a collapsible robot of the robotic system of the present disclosure.

In some embodiments, and as shown in FIG. 22, once a collision-free movement to of collapsible robot 101 towards compact enclosure 150 is achieved, so that collapsible robot 101 is positioned in front of an enclosure door, the following algorithm steps are performed by robot system 100 and/or via control signals communicated wirelessly to collapsible robot 101 to self-collapse into a compact geometry suitable for self-storage in compact enclosure 150.

In Step 2202, a self-collapse initiation signal is received, such as, for example, by process Step 2112 once nook door is fully opened (as described above). Step 2202 represents a specific example of Step 1802 (FIG. 18) for initiating an auto-adjustment in which collapsible robot 101 is requested to self-collapse ("fold"). Upon receipt of the self-collapse initiation signal, the following sequence of steps occurs:

Step 2204 performs a process whereby robotic system 100 detects possible obstructions using sensors (described above), such as wrist sensor arrays 112*a* (FIG. 1D), base sensor array 112*b* (FIG. 1E), and front sensor array 112*c* (FIG. 1E).

Step 2206 performs a process to determine if saved movement plans are stored in non-volatile computer memory as "cached motion plans," either in robot memory 1722 or home bay memory 1746, or in a remote non-volatile memory (not shown) on server 1770 communicating with robotic system 100 over a wireless communication link 1752. Such cached motions plans may include, for example, one plan for folding or otherwise retracting a right robotic arm, one plan for folding or otherwise retracting a left robotic arm, and one plan for lifting or otherwise retracting adjustable body 104. In some embodiments, a plurality of cached motion plans may exist for each of the movable and interconnected robotic components. If cached motion plans exist, then Step 2208 is performed.

Step 2208 performs a process to determine if the cached motion plans are collision-free. In some embodiments, a collision-free plan is determined with reference to a set of clearance zone parameters associated with sensory information collected from sensors at Step 2204. If the cached motion plans are determined to be collision-free, then Step 2210 performs a process to coordinate an execution sequence for those plans. More specifically, and as with Step 2010 of self-deployment process 2000, Step 2210 acts as a scheduler for executing each cached motion plan for each moving component of collapsible robot 101, so as to avoid collisions between such moving components. In some embodiments, and similar to Step 2010 of self-deployment process 2000 (FIG. 20), Step 2210 may intermix motion plans for various parts of the interconnected robotic components—for example, Step 2210 may schedule folding one part of the left robotic arm, then one part of the right robotic arm, then another part of the left robotic arm, then another part of the right robotic arm, etc. Such alternating/intermixing of motion plans, in some embodiments, may speed up the overall unfolding process represented by FIG. 22. Once Step 2210 has completed its coordination task to determine a scheduling sequence for folding collapsible robot 101, Step 2212 executes the cached motion plans in accordance with the scheduling sequence defined by Step 2210. In some embodiments, Step 2212 is performed entirely by software operating on robot control circuitry 108*a*.

If Step 2206 determines that no cached motion plans exist, or if Step 2208 determines that the cached motion plans are not collision-free, then Steps 2214, 2216, 2218 and 2220 are performed before Step 2210 may occur. Specifically:

Step 2214 instantiates a planner module, which in some embodiments comprises software executing on home bay control circuitry 108*b* to establish motion plans for each of the moveable robotic components (which, in this example, include a set of two retractable robotic arms 110—left robotic arm and right robotic arm—and an adjustable body 104); in some embodiments, the planner module of Step 2214 may alternatively or additionally comprise software executing on robot control circuitry 108*a*. In some embodiments, the planner module may include determining a set of clearance zone parameters associated with executing the initiated self-collapse (folding) from a set of sensory information signals collected at Step 2204.

Step 2216 then generates a collision-free plan to retract the adjustable body ("retract lift"); Step 2218 generates a collision-free plan to fold a right arm; and Step 2220 then generates a collision-free plan to fold a left arm. In this manner, planner module may derive an overall collision-free plan from a set of clearance zone parameters and associated with a series of coordinated movements among adjustable interconnected components of collapsible robot 101. The overall collision-free plan, along with the collision-free plans for each of the robotic components, is then saved in a dataset comprising all cached motion plans. The overall collision-free plan, along with the collision-free plans for each of the robotic components, is then saved in a dataset comprising all cached motion plans (Step 2222). Upon deriving the collision-free plans, Steps 2210 and 2212 may be performed, as described above.

A collapsible robot has been disclosed that is capable of folding itself into a compact configuration and then self-storing in a compact confined space when not in use, and removing itself from the compact confined space and unfolding when needed for a task.

One embodiment includes a robotic system comprising a collapsible robot having a body, a base, one or more retractable robotic arms, a set of sensors, a set of motors, and control circuitry coupled to the set of sensors and the set of motors and configured to generate a set of control signals effecting coordinated and collision-free movements of the body and the retractable robotic arms, while simultaneously changing a physical dimension of the collapsible robot. The coordinated and collision-free movements may include: (1) a self-collapse of the collapsible robot into a pre-defined compact geometry configuration that permits self-storage of the robotic system within a storage area positioned below a worksurface; and (2) a self-deployment of the collapsible robot into a collision-free space that permits the collapsible robot to extend into a configuration to perform tasks outside of the storage area.

One embodiment includes a robotic system comprising (a) a collapsible robot configured to extend and retract at least one robotic arm to perform a task above a worksurface, (b) a powered docking station positioned below the worksurface and including a power source interface configured to electrically couple the collapsible robot to a power source, and (c) control circuitry connected to the powered docking station and configured to generate a plurality of control signals to coordinate collision-free ingress and collision-free egress of the collapsible robot into and out of a storage area located below the worksurface.

One embodiment includes a method for operating a robotic system, which includes: receiving an activation signal to initiate a change in the physical dimension of the robotic system by a coordinated, collision-free movements of retractable robotic components (e.g. a body and one or more arms); processing a set of sensory information signals collected from the set of sensors and using that information to determining clearance zone for executing the change in physical dimension; deriving a collision-free plan from a set of clearance zone parameters, where the collision-free plan may include a dataset associated with a series of coordinated movements among the retractable robotic components; and engaging a set of motors coupled to the retractable robotic components so as to execute the collision-free plan constrained by the set of clearance zone parameters.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A robotic system, comprising:
a base;
an adjustable body having an adjustable height and a base end, the adjustable body connected to the base at the base end;
a set of retractable robotic arms coupled to the adjustable body;
a set of sensors;
a first set of motors coupled to the set of retractable robotic arms and configured to extend and retract the set of retractable robotic arms within a range of motion bounded by a fully-extended arm configuration and a fully-retracted arm configuration;
a second set of motors configured to extend and retract the adjustable height of the adjustable body within a range bounded by a fully-extended body height and a fully-retracted body height; and
control circuitry electrically coupled to the base, the set of sensors, the first set of motors, and the second set of motors, the control circuitry configured to generate
a first set of control signals operable to initiate a collision-free body retraction of the adjustable body to the fully-retracted body height, and to coordinate a collision-free collapse of the set of retractable robotic arms into the fully-retracted arm configuration to be in a compact geometry configuration, and
a second set of control signals operable to initiate and conduct a collision-free self-storage of the robotic system in the compact geometry configuration by moving horizontally into an enclosure that has an interior height smaller than the fully-extended body height of the adjustable body and an interior width narrower than the fully-extended arm configuration.

2. The robotic system of claim 1, wherein:
the base is a mobile base configured to permit untethered movements of the adjustable body relative to the enclosure.

3. The robotic system of claim 2, wherein:
the mobile base comprises:
a base sensor array comprising a plurality of sensors positioned along an edge of the mobile base and configured to sense an oncoming collision between the mobile base and the enclosure,
a set of motorized wheels positioned on a bottom surface of the mobile base and configured to orient the mobile base with respect to the enclosure,
a set of caster wheels positioned on the bottom surface of the mobile base and configured to facilitate stable movement of the mobile base relative to the enclosure, and
base control circuitry configured to electrically couple the set of motorized wheels to the base sensor array and to generate a set of sensory feedback control signals operable to drive the set of motorized wheels so as to avoid the oncoming collision between the mobile base and the enclosure and to align the mobile base with the enclosure.

4. The robotic system of claim 1, wherein:
the base comprises a motor configured to pivot the adjustable body about an axis orthogonal to the base and align the adjustable body with an entrance to the enclosure.

5. The robotic system of claim 4, wherein:
the base is connected to at least one mechanical guide rail residing within the enclosure and configured to permit automatic ingress and egress of the adjustable body into and out of the enclosure.

6. The robotic system of claim 1, further comprising:
a camera mounted on the adjustable body distal to the base.

7. The robotic system of claim 1, wherein:
the set of sensors is coupled to the set of retractable robotic arms.

8. The robotic system of claim 1, wherein:
the control circuitry is further configured to receive an activation signal and generate a third set of control signals in response to the activation signal, the third set of control signals operable to initiate a collision-free exit of the robotic system out of the enclosure, and to coordinate a set of collision-free movements of the adjustable body and the set of retractable robotic arms to transform the compact geometry configuration of the robotic system into a deployed geometry configuration of the robotic system outside of the enclosure.

9. The robotic system of claim 1, wherein:
the robotic system is configured to self-store in the compact geometry configuration adjacent to a dishwasher stored within the enclosure.

10. The robotic system of claim 9, wherein:
the control circuitry includes a wireless communication link between the robotic system and the dishwasher, the wireless communication link configured to enable the robotic system to communicate a plurality of dishwasher operation signals to the dishwasher.

11. The robotic system of claim 1, wherein: the control circuitry includes a network interface card configured to communicate wirelessly with a server, and wherein the collision-free collapse of the set of retractable robotic arms is accomplished with reference to a database of collision-free plans stored on the server and accessible by the control circuitry through the network interface card.

12. The robotic system of claim 1, wherein using the first set of control signals and the second set of control signals the control circuitry configured to:
  initiate an auto-adjustment of the adjustable body and the set of retractable robotic arms;
  process a set of sensory information signals collected from the set of sensors;
  determine a set of clearance zone parameters associated with executing the auto-adjustment from the set of sensory information signals;
  derive a collision-free plan from the set of clearance zone parameters, the collision-free plan comprising a dataset associated with a series of coordinated movements of the set of retractable robotic arms; and
  generate a plurality of control signals in the control circuitry to engage the set of motors to execute the collision-free plan constrained by the set of clearance zone parameters.

13. The robotic system of claim 1, wherein: the control circuitry is configured to establish that no obstacles or other impediments to self-storage exist based on real time data from the sensors.

14. The robotic system of claim 1, wherein: the sensors include a wrist sensor, a base sensor and a front sensor; and
  the control circuitry is configured to establish that no obstacles or other impediments to self-storage exist by detecting whether there are possible obstructions using the wrist sensor, the base sensor and the front sensor.

15. The robotic system of claim 1, wherein: the control circuitry is configured to generate the first set of signals and the second set of signals by determining whether any cached motion plans are collision-free and generating the first set of signals and the second set of signals from a cached motion plan determined to be collision-free.

16. The robotic system of claim 1, wherein: the control circuitry is configured to generate the first set of signals and the second set of signals by intermixing motion plans for two or more robotic arms including scheduling folding one part of a first robotic arm, then one part of a second robotic arm, then another part of the first robotic arm, and then another part of the second robotic arm.

17. The robotic system of claim 1, wherein: the control circuitry is configured to generate the first set of signals and the second set of signals by generating a collision-free plan to retract the adjustable body, generating a collision-free plan to fold a first arm and generating a collision-free plan to fold a second arm.

18. A robotic system, comprising:
  a base;
  an adjustable body having an adjustable height and a base end, the adjustable body connected to the base at the base end;
  a set of retractable robotic arms coupled to the adjustable body;
  a set of sensors;
  a first set of motors coupled to the set of retractable robotic arms and configured to extend and retract the set of retractable robotic arms within a range of motion bounded by a fully-extended arm configuration and a fully-retracted arm configuration;
  a second set of motors configured to extend and retract the adjustable height of the adjustable body within a range bounded by a fully-extended body height and a fully-retracted body height; and
  control circuitry electrically coupled to the base, the set of sensors, the first set of motors, and the second set of motors, the control circuitry configured to:
    initiate an auto-adjustment of the adjustable body and the set of retractable robotic arms;
    process a set of sensory information signals collected from the set of sensors;
    determine a set of clearance zone parameters associated with executing the auto-adjustment from the set of sensory information signals;
    derive a collision-free plan from the set of clearance zone parameters, the collision-free plan comprising a dataset associated with a series of coordinated movements of the set of retractable robotic arms; and
    generate a plurality of control signals in the control circuitry to engage the set of motors to execute the collision-free plan constrained by the set of clearance zone parameters.

19. A robotic system, comprising:
  an enclosure comprising a door;
  a door drive connected to the door;
  a door sensor electrically coupled to the door drive and the door;
  a base;
  an adjustable body having an adjustable height and a base end, the adjustable body connected to the base at the base end;
  a set of retractable robotic arms coupled to the adjustable body;
  a set of sensors;
  a first set of motors coupled to the set of retractable robotic arms and configured to extend and retract the set of retractable robotic arms within a range of motion bounded by a fully-extended arm configuration and a fully-retracted arm configuration;
  a second set of motors configured to extend and retract the adjustable height of the adjustable body within a range bounded by a fully-extended body height and a fully-retracted body height;
  control circuitry electrically coupled to the base, the set of sensors, the first set of motors, and the second set of motors, the control circuitry is in communication with the door drive and the door sensor and further configured to operate the door drive in response to a door activation signal generated by the door sensor, the control circuitry configured to generate:
    a first set of control signals operable to initiate a collision-free body retraction of the adjustable body to the fully-retracted body height, and to coordinate a collision-free collapse of the set of retractable robotic arms into the fully-retracted arm configuration, and
    a second set of control signals operable to initiate and conduct a collision-free self-storage of the robotic system in a compact geometry configuration within an enclosure, the enclosure including an interior height smaller than the fully-extended body height of the adjustable body, and an interior width narrower than the fully-extended arm configuration;

an automatic toe kick is connected to the cabinet door, the automatic toe kick configured to retract and allow the base to pass as part of a collision-free opening of the cabinet door.

* * * * *